US012779743B2

(12) United States Patent
Cook et al.

(10) Patent No.: US 12,779,743 B2
(45) Date of Patent: Nov. 3, 2026

(54) VEIL PRINTING PROCESSES FOR MOLDING THERMOPLASTIC WINDOW WELLS

(71) Applicant: ROCKWELL LLC, Springville, UT (US)

(72) Inventors: Vaughn Allen Cook, Mapleton, UT (US); David Wayne Hoagland, Provo, UT (US); Rodney William Slade, Mapleton, UT (US)

(73) Assignee: ROCKWELL, LLC, Springville, UT (US)

(*) Notice: Subject to any disclaimer, the term of this patent is extended or adjusted under 35 U.S.C. 154(b) by 246 days.

(21) Appl. No.: 18/516,644

(22) Filed: Nov. 21, 2023

(65) Prior Publication Data

US 2024/0084604 A1 Mar. 14, 2024

Related U.S. Application Data

(60) Division of application No. 17/173,010, filed on Feb. 10, 2021, now Pat. No. 11,834,850, which is a (Continued)

(51) Int. Cl.
*B29C 43/02* (2006.01)
*B29C 43/18* (2006.01)
(Continued)

(52) U.S. Cl.
CPC .............. *B29C 43/02* (2013.01); *B29C 43/18* (2013.01); *B29C 43/20* (2013.01); *E04F 17/06* (2013.01)

(58) Field of Classification Search
CPC ......... B29C 43/02; B29C 43/18; B29C 43/20; E04F 17/06
See application file for complete search history.

(56) References Cited

U.S. PATENT DOCUMENTS 1,680,032 A 8/1928 Anderson
2,206,862 A 7/1940 Boyd
(Continued)

FOREIGN PATENT DOCUMENTS

CA 100316 S 2/2003

OTHER PUBLICATIONS

Advisory Action (PTOL-303) Mailed on Nov. 25, 2022 for U.S. Appl. No. 17/173,007, 3 page(s).
(Continued)

*Primary Examiner* — Mathieu D Vargot
(74) *Attorney, Agent, or Firm* — Workman Nydegger

(57) ABSTRACT

A window well is composed of a fiber reinforced plastic and an outer layer. The window well also has a body having multiple ribs interposed between multiple wall surface portions. Each rib is positioned between two different wall surface portions and is defined by a corresponding height and depth. The outer layer includes a fabric veil that is at least partially embedded into the thermoplastic. The fabric veil can be made of different types of fabric material. The fabric veil can also have a multi-colored printed pattern that imitates the texture of a natural material. The outer layer of the window well improves the aesthetics of the window well and provides increased durability.

19 Claims, 41 Drawing Sheets

Related U.S. Application Data continuation-in-part of application No. 29/713,875, filed on Nov. 19, 2019, now Pat. No. Des. 931,497, and a continuation-in-part of application No. 29/713, 876, filed on Nov. 19, 2019, now Pat. No. Des. 931,498, and a continuation-in-part of application No. 16/925,759, filed on Jul. 10, 2020, now Pat. No. 11,697,252.

(60) Provisional application No. 62/979,265, filed on Feb. 20, 2020, provisional application No. 62/979,264, filed on Feb. 20, 2020, provisional application No. 63/013,268, filed on Apr. 21, 2020, provisional application No. 62/874,844, filed on Jul. 16, 2019.

(51) Int. Cl.
*B29C 43/20* (2006.01)
*E04F 17/06* (2006.01)

(56) References Cited

U.S. PATENT DOCUMENTS

| | | | | |
|---|---|---|---|---|
| 3,004,634 | A | 10/1961 | Evans et al. | |
| 3,099,900 | A | 8/1963 | Beck | |
| 3,888,058 | A | 6/1975 | Ahrens | |
| 4,126,719 | A * | 11/1978 | Koyanagi | B32B 5/24 428/36.2 |
| 4,704,828 | A | 11/1987 | Kemp | |
| 4,951,434 | A | 8/1990 | Schmidt | |
| 5,194,462 | A | 3/1993 | Hirasaka et al. | |
| 5,466,317 | A | 11/1995 | Lause et al. | |
| 5,725,940 | A | 3/1998 | Sakai et al. | |
| 5,958,539 | A | 9/1999 | Eckart et al. | |
| 6,484,455 | B1 * | 11/2002 | Poole | E04F 17/06 52/107 |
| D523,966 | S | 6/2006 | Kitchen et al. | |
| 7,171,786 | B2 | 2/2007 | George | |
| D550,859 | S | 9/2007 | Oakley | |
| 7,311,216 | B2 * | 12/2007 | Donnelly | B29C 67/0044 220/1.5 |
| D586,477 | S | 2/2009 | Kemp | |
| 7,549,256 | B1 | 6/2009 | Watkins | |
| 7,730,673 | B2 | 6/2010 | George | |
| 8,578,662 | B1 | 11/2013 | Monk | |
| D931,497 | S | 9/2021 | Cook et al. | |
| D931,498 | S | 9/2021 | Cook et al. | |
| 11,697,252 | B2 | 7/2023 | Cook et al. | |
| 11,725,400 | B2 | 8/2023 | Cook et al. | |
| 11,834,850 | B2 | 12/2023 | Cook et al. | |
| 2002/0059772 | A1 | 5/2002 | Hagel | |
| 2003/0029103 | A1 | 2/2003 | Wack et al. | |
| 2003/0167705 | A1 | 9/2003 | Oakley | |
| 2004/0098929 | A1 | 5/2004 | Kim et al. | |
| 2005/0115169 | A1 | 6/2005 | George | |
| 2005/0252103 | A1 | 11/2005 | Cook | |
| 2005/0268564 | A1 | 12/2005 | Theophilus | |
| 2007/0006537 | A1 | 1/2007 | Theophilus | |
| 2007/0130846 | A1 | 6/2007 | George | |
| 2008/0010911 | A1 | 1/2008 | George | |
| 2009/0090160 | A1 | 4/2009 | Kemp | |
| 2010/0205897 | A1 | 8/2010 | George | |
| 2011/0052910 | A1 | 3/2011 | Gunnink et al. | |
| 2011/0232206 | A1 | 9/2011 | George | |
| 2011/0262701 | A1 * | 10/2011 | Albertelli | B32B 38/06 156/276 |
| 2014/0134422 | A1 | 5/2014 | Kraatz et al. | |
| 2015/0113897 | A1 | 4/2015 | Behr et al. | |
| 2019/0047676 | A1 | 2/2019 | Behzadpour et al. | |
| 2021/0017772 | A1 | 1/2021 | Cook et al. | |
| 2021/0164240 | A1 | 6/2021 | Cook et al. | |
| 2021/0172180 | A1 | 6/2021 | Cook et al. | |
| 2021/0207387 | A1 | 7/2021 | Cook et al. | |
| 2023/0311432 | A1 | 10/2023 | Cook et al. | |
| 2024/0084605 | A1 | 3/2024 | Cook et al. | |
| 2025/0237069 | A1 | 7/2025 | Cook et al. | |

OTHER PUBLICATIONS

Advisory Action received for U.S. Appl. No. 16/925,759, mailed on Nov. 25, 2022, 3 pages.
Advisory Action received for U.S. Appl. No. 17/173,007, mailed on Nov. 25, 2022, 3 pages.
Advisory Action received for U.S. Appl. No. 17/203,377, mailed on Mar. 8, 2023, 3 pages.
CA Office Action Mailed on Jul. 19, 2021 for CA Application No. 193940.
CA Office Action Mailed on Jul. 19, 2021 for CA Application No. 193941.
Egress Window Well Photo Gallery Rockwell Window Wells https://rockwellinc.com/basement-egress-window-wells-gallery/image-gallery Feb. 2020 (Year: 2020).
Examiner Interview Summary Record (PTOL-413) Mailed on Aug. 17, 2021 for U.S. Appl. No. 29/713,875.
Examiner Interview Summary Record (PTOL-413) Mailed on Oct. 11, 2022 for U.S. Appl. No. 17/173,007.
Final Office Action received for U.S. Appl. No. 16/925,759, mailed on Aug. 29, 2022, 19 pages.
Final Office Action received for U.S. Appl. No. 17/173,007, mailed on Apr. 6, 2023, 11 pages.
Final Office Action received for U.S. Appl. No. 17/173,007, mailed on Aug. 30, 2022, 22 pages.
Final Office Action received for U.S. Appl. No. 17/173,010, mailed on Oct. 25, 2022, 23 pages.
Final Office Action received for U.S. Appl. No. 17/203,377, mailed on Nov. 23, 2022, 18 pages.
Final Rejection Mailed on Aug. 30, 2022 for U.S. Appl. No. 17/173,007, 22 page(s).
Final Rejection Mailed on Nov. 23, 2022 for U.S. Appl. No. 17/203,377, 17 page(s).
Final Rejection Mailed on Oct. 25, 2022 for U.S. Appl. No. 17/173,010, 22 page(s).
Non-Final Office Action received for U.S. Appl. No. 16/925,759, mailed on Feb. 1, 2023, 7 pages.
Non-Final Office Action received for U.S. Appl. No. 16/925,759, mailed on Mar. 2, 2022, 15 pages.
Non-Final Office Action received for U.S. Appl. No. 17/173,007, mailed on Apr. 21, 2022, 18 pages.
Non-Final Office Action received for U.S. Appl. No. 17/173,007, mailed on Feb. 9, 2023, 11 pages.
Non-Final Office Action received for U.S. Appl. No. 17/173,010, mailed on Apr. 12, 2023, 8 pages.
Non-Final Office Action received for U.S. Appl. No. 17/173,010, mailed on Apr. 22, 2022, 17 pages.
Non-Final Office Action received for U.S. Appl. No. 17/203,377, mailed on Jun. 7, 2022, 17 pages.
Non-Final Rejection Mailed on Apr. 21, 2022 for U.S. Appl. No. 17/173,007, 17 page(s).
Non-Final Rejection Mailed on Apr. 22, 2022 for U.S. Appl. No. 17/173,010, 16 page(s).
Non-Final Rejection Mailed on Jun. 7, 2022 for U.S. Appl. No. 17/203,377, 17 page(s).
Non-Final Rejection Mailed on Mar. 3, 2021 for U.S. Appl. No. 29/713,875.
Non-Final Rejection Mailed on Mar. 3, 2021 for U.S. Appl. No. 29/713,876.
Notice of Allowance and Fees Due (PTOL-85) Mailed on Aug. 13, 2021 for U.S. Appl. No. 29/713,875, 7 page(s).
Notice of Allowance and Fees Due (PTOL-85) Mailed on Aug. 13, 2021 for U.S. Appl. No. 29/713,876, 7 page(s).
Notice of Allowance and Fees Due (PTOL-85) Mailed on Jul. 24, 2023 for U.S. Appl. No. 17/173,007, 8 page(s).
Notice of Allowance and Fees Due (PTOL-85) Mailed on Jul. 26, 2023 for U.S. Appl. No. 17/173,010, 9 page(s).

(56) References Cited

OTHER PUBLICATIONS

Notice of Allowance and Fees Due (PTOL-85) Mailed on Mar. 30, 2023 for U.S. Appl. No. 17/203,377, 8 page(s).
Notice of Allowance received for U.S. Appl. No. 16/925,759, mailed on Mar. 15, 2023, 8 pages.
Notice of Allowance received for U.S. Appl. No. 17/203,377, mailed on Mar. 30, 2023, 8 pages.
Notice of Allowance received for U.S. Appl. No. 29/713,875, mailed on Aug. 13, 2021, 7 pages.
Notice of Allowance received for U.S. Appl. No. 29/713,876, mailed on Aug. 13, 2021, 7 pages.
Requirement for Restriction/Election Mailed on Dec. 2, 2021 for U.S. Appl. No. 17/173,007, 8 page(s).
Requirement for Restriction/Election Mailed on Dec. 2, 2021 for U.S. Appl. No. 17/173,010, 8 page(s).
Restriction Requirement received for U.S. Appl. No. 16/925,759, mailed on Dec. 1, 2021, 8 pages.
Restriction Requirement received for U.S. Appl. No. 17/173,007, mailed on Dec. 2, 2021, 8 pages.
Restriction Requirement received for U.S. Appl. No. 17/173,010, mailed on Dec. 2, 2021, 8 pages.
Rockwell Denali https://rockwellinc.com/denali Jan. 2020 (Year: 2020).
Boman Kemp Area Well Extension Installation Instructions, https://www.youtube.com/watch?v=O1SYvxcDoGQ, Jun. 26, 2024.
Final Office Action received for U.S. Appl. No. 18/516,687, mailed on Mar. 17, 2026, 18 pages.
Non-Final Office Action received for U.S. Appl. No. 18/204,753, mailed on Dec. 19, 2025, 10 pages.
Non-Final Office Action received for U.S. Appl. No. 18/516,687, mailed on Dec. 4, 2025, 17 pages.

* cited by examiner

400

400

400

400

1500

<u>1600</u>

1800

1800

2800

2800

3900

4000

4005

4010

4300

VEIL PRINTING PROCESSES FOR MOLDING THERMOPLASTIC WINDOW WELLS

CROSS-REFERENCE TO RELATED APPLICATIONS

This application is a divisional of U.S. patent application Ser. No. 17/173,010 filed on Feb. 10, 2021, now U.S. Pat. No. 11,834,850, entitled "VEIL PRINTING PROCESSES FOR MOLDING THERMOPLASTIC WINDOW WELLS," which application claims the benefit of and priority to U.S. Provisional Patent Application Ser. No. 62/979,265 filed on Feb. 20, 2020, entitled "VEIL PRINTING PROCESSES FOR MOLDING THERMOPLASTIC WINDOW WELLS," as well as U.S. Provisional Patent Application Ser. No. 62/979,264 filed on Feb. 20, 2020, entitled "MODULAR INSERT FOR A WINDOW WELL," as well as U.S. Provisional Patent Application Ser. No. 63/013,268 filed on Apr. 21, 2020, entitled "MODULAR STEP FOR A WINDOW WELL." Application Ser. No. 17/173,010 is also a continuation-in-part of U.S. Design patent application Ser. No. 29/713,875 filed on Nov. 19, 2019, now Pat. No. Design 931,497, entitled "WINDOW WELL," as well as U.S. Design patent application Ser. No. 29/713,876 filed on Nov. 19, 2019, now Pat. No. Design 931,498, entitled "WINDOW WELL EXTENSION," as well as U.S. Non-Provisional patent application Ser. No. 16/925,759 filed on Jul. 10, 2020, now U.S. Pat. No. 11,697,252, entitled "LIGHTWEIGHT AND DURABLE WINDOW WELL," which claims the benefit of and priority to U.S. Provisional Patent Application Ser. No. 62/874,844 filed on Jul. 16, 2019, entitled "LIGHTWEIGHT AND DURABLE WINDOW WELL," as well as U.S. Provisional Patent Application Ser. No. 62/979,264 filed on Feb. 20, 2020, entitled "MODULAR INSERT FOR A WINDOW WELL," as well as U.S. Provisional Patent Application Ser. No. 62/979,265 filed on Feb. 20, 2020, entitled "VEIL PRINTING PROCESSES FOR MOLDING THERMOPLASTIC WINDOW WELLS," as well as U.S. Provisional Patent Application Ser. No. 63/013,268 filed on Apr. 21, 2020, entitled "MODULAR STEP FOR A WINDOW WELL," as well as U.S. Design patent application Ser. No. 29/713,875 filed on Nov. 19, 2019, now Pat. No. Design 931,497, entitled "WINDOW WELL," as well as U.S. Design patent application Ser. No. 29/713,876 filed on Nov. 19, 2019, now Pat. No. Design 931,498, entitled "WINDOW WELL EXTENSION." All of the foregoing applications are incorporated herein by reference in their entireties.

BACKGROUND

Technical Field

This disclosure generally relates to window wells, modular inserts, and window well manufacturing processes that use fabric veils. More specifically, the present disclosure relates to veil printing processes for molding thermoplastic and/or thermoset window wells.

Related Technology

A window well is one type of a building component that can be used to hold back dirt and other material from a window that is below ground level. A typical window well is embodied as a U-shaped wall formed out of metal. One purpose of a window well is to let natural light into basement windows, while also providing an access point for entry/escape, should it be necessary. Window wells are often attached directly to a building structure and are visible from both the inside and outside of the building structure. Additionally, window wells must be strong enough to hold back and retain backfill soils without deflecting.

Many window wells are made of steel or a similar metal, which makes them relatively heavy and difficult/expensive to transport. Additionally, metal window wells can be easily damaged during transportation and installation. Even after installation, a metal window well can be damaged. For instance, a window well can be impacted by other devices after the window well has been installed. When a damaged window well needs to be replaced, it can be an expensive and time intensive process to excavate and replace an installed window well.

Additionally, since the window wells are exposed to the elements, they can become corroded and rust (depending on their material composition). Even when not corroded, metal window wells can be somewhat unattractive. Furthermore, it is difficult to make a metal window well look like a natural material or be aesthetically pleasing.

Some window wells are manufactured out of plastic materials, which makes them easier to apply an aesthetic texture to. However, the improved aesthetics often come at a cost of sacrificing durability and strength. In particular, existing window wells manufactured out of current plastic materials are typically not strong enough to compete with metal window wells because the types of plastic that are suitable for injection molding or rotomolding (the typical processes used for manufacturing plastic window wells), for example, cannot be used to manufacture a layered or reinforced plastic material.

Accordingly, there is a need for a window well that is durable, lightweight and visually attractive. Additionally, there is a need for improving techniques for repairing and replacing window wells.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments relate to window wells composed of fiber reinforced plastic and an outer layer. The outer layer is composed of a fabric veil that is at least partially embedded into the thermoplastic. In some embodiments, the fabric veil is composed of polyester.

Furthermore, in some embodiments, the window well has at least some fibers that are omnidirectional relative to the other fibers in the thermoplastic. Additionally, at least some fibers of the long fiber reinforced thermoplastic have a length greater than 5 mm. In some embodiments, at least some of the fibers of the long fiber reinforced thermoplastic have a length greater than 20 mm. Additionally, in some embodiments, at least some of the fibers of the long fiber reinforced thermoplastic have a length of greater than 40 mm.

In some embodiments, the window well is composed of fiber reinforced thermoplastic and a fabric veil. The window well also comprises a body having a plurality of ribs interposed between a plurality of wall surface portions. Additionally, each rib is positioned between two different wall surface portions and is defined by a variable height and a variable depth. Furthermore, in some embodiments, the wall surface portions have a variable thickness that varies from a minimal thickness of less than 3 mm to a maximum thickness of greater than 5 mm. Additionally, the fabric veil has a printed pattern and creates an outer layer of the window well.

Also, at least some embodiments herein relate to a method for manufacturing a window well. The method includes (1) heating a fiber reinforced thermoplastic sheet to more than 250° F.; (2) positioning the fiber reinforced thermoplastic sheet, after the heating, within the mold; (3) positioning one or more veils onto the fiber reinforced thermoplastic sheet; and (4) compressing the fiber reinforced thermoplastic sheet within the mold with a pressure of greater than 200 psi. However, in some embodiments, the thermoplastic sheet is heated to more than 385° F. either prior to or during the compression. Additionally, in some embodiments, the veil has a printed pattern that improves the aesthetics of the window well by imitating a natural material.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail using the accompanying drawings in which.

DETAILED DESCRIPTION

Figure 1:
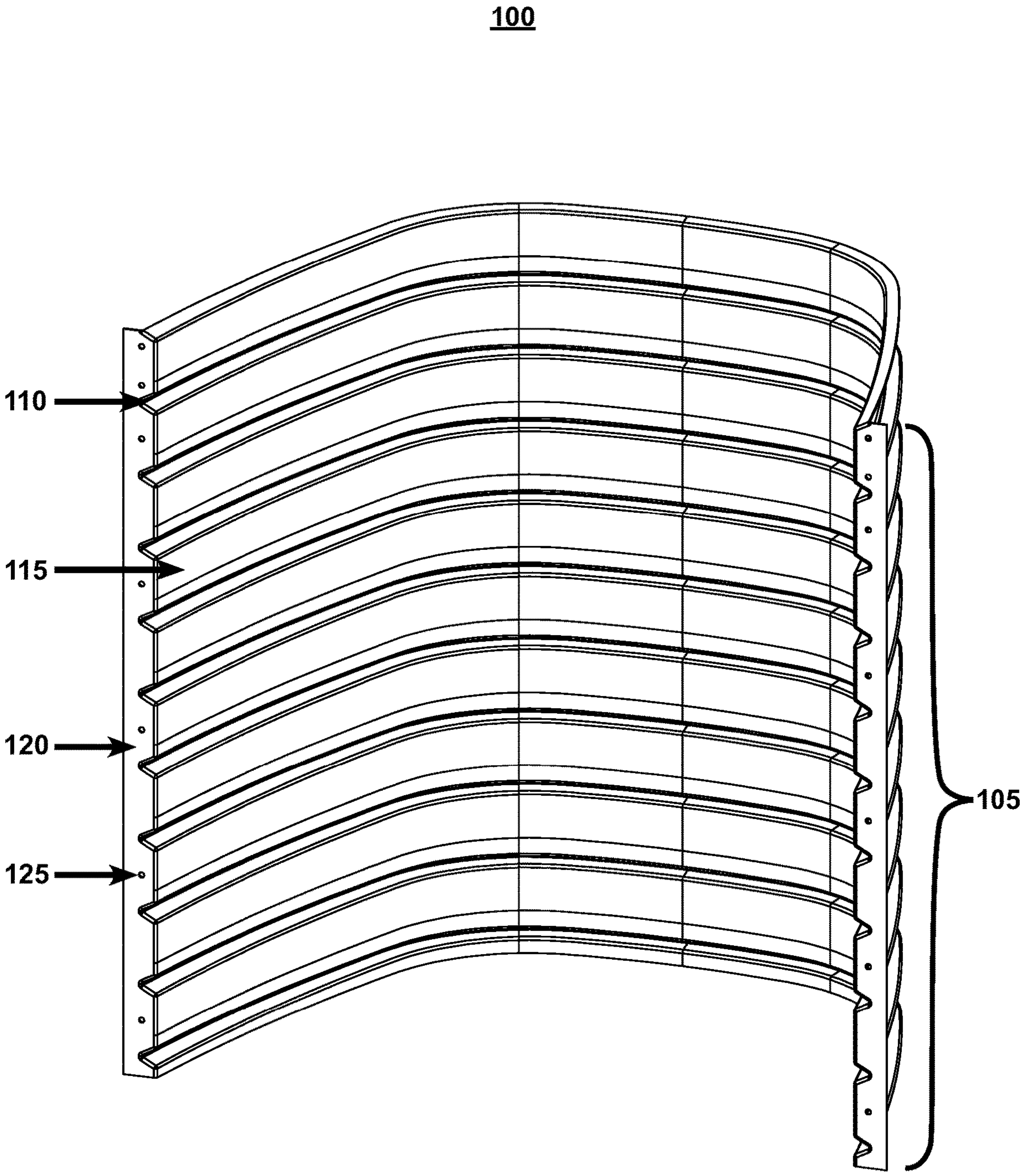
FIG. 1 illustrates a perspective view of an exemplary lightweight and durable window well.

Before describing various embodiments of the present disclosure in detail, it is to be understood that this disclosure is not limited to the parameters of the particularly exemplified systems, methods, apparatus, products, processes and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments and is not necessarily intended to limit the scope of the claimed invention.

Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

Overview of the Veil Printing Processes for Molding Thermoplastic Window Wells

Embodiments disclosed herein relate to window wells and modular inserts that are manufactured out of fiber reinforced thermoplastic materials and one or more fabric veils.

In some embodiments, the window well has a generally U-shaped body comprising a plurality of ribs and wall surfaces. Each one of the ribs is interposed between two different wall surface portions. It should be noted that the ribs increase the rigidity of the window well while keeping the weight of the window well low. Additionally, the window well has substantially planar flanges that are used to securely attach the window well to the window well's corresponding structure.

Additionally, in some embodiments, one or more fabric veils are used to increase the strength and durability of the window well or modular insert. For example, the fabric veil can be placed in the mold either above or below a pre-heated thermoplastic sheet. Therefore, when the thermoplastic sheet and veil are compressed by the molds, the fabric veil is embedded into the thermoplastic and creates the outer layer of the window well. This additional outer layer can provide an extra layer of protection.

In some embodiments, one or more fabric veils are used to increase the aesthetic qualities of the window well or modular insert. For example, a pattern can be printed onto the fabric veils. Thus, when the fabric veils are compressed into the thermoplastic sheet, the patterns of the veils become embedded to the outside surface of the window well or modular insert.

Technical Benefits and Advantages

The disclosed embodiments increase the control a manufacturer has on the aesthetics and properties of a window well or modular insert. In particular, the disclosed embodiments are directed to a window well or a modular insert that comprises both a thermoplastic sheet and a fabric veil.

The fabric veil is used to create a new outer layer for the window well by partially embedding the fabric veil into the thermoplastic during compression. This new outer layer increases the strength and durability of the window well. In other words, the fabric veil reinforces the thermoplastic window well. The new outer layer can also weatherproof the window well. More particularly, the outer layer can increase the resistance against deterioration caused by humidity, rain and UV rays. Thus, the fabric veil can significantly increase the lifespan of a window well.

Another advantage is that the fabric veil can improve the aesthetics of the window well or modular insert. For example, the veil can be used to hide imperfections caused during the molding process. Similarly, the veil can hide unsightly fibers from the thermoplastic.

Some veils also have printed patterns that can be used to customize the appearance of the window well. For instance, some patterns are multicolored and imitate the texture of natural materials, such as wood, granite or stone. When a veil is compressed into the thermoplastic, the veil's printed pattern is embedded into the surface of the window well. Thus, the patterned veils can give the window wells an organic or natural looking finish. In other words, patterned veils can increase the complexity and aesthetics of the surface finish (e.g., by adding complex/realistic patterns and/or multiple colors).

Overall, the fabric veil provides a variety of improvements over traditional methods and devices for repairing window wells.

The Lightweight and Durable Window Well

FIG. 1 illustrates a perspective view of one embodiment of a lightweight and durable window well 100. In FIG. 1, the body 105 of the window well 100 is a generally U-shaped wall. However, some embodiments have a body that is generally box or V shape. Furthermore, it should be noted that the body can be a wall of any shape that retains backfill soil (e.g., square, rectangular or circular/curve shaped).

In the embodiment shown in FIG. 1, the body 105 of the window well has ten grooves 110 and eleven wall surface portions 115. However, other embodiments include more or less grooves and wall surface portions. Further details on these grooves 110 and surface portions 115 will be provided later.

The lightweight and durable window well 100 also has substantially planar flanges 120 on each side. The flanges 120 are the portions of the window well which contact the structure and are disposed on distal or terminal ends of the window well 100. The planar flanges 120 have attachment holes 125 which facilitate installation of the lightweight and durable window well 100 (i.e., facilitate attaching the window well 100 to a structure).

The attachment holes 125 allow the lightweight and durable window well 100 to be fastened to a structure using a screw or a bolt. The attachment holes can be placed every 1 cm, 2 cm, 3 cm, 4 cm, 5 cm, 6 cm, 7 cm, 8 cm, 9 cm, 10 cm, 15 cm, 20 cm, 30 cm or more than 30 cm according to needs or preferences. Additionally, the size and shape of the holes can vary to allow for a variety of fasteners. It should be noted that some embodiments do not include attachment holes. In embodiments without attachment holes, a user can add custom holes during the installation (e.g., by using a drill).

The attachment holes 125 also help in the transportation of the lightweight and durable window well 100. For example, the attachment holes 125 can be used to align, stack or secure the window wells while the window wells are being transported. Additionally, more material/thickness can be positioned at the flanges 120 to increase the strength of the flanges 120, while also reducing the amount of material in the rest of the window well, thereby reducing the overall weight of the window well.

Figure 2:
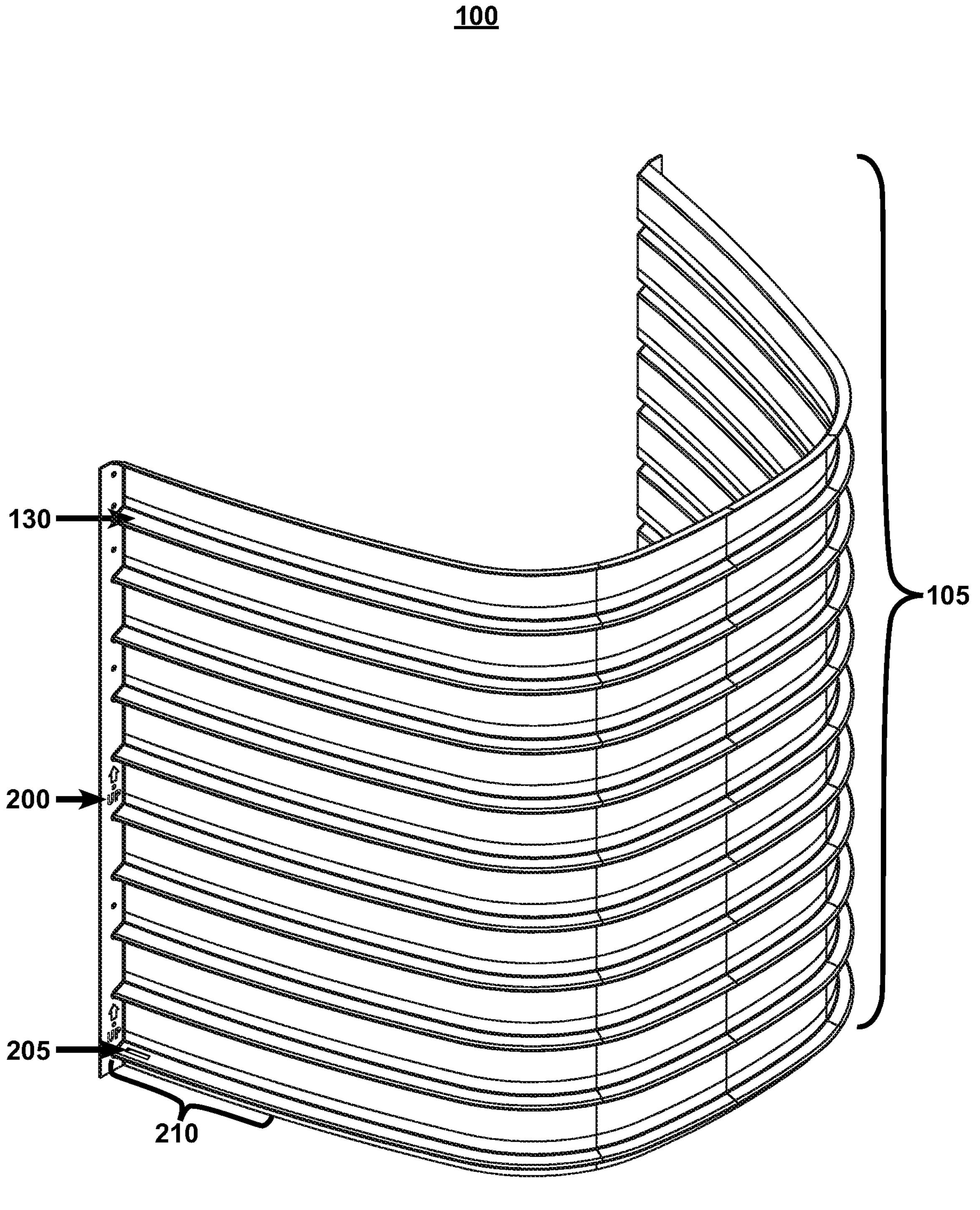
FIG. 2 illustrates a perspective view of the back of the window well of FIG. 1.

FIG. 2 illustrates a perspective view from the back of the lightweight and durable window well 100. In FIG. 2, ten ribs 130 are shown. It should be noted that the ribs 130 increase the stiffness and strength of the window well. Additionally, each one of these ribs 130 has a corresponding groove 110. In other words, the ribs 130 and grooves 110 are opposite sides of the same features (i.e. the groove describes the front/inside surface while the rib describes the back/outside surface of the same feature). Additionally, more details on these ribs 130 will be provided later.

The lightweight and durable window well 100 is also configured, in some embodiments, with one or more four directional indicators 200. The directional indicators 200 facilitate proper placement during installation by helping a user correctly orient the window well 100. The indicators 200 also facilitate proper orientation during storage and shipping. For example, in some embodiments, the window wells can be stored more compactly if all the window wells in storage have the same orientation.

The directional indicators 200 can be formed into the surface of the window well 100 (i.e. the indicators 200 can be molded directly into the window well 100). However, in some embodiments, the directional indicators are formed into the window well 100 after the molding process (e.g., through etching or stamping). In yet other embodiments, the directional indicators can be printed on the window well.

In FIG. 2, the directional indicators 200 comprise of a directional arrow and the word "UP." In some embodiments, the directional indicators only consist of either an arrow or a word (e.g., the word "TOP" on the top portion of the window well). In some embodiments, the window well only has one directional indicator. However, in other embodiments the window well has two or more indicators. Additionally, the directional indicators can be placed on the front and/or back of the window well.

Figure 3:
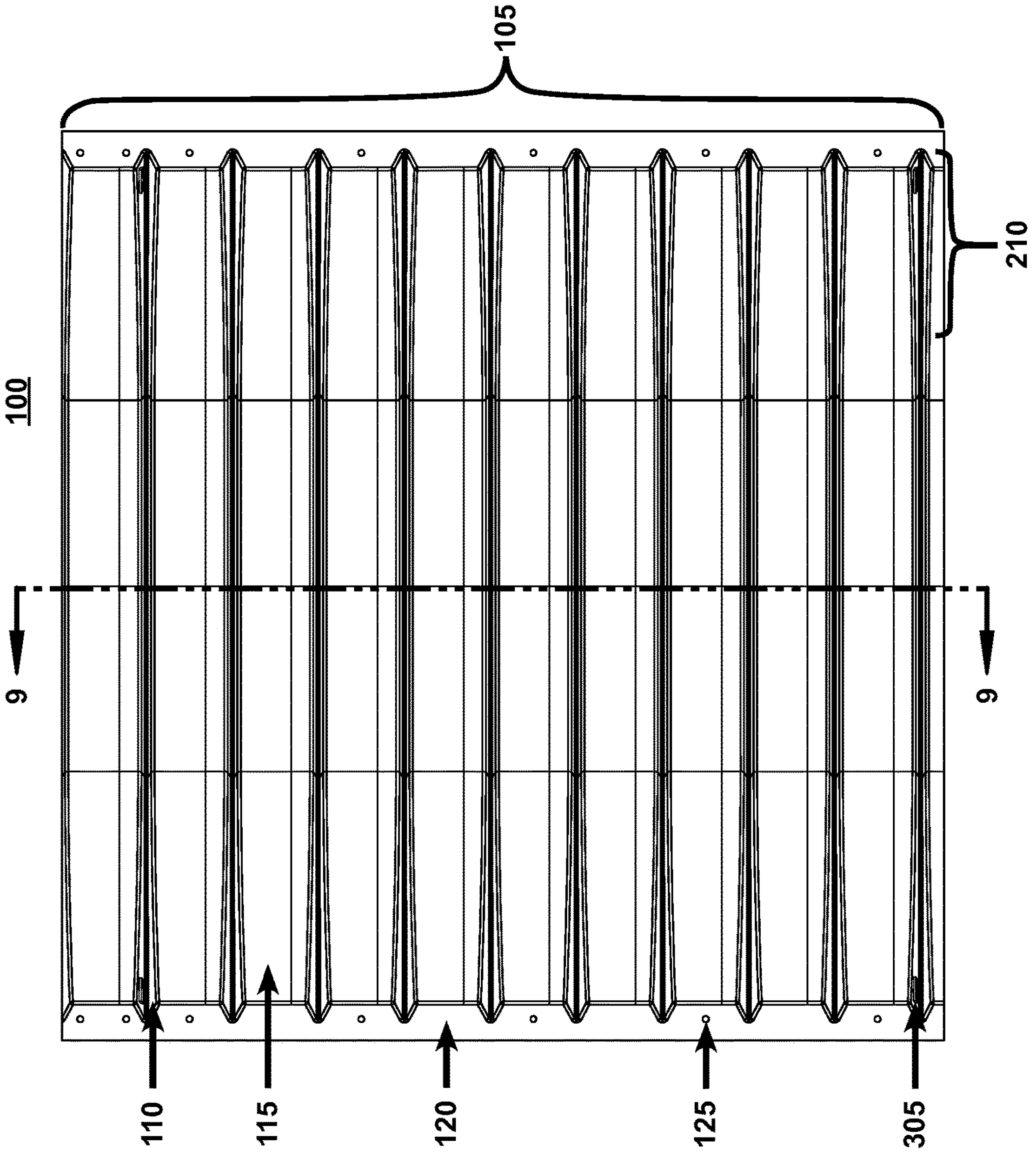
FIG. 3 illustrates a front view of the window well of FIG. 1.
Figure 4:
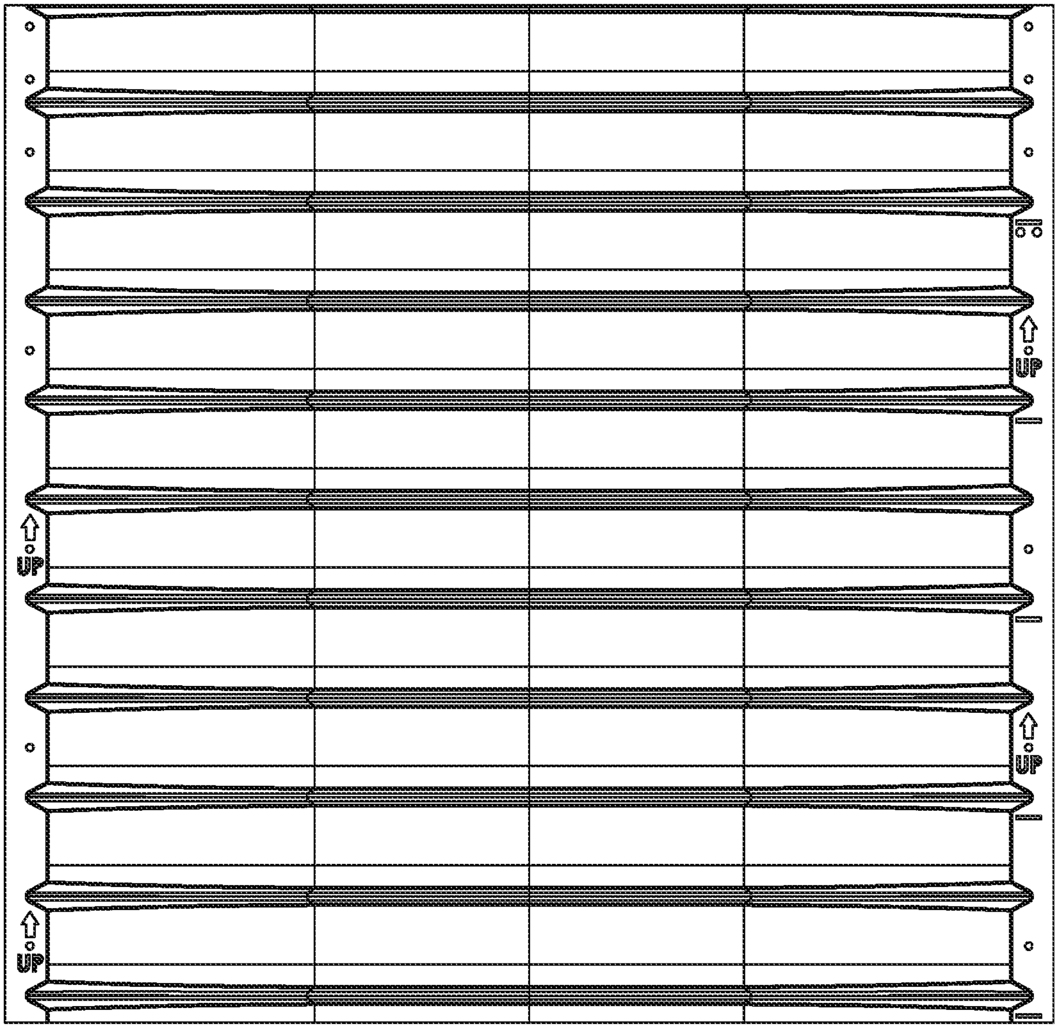
FIG. 4 illustrates a back view of an exemplary lightweight and durable window well.
Figure 5:
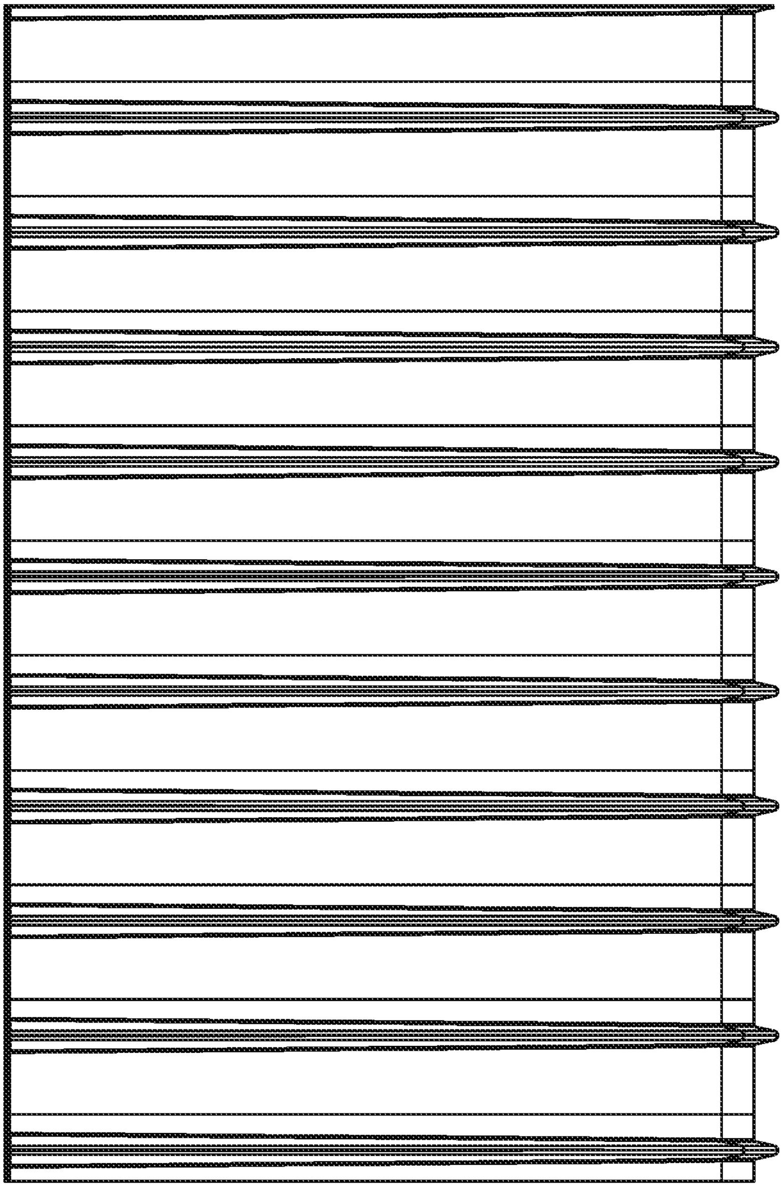
FIG. 5 illustrates a right-side view of the window well of FIG. 4
Figure 6:
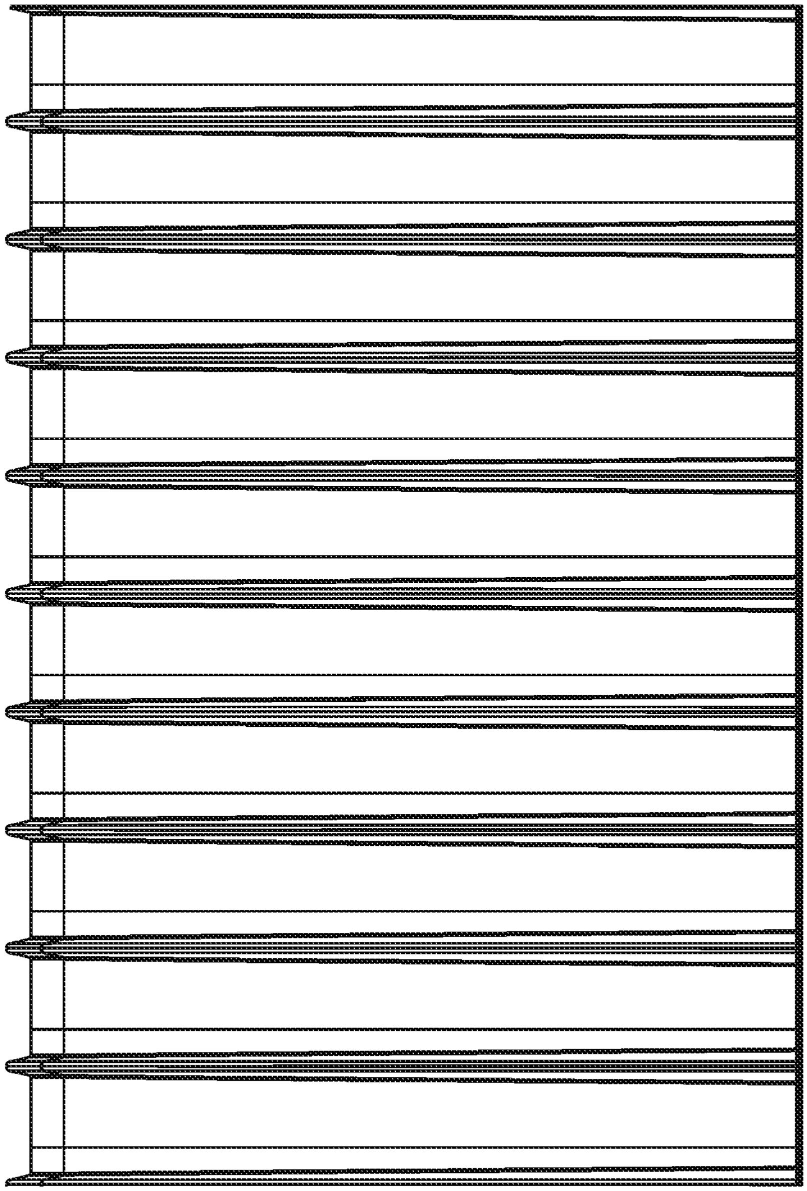
FIG. 6 illustrates a left-side view of the window well of FIG. 4.
Figure 7:
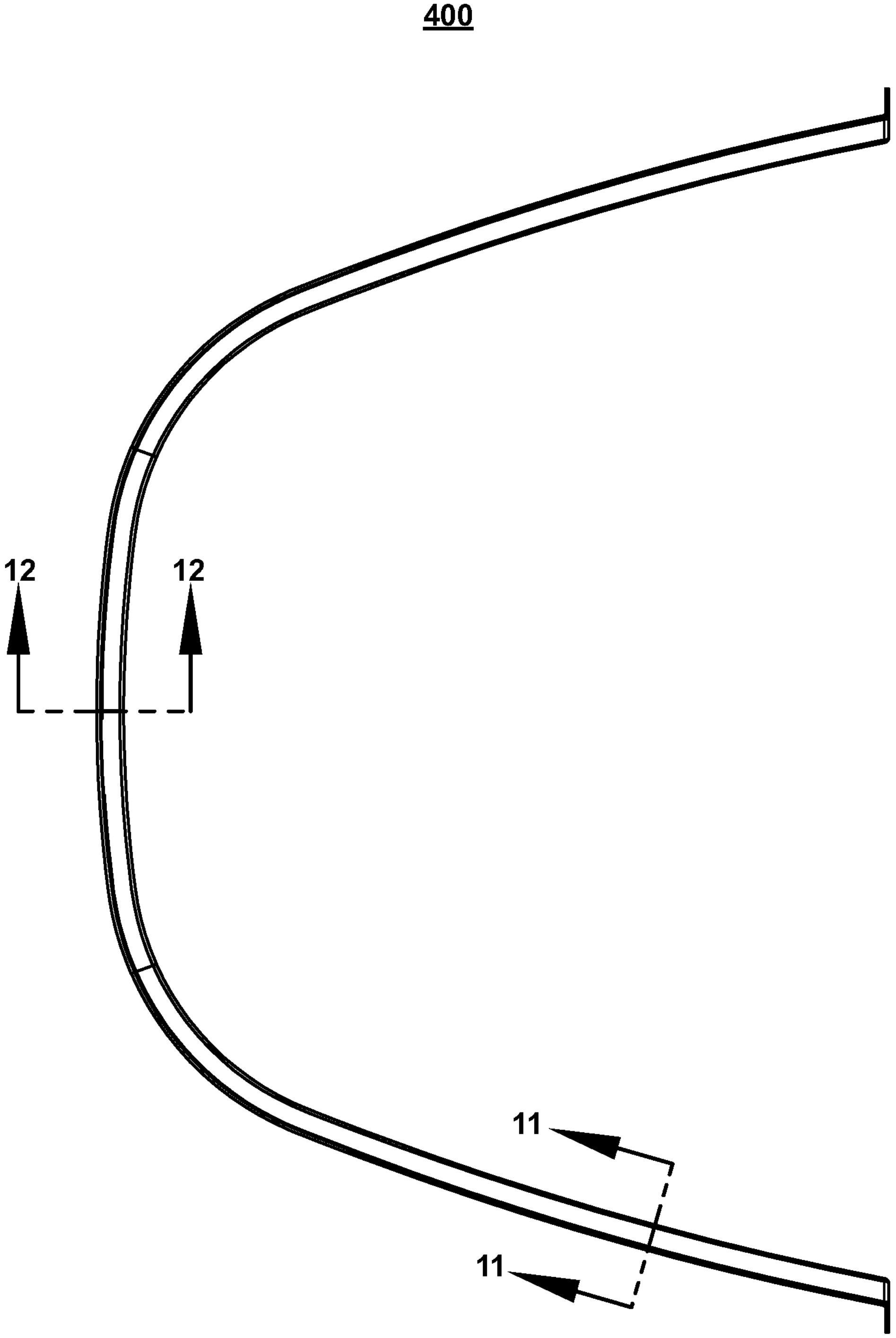
FIG. 7 illustrates a top view of the window well of FIG. 4.
Figure 8:
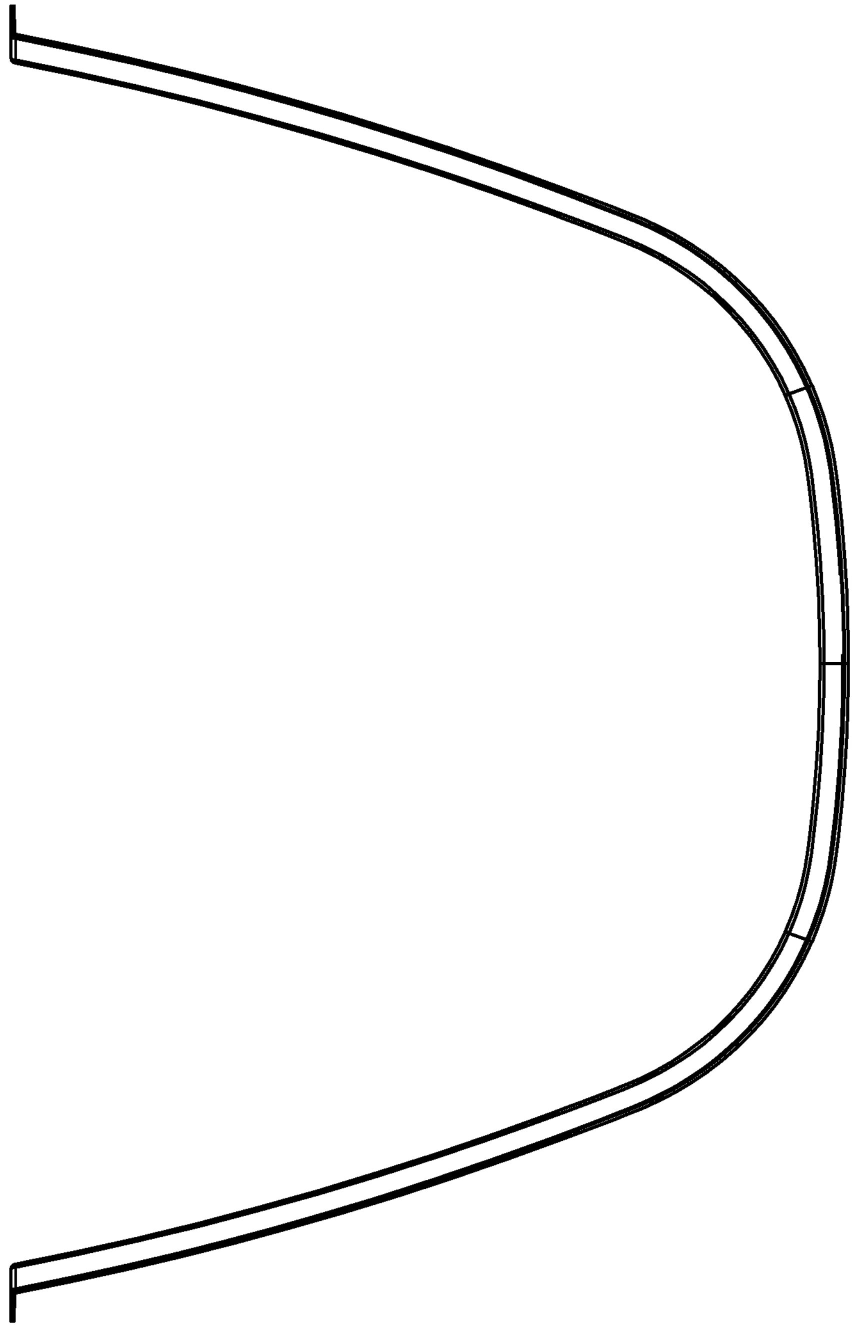
FIG. 8 illustrates a bottom view of the window well of FIG. 4.

FIG. 3 illustrates a front view of the lightweight and durable window well 100. The lightweight and durable window well 100 has two tabs 305 and two slots 205 on the bottom groove 110 and rib 130, respectively. However, in some embodiments, the window well has tabs on multiple grooves and slots on multiple ribs. Additionally, some embodiments have tabs on every groove and slots on every rib. It should also be noted that some embodiments have more than two slots and tabs per groove/rib. Additionally, some embodiments, have no tabs and/or slots (e.g., window well 400). More details on these tabs and slots will be provided later.

FIGS. 4 through 8 illustrate multiple views of a lightweight and durable window well 400. The height of the body 105 of the window well 100 may vary to accommodate different needs and preferences, from 30 cm to 35 cm, 40 cm, 50 cm, 100 cm, 150 cm, 200 cm or more than 200 cm. Likewise, the width (i.e., the distance between the two opposite planar flanges) and the depth (i.e., the distance from the front of the planar flanges to the furthest point on the back of the ribbing) of the body 105 of the window well 100 may vary to accommodate different needs and preferences, from 0.25 m to 1 m, 2 m, 3 m or more than 3 m.

Additionally, the lightweight and durable window well 100 can be formed of different materials, such as a thermoplastic composite. It should be noted that the embodiment in FIGS. 1 through 8 is made of long fiberglass reinforced polypropylene.

However, some window wells within the scope of the present invention are made of a different thermoplastic composite. For example, some embodiments use long fiber reinforced thermoplastic (LFRT) (e.g., fiberglass reinforced polypropylene, reinforced nylon, rigid thermoplastic polyurethane, polybutylene terephthalate, polyetherimide, polyphthalamide, or some other reinforced thermoplastic). Additionally, some embodiments are manufactured from a glass mat thermoplastic or a continuous fiber reinforced thermoplastic. Furthermore, it should be noted that other fiber reinforced plastics may be used if the material is suitable for high pressure thermoforming such as, but not limited to, sheet molding compounds, bulk molding compounds and other high-performance thermoset composites.

In some embodiments, the thermoplastic is reinforced using fibers, such as glass fibers, carbon fibers or natural fibers (e.g., hemp, flax, ramie). These fibers may have variable lengths, but preferably include at least some relatively long fibers having lengths of greater than the length that is generally suitable/desired for injection molding plastics (e.g., 6 mm to 10 mm). In some instances, the fiber lengths of at least some fibers in the window well are greater than 12.5 mm and, in some instances, greater than 25 mm. In some embodiments, the average length of the fibers ranges from 25 mm to 45 mm. In other embodiments, the average length of the fibers ranges from 45 mm to 80 mm.

In yet other embodiments, the average length of the fibers ranges from 80 mm to 120 mm. Additionally, some embodiments have continuous fibers having lengths of many millimeters (e.g., greater than 150 mm).

In some embodiments, the fibers are oriented in random directions (e.g., random directional or omnidirectional relative to other fibers in the material). In other embodiments, the fibers are positioned substantially unidirectionally. Notably, the directionality of the fibers is specifically descriptive with reference to the orientation of a fiber with relationship to other fibers within the material as contained within the relatively flat portions of the molded material (e.g., not the curved or angular portions of the molded material where even unidirectionally positioned fibers will have alignments that are not parallel with other fibers in the flat portions (i.e., the wall surface portions) of the molded material).

In many instances, the reinforced thermoplastic is lighter and more durable to environmental conditions than traditional window well materials, such as metal and other plastics. For example, the reinforced thermoplastic material is more UV resistant and rust/corrosion resistant than traditional materials used to manufacture window wells. The reinforced thermoplastic material also performs well at low temperatures and has increased heat resistance.

Furthermore, the reinforced thermoplastic is more impact resistant than traditional window well materials. In other words, the disclosed embodiments can experience more torsion, bending and impact forces without deforming or cracking, as compared to traditional window wells. Overall, because of the high-quality and strength of the reinforced thermoplastic material, the lightweight and durable window well 100 has a longer lifespan than traditional window wells.

The design of disclosed embodiments also adds strength and durability to the lightweight and durable window well 100. For example, the ribs 130 significantly increase the stiffness of the lightweight and durable window well 100. In some embodiments (not presently shown), the ribs are only visible on the backside of the window well. In other words, the front of the window well is substantially flat and does not have ribs. This can be accomplished, for example, by forming the mold with a smooth surface on the front-inner side of the window well, which is the side that is visible from the inside of a house when installed. The mold can also be formed to create ribs on the back-side of the window well to add structure to the window well without compromising aesthetics of the window well.

Figure 9B:
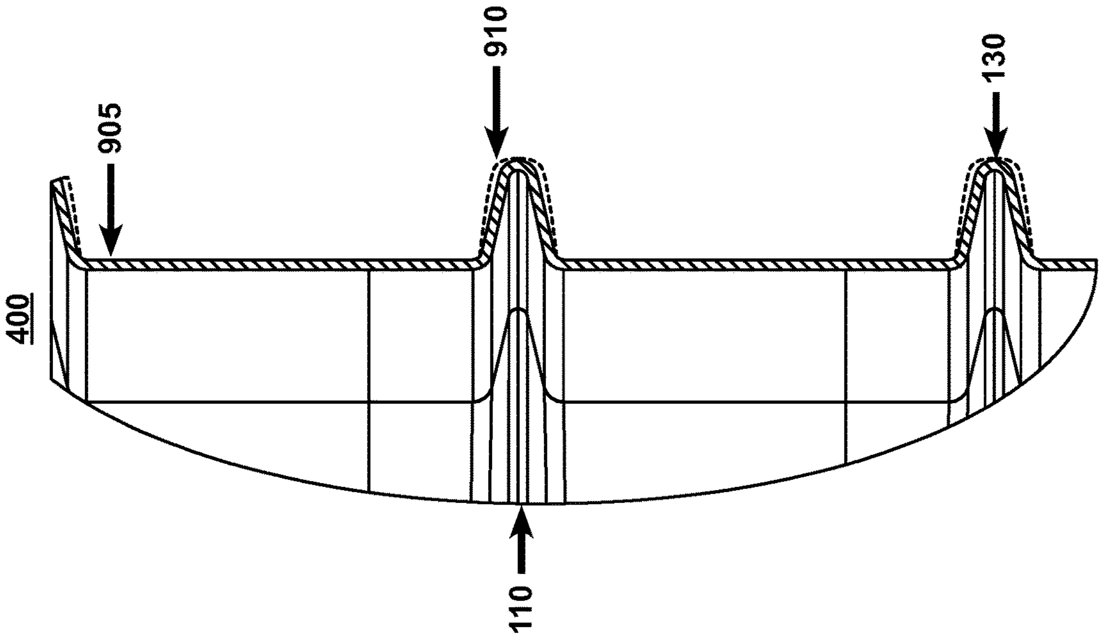
FIG. 9B illustrates a close-up of the cross-section of the grooves and ribs of the window well of FIG. 4. Additionally, the dotted lines of FIG. 9B illustrate an alternate embodiment of the window well (i.e., a window well with varying wall thickness).
Figure 9A:
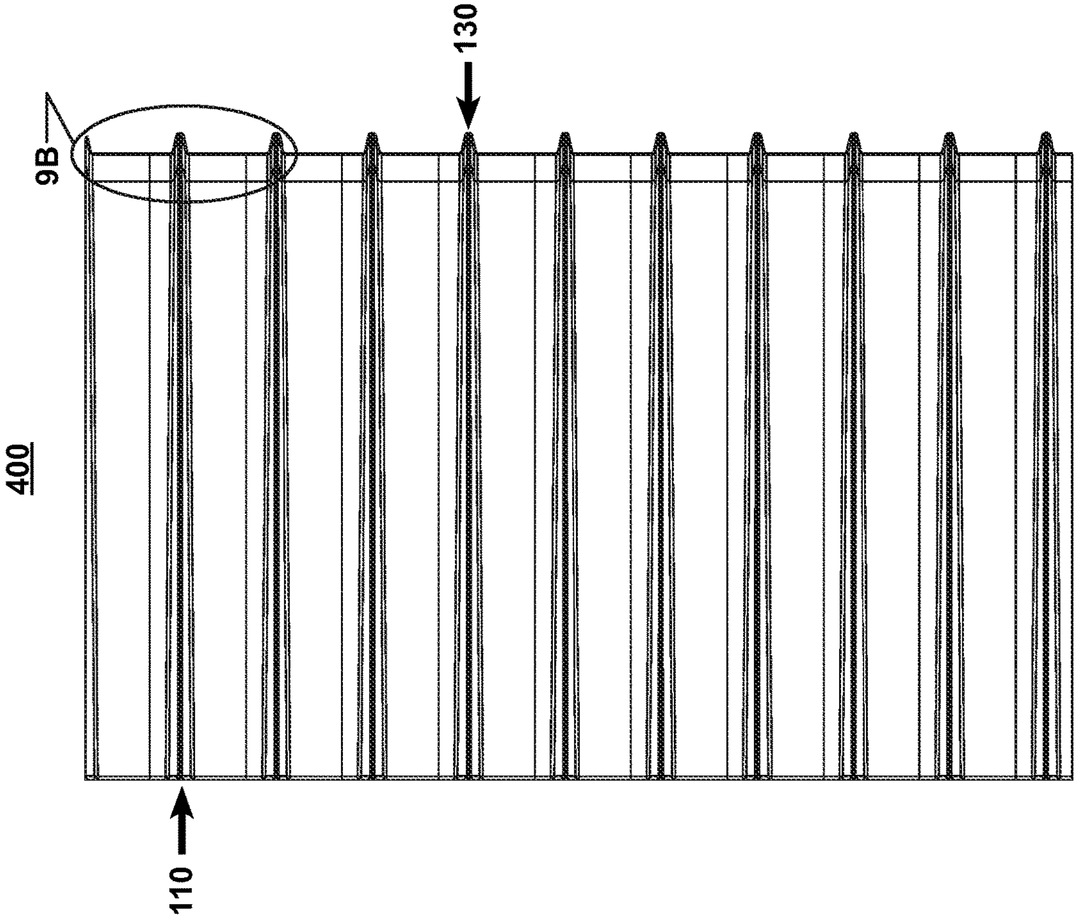
FIG. 9A illustrates a right cross-section view of the window well of FIG. 4.

FIG. 9A is a cross-section side view of the window well 100 which illustrates a cross-section of these ribs 130. FIG. 9A also illustrates a cross-section of the grooves 110. As discussed above, the grooves 110 define the general shape of the ribs 130 of the window well 100. It should also be noted that the grooves 110 and ribs 130 improve the visual aesthetics of the window well 100. While the current embodiment shows ten ribs 130, it will be appreciated that the window well 100 can include more or fewer than ten ribs.

The spacing between the grooves/ribs 110, 130 can also vary to accommodate different needs and preferences (e.g., 5-10 cm), or less (e.g., 4-6 cm or less) or more (e.g., 10-12 cm or more). In some embodiments, the distance between the grooves/ribs is different within the same window well. For example, one distance between the grooves/ribs is 5 cm, while the next distance between the grooves/ribs is 15 cm.

Additionally, as discussed above, the body of the window well 100 includes a plurality of wall surface portions which surround each groove 110. However, in some embodiments, there is only one wall surface portion (i.e., there are no grooves). The wall surface portion may vary in height to accommodate different needs and preferences, from 10 cm, 20 cm, 30 cm, 40 cm, 50 cm, 60 cm or more than 60 cm. Additionally, in some embodiments, the wall surface portions follow the curvature of the body of the window well. However, the depth of the wall surface portion may vary to accommodate different needs and preferences, from 10 cm, 25 cm, 50 cm, 75 cm, 100 cm or more than 100 cm.

FIG. 9B includes a close-up view of the grooves 110 and the ribs 130. It should be noted that the height of the groove 110 is defined by a greatest open latitudinal space within the groove 110 at any corresponding point in the groove 110 (i.e. the distance between the top of the groove and the bottom of the groove at the front surface of the window well). Similarly, the depth of the groove 110 is defined by a greatest longitudinal distance in the groove 110, as measured from a flat surface of the window well to the most interior portion of the groove 110.

In some embodiments, the wall thickness varies. For example, FIG. 9B illustrates both a wall 905 with a constant thickness and, in dashed lines, a wall 910 with varying thickness. In some instances, the wall thickness varies from 3-4 mm (furthest from the ribs) to 6-7 mm (nearest the ribs). It should be noted that positioning more material/thickness at the ribs increases the strength of the window well, while also reducing the amount of material between the ribs to thereby reduce the overall weight of the window well.

Although FIG. 9B illustrates the wall 910 expanding outwards, in some embodiments the wall expands inwards. In other words, in some embodiments, the height and depth of the grooves decrease as the wall expands. Additionally, in some embodiment, the wall thickness changes more dramatically. For example, the wall thickness can vary from 1-3 mm (furthest from the ribs) to 7-8 mm (nearest the ribs).

Figure 10A:
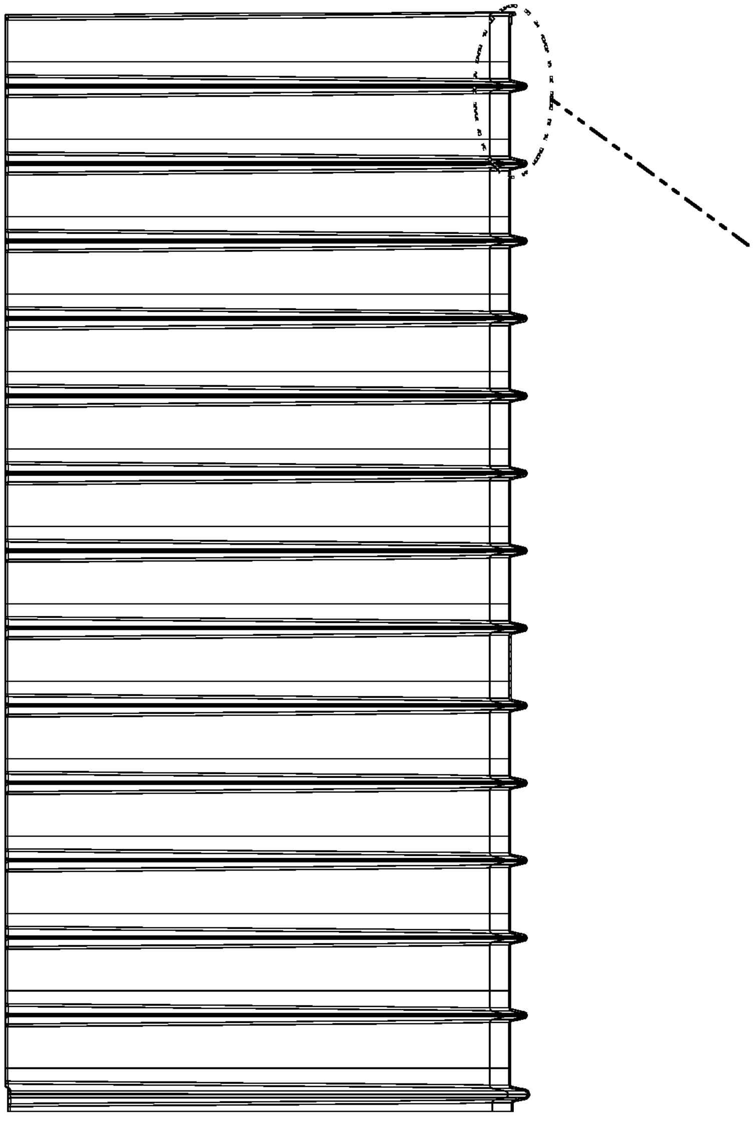
FIG. 10A illustrates a right cross-section view of one embodiment of a window well with a reinforced top lip.
Figure 10B:
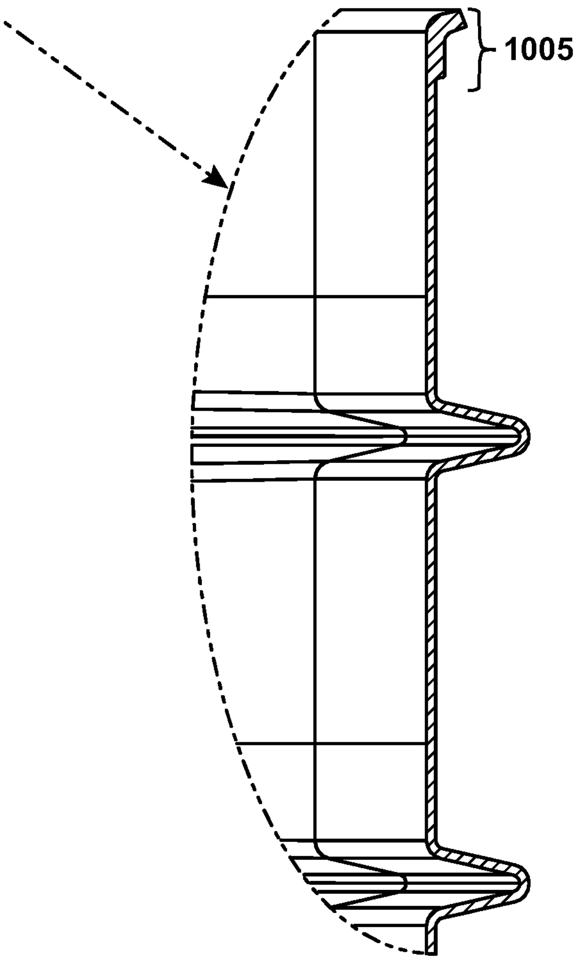
FIG. 10B illustrates a detailed view of the cross-section of the top lip of the window well of FIG. 10A.

Additionally, in some embodiments the top lip of the window well is reinforced. For example, FIGS. 10A and 10B illustrate one embodiment of a window well with a reinforced (i.e., thicker) top lip 1005. The reinforced top lip 1005 protects the window well from impact damage during transportation and installation. Additionally, the reinforced top lip 1005 increases the overall durability of the window well. In some embodiments, the reinforced top lip 1005 is 20% to 100% thicker than the non-reinforced portions (i.e., the regular wall thickness). Additionally, in some embodiments, the reinforced top lip 1005 is 40% to 60% thicker than the non-reinforced portions and even more preferably 50% thicker. However, in some instances the reinforced lip 1005 is less than 20% thicker or more than 100% thicker than the non-reinforced portions.

Figure 10C:
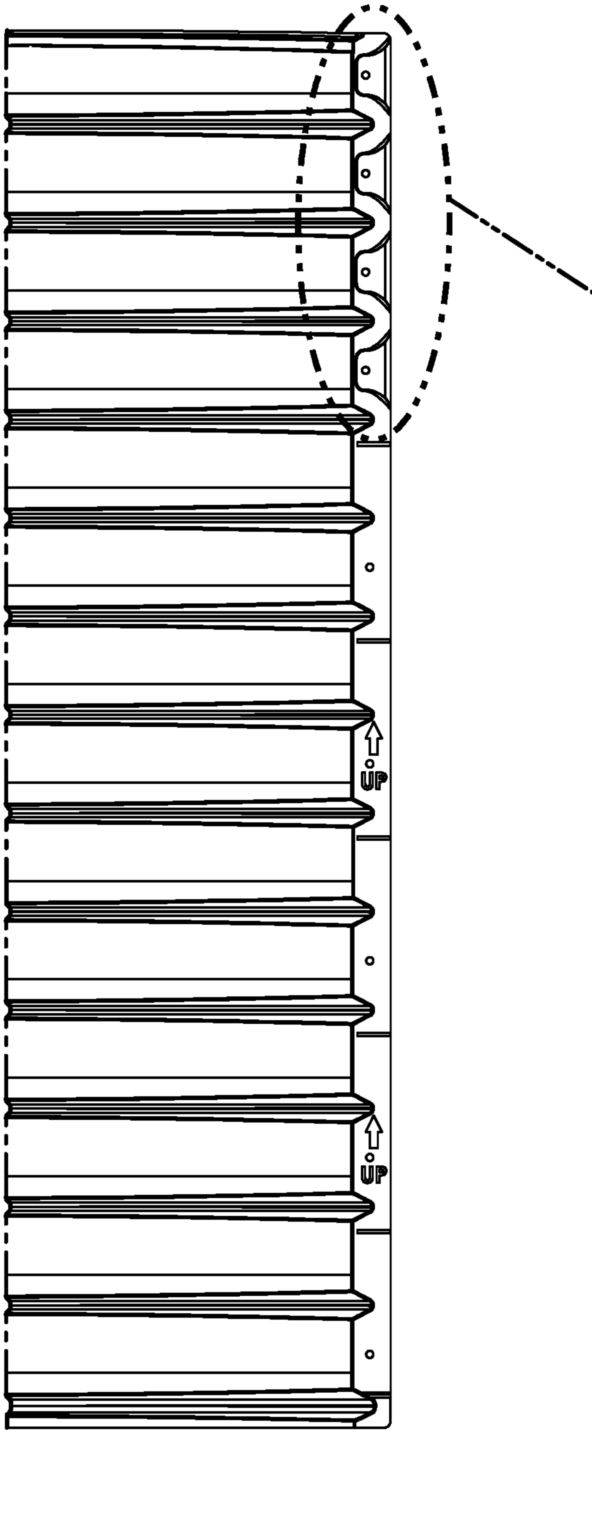
FIG. 10C illustrates a partial back view of one embodiment of a window well with reinforced attachment holes.
Figure 10D:
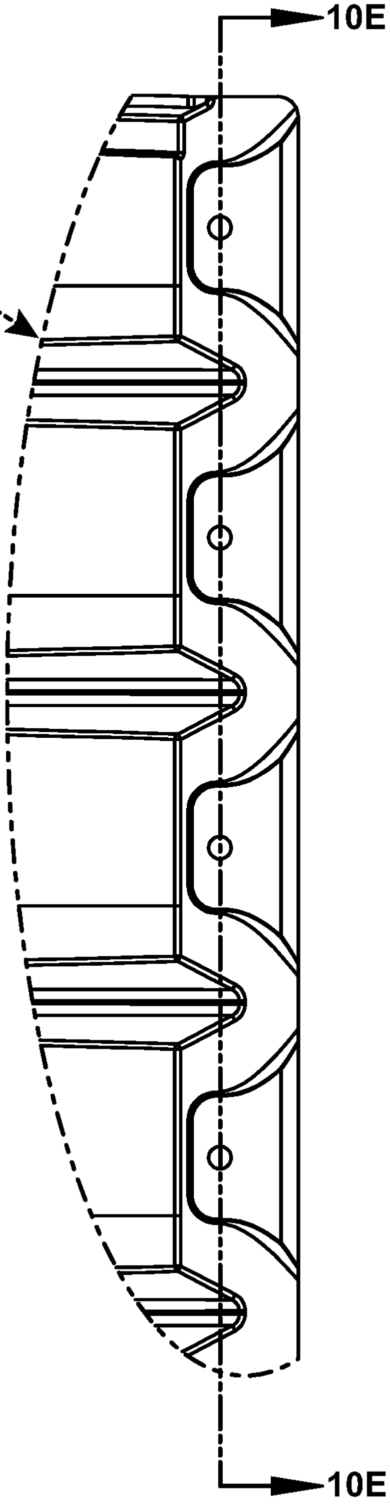
FIG. 10D illustrates a detailed view of the reinforced attachment holes of the window well of FIG. 10C.
Figure 10E:
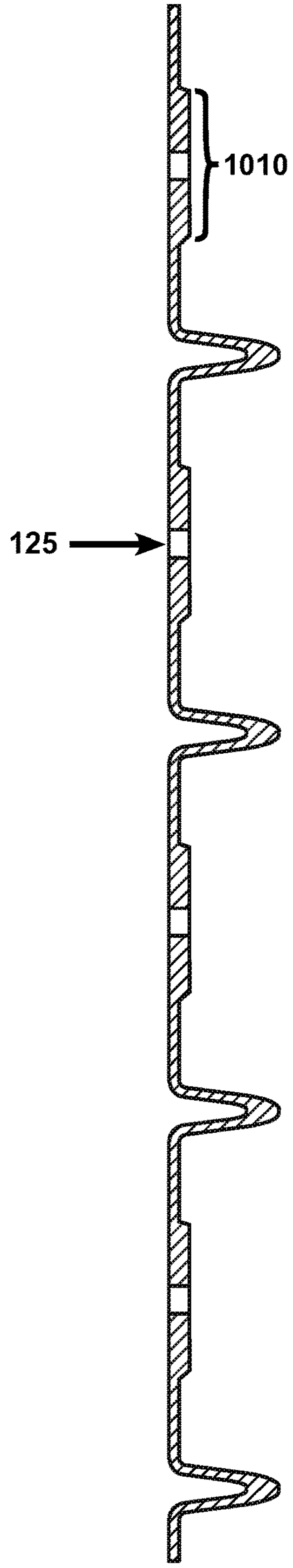
FIG. 10E illustrates a cross-section view of the reinforced attachment holes of the window well of FIG. 10C.

In some embodiments, the region around the attachment holes can also be reinforced. For example, FIGS. 10C, 10D and 10E illustrate one embodiment of a window well with reinforced (i.e., thicker) regions 1010 that surround the attachment holes 125. The reinforced regions 1010 (i.e., the wall immediately surrounding the attachment holes 125) are 20% to 100% thicker than non-reinforced regions. Additionally, in some embodiments, the reinforced regions 1010 are 40% to 60% thicker than the non-reinforced regions and even more preferably 50% thicker. However, in some instances the reinforced regions 1010 are less than 20% thicker or more than 100% thicker than the non-reinforced regions.

Figure 11:
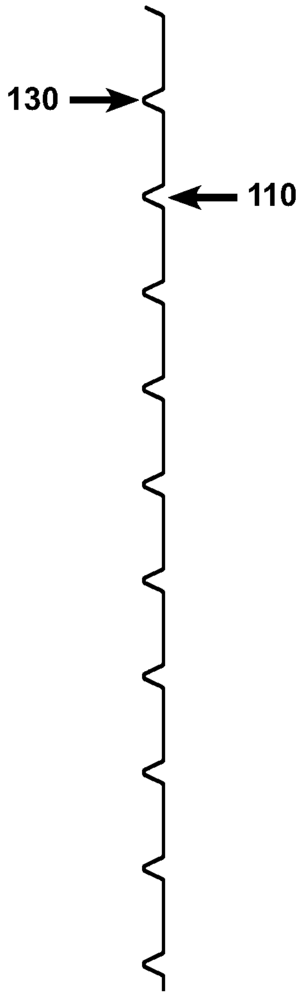
FIG. 11 illustrates a partial cross-section near the terminal end of the window well of FIG. 4.
Figure 12:
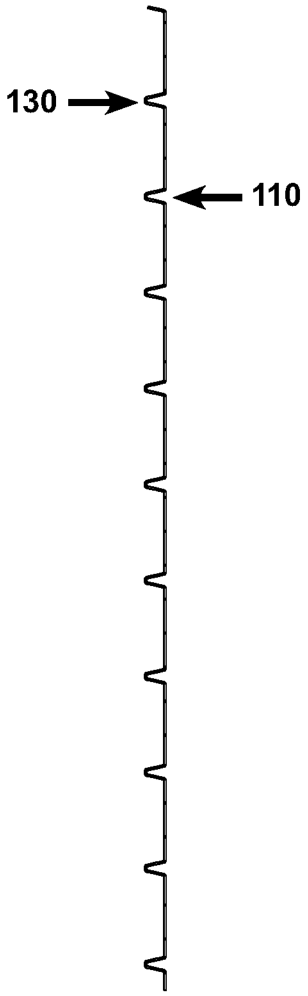
FIG. 12 illustrates a partial cross-section of the centermost portion of the window well of FIG. 4.

In some instances, the grooves 110 vary in height and depth throughout their length and may have different dimensions as described below. In the illustrated embodiment, the grooves 110 expand from the center (i.e., the position between the two outer edges of the window well) of the groove 110 (see FIG. 12) to the terminating ends of the groove 110 (see FIG. 11, which is a cross-section near but not at a terminating end).

This configuration can increase the strength of the ribs 130 and improve the molding of the window wells. The variability in height of the grooves 110 may be greater than 1 mm, 2 mm, 3 mm, 4 mm, 5 mm, 6 mm or more than 6 mm, from a smallest height dimension to a greatest height dimension, of the variable height along a single groove 110 length. In some embodiments, the variability in depth may be greater than 1 mm, 2 mm, 3 mm, 4 mm, 5 mm, 6 mm or more than 6 mm, from a smallest depth dimension to a greatest depth dimension, of the variable depth along a single groove 110 length.

However, in some embodiments the grooves 110 maintain a constant height and depth throughout their length. In other words, the cross-section would remain the same throughout the window well's entire length.

Additionally, the varying height, depth and shape of the grooves 110 and ribs 130 improves the stacking ability of the window wells. The wall angles of the window wells also improve the stacking ability of the window wells. Therefore, the amount of window wells that can be transported on a single pallet is increased. In some embodiments, the ribs 130 of the lightweight and durable window well are manufactured with draft angles which prevent the window wells from binding together when stacked. Therefore, the draft angles of the ribs 130 facilitate the unpacking of window wells from a pallet. The increase efficiency in the packing, transporting and unpacking of the window wells can significantly reduce manufacturing and shipping costs.

In some alternative embodiments, the grooves maintain a constant height and/or depth. For instance, the fixed depth may be a depth of 1 mm, 2 mm, 3 mm, 4 mm, 5 mm, 6 mm, 7 mm or more than 7 mm. Likewise, the fixed height may be a height of 2 mm, 3 mm, 4 mm, 5 mm, 6 mm, 7 mm or more than 7 mm.

Additionally, in some embodiments, the grooves have a flared portion 210, see FIGS. 2 and 3, at the terminal ends of the grooves. More particularly, the height and the depth of the groove substantially increases at the terminal ends of the grooves (i.e. each groove expand more dramatically the last 5-10 cm of each side of the groove). In embodiments with flared portions, the variability in height of the grooves within the flared portions may be greater than 1 mm, 2 mm, 4 mm, 6 mm, 8 mm or more than 8 mm. Similarly, in embodiments with flared portions, the variability in depth of the grooves within the flared portions may be greater than 1 mm, 2 mm, 4 mm, 6 mm, 8 mm or more than 8 mm. However, in some embodiments, there are no flared portions at the end of the grooves.

In some embodiments, the flared portions have a fastening mechanism to facilitate stacking and transportation. For example, in FIGS. 2 and 3, the flared portions 210 have tabs 305 within the inner rib surface (e.g., along the groove) and slots 205 along the outer rib surface that snap into a friction fit with opposing slots/tabs positioned on the opposing rib surface of an adjacent window well. However, in some embodiments, the tabs are positioned along the outer rib surface, and the slots are positioned within the inner rib surface.

Additionally, some embodiments without flared portions also have a fastening mechanism (e.g., a protruding tab—not shown) along the grooves and/or ribs. In other embodiments, stacked window wells may be held together using a friction fit between the grooves and the ribs. Some embodiments use both a fastening mechanism and a friction fit to facilitate the stacking and transporting of window wells. Overall, the flared portions of the grooves can improve the aesthetics of the lightweight and durable window well, as well as improve the stacking ability of the window wells.

Figure 13:
FIG. 13 illustrates an exemplary acid-etched surface texturing that can be used for molds associated with the window wells of FIGS. 1 and 4.
Figure 14:
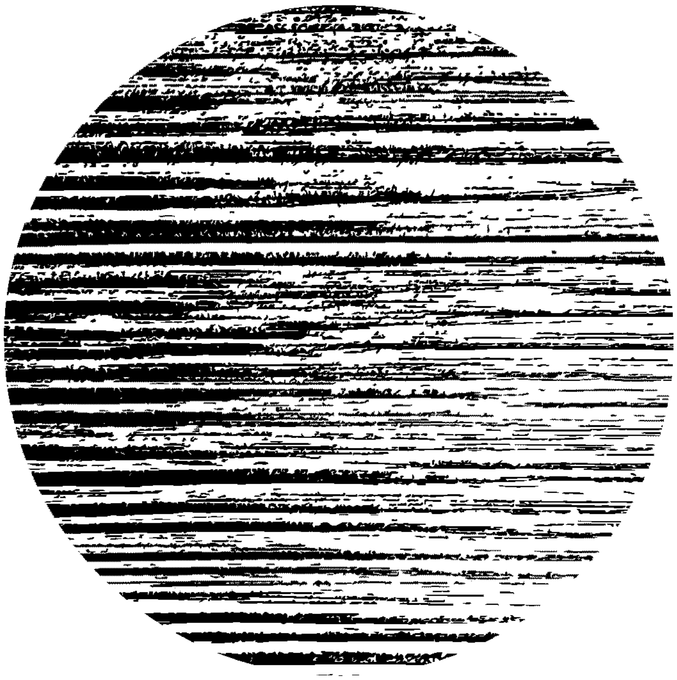
FIG. 14 illustrates an exemplary laser-etched surface texturing that can be used for molds associated with the window wells of FIGS. 1 and 4.

The aesthetics of the window well may also be improved by applying a texture or pattern to the surface of the window well. FIGS. 13 and 14 show examples of textures or patterns that can be added to the window well. More particularly, FIG. 13 illustrates an acid-etched texture with a horizontal grain, and FIG. 14 illustrates a laser-etched texture with a wave pattern.

The texture can be etched onto the surface of the mold and, thereby, into the window well when the window well is molded. The texture patterns can vary to accommodate different preference and structures (e.g., horizontal grain patterns, vertical grain patterns, wave patterns, symmetrical patterns and asymmetrical patterns).

In some embodiments, a fabric veil is used to increase the realism of a texture or pattern. For example, the realism and natural look of a stone texture can be improved by applying a multi-colored veil onto the window well. To apply the veil to the window well, the fabric veil is inserted into the compression mold before the window well is manufactured. In other words, the fabric veil is positioned within the mold on top of the heated fiber reinforced thermoplastic sheet. However, in some embodiments, the fabric veil is positioned within the mold below the heated fiber reinforced thermoplastic sheet. Then during the molding/compression, the multi-colored pattern is embedded into the texture of the window well. The fabric veil can also be used to achieve other natural/organic looks such as wood, marble and granite textures.

This process of using a fabric veil can be particularly beneficial for blocking unsightly fibers and to provide more control over the final aesthetics that are presented as the exterior of the window well. Additionally, the texture minimizes minor blemishes that are caused by the molding/compression process. Overall, using a fabric veil can significantly add to the overall realism of the organic surface texturing caused by the mold (and/or subsequent acid etching or other finishing processes), which is typically difficult to achieve for thermoplastic materials, particularly those that are impregnated with fibers. The veil/fabric can also add additional strength and integrity to the final product. For example, the veil can increase the stiffness and durability of the window well. More details on the fabric veil will be provided later.

Manufacturing Process for the Lightweight and Durable Window Well

The lightweight and durable window well is manufactured using a two-part mold, and one or more sheets of plastic. In some embodiments, the window well is manufactured using one or more sheets of fiber reinforced thermoplastic.

Figure 15:
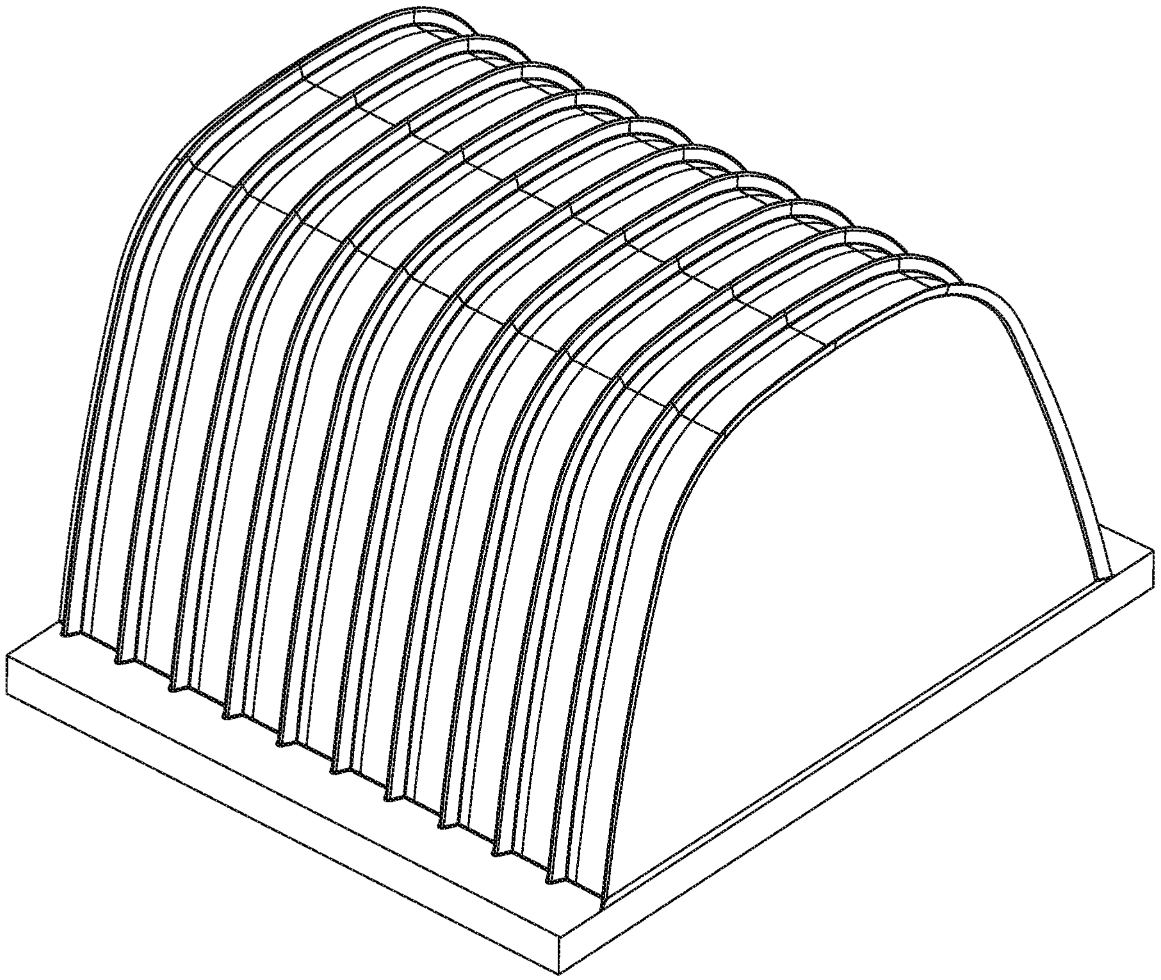
FIG. 15 illustrates a male mold used to create the window well of FIG. 4.
Figure 16:
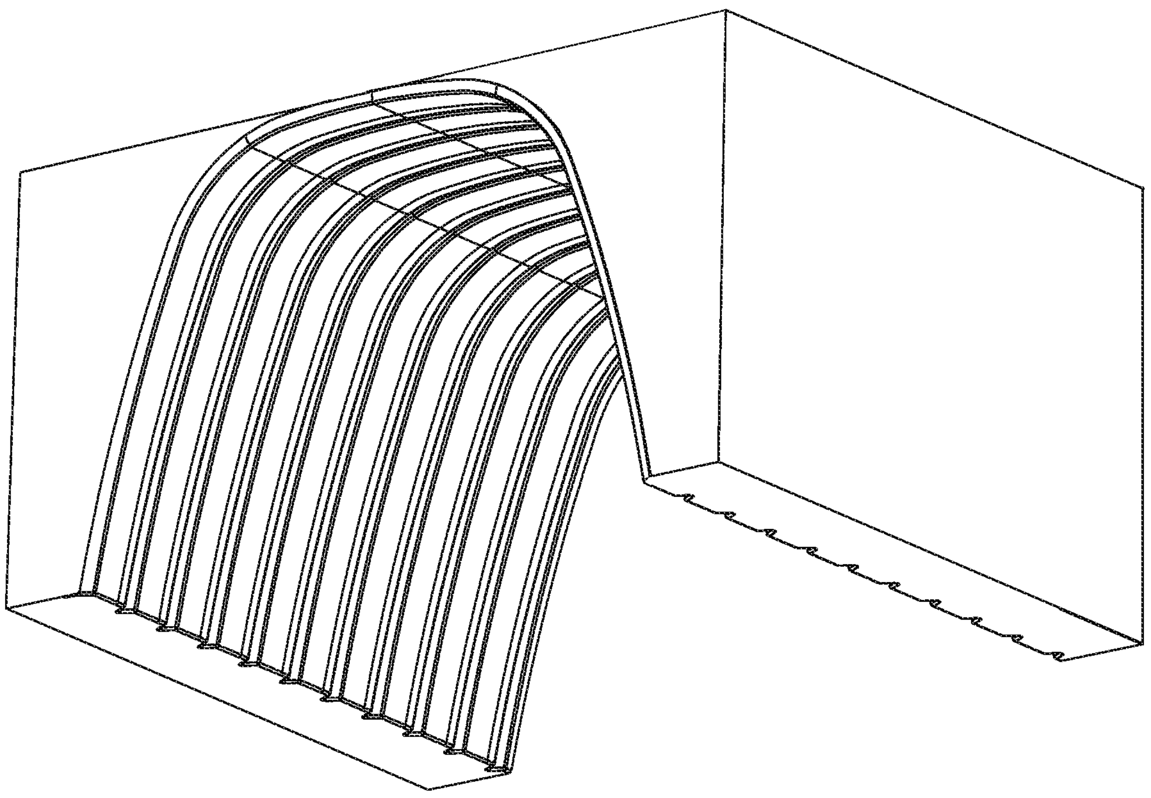
FIG. 16 illustrates a female mold used to create the window well of FIG. 4.

FIG. 15 illustrates the male mold 1500 and FIG. 16 illustrates the female mold 1600. Both illustrated molds are made of aluminum. However, some embodiments may use molds of a different material (e.g., steel, composite, etc.). Additionally, in some embodiments, the molds have guide pins (not shown) to ensure that the two molds align during compression.

In some embodiments, the molds are designed so that the window well has varying wall thickness. For example, in some embodiments the wall will be thicker in the ribbed areas and thinner in the non-ribbed areas. In other words, in some embodiments, the wall is thickest at the ribs and/or the portions of the wall near the ribs. In some instances, the wall surface portions near the ribs are thicker than parts of the wall surface portions that are furthest from the ribs, such as the wall surface portions that are centrally positioned between the ribs.

It should be noted that in order to create the ribs on the window well, the mold also needs to have ribbing. Furthermore, some embodiments require additional material (e.g., additional strips of reinforced thermoplastic) to be placed at the ribs of the mold. The varying wall thickness allows the window wells to be strong while also being lightweight. The varying wall thickness also allows the molding process to be more efficient, such as by allowing the fiber reinforced plastic (and particularly the long fibers) to flow through the mold more efficiently during the molding process.

In alternative embodiments, the mold is configured with ribs and spacing that cause the molded window well to have a uniform thickness throughout the body, grooves and/or ribs. Additionally, in some embodiments, the mold is configured to make a window well with a height of 2 m, 3 m or more than 3 m. The window well can then be cut to produce two or three window wells. For example, a window well with a height of 3 m can be cut into two window wells (e.g., a 2 m window well and a 1 m window well). However, it should be noted that the steps and methods for producing the window wells are the same or similar regardless of the size of the window well.

Figure 17:
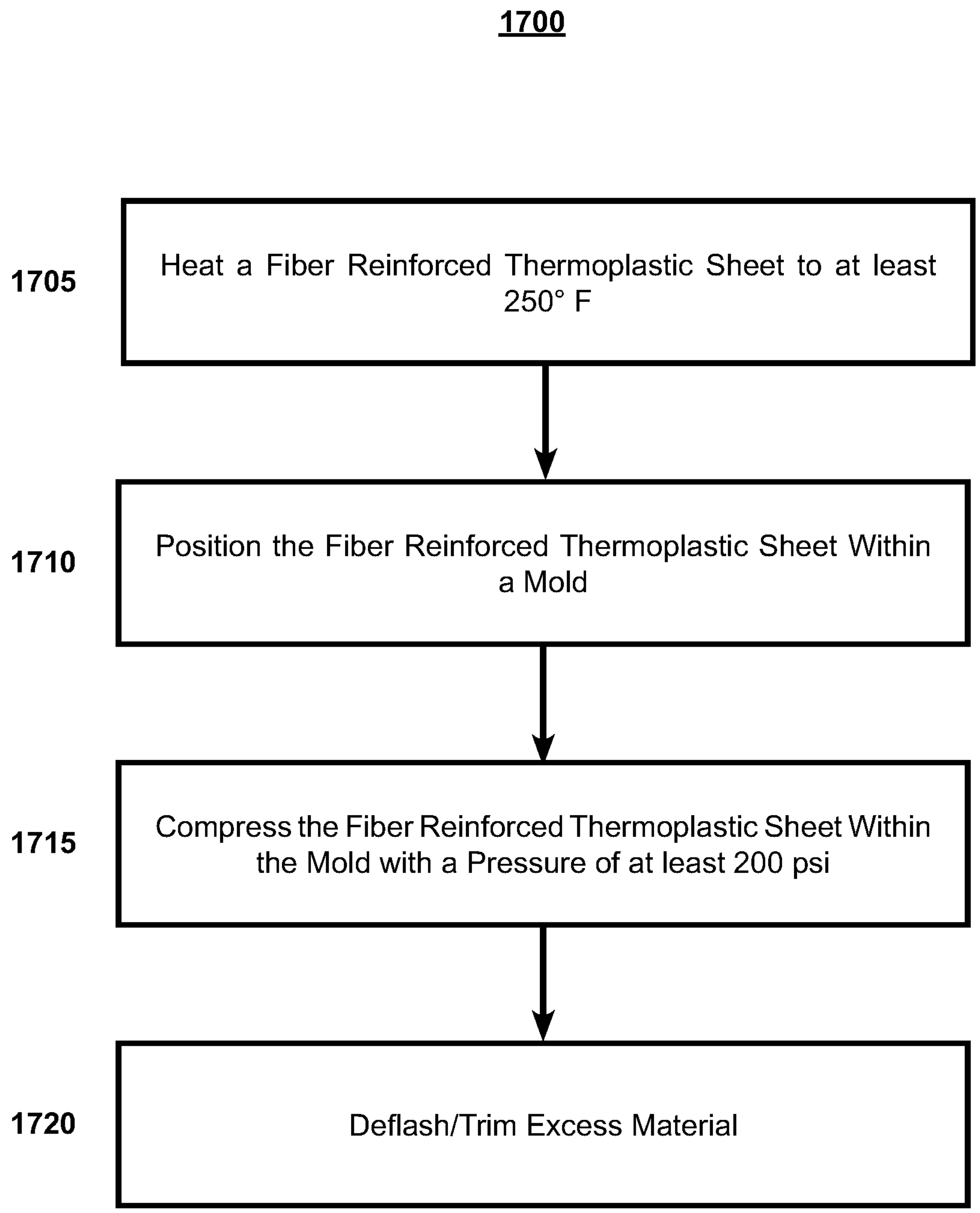
FIG. 17 illustrates a flowchart of a method for manufacturing the window wells of FIGS. 1 and 4.

FIG. 17 illustrates a flow chart of an exemplary method for producing the lightweight and durable window well. In the first step 1705, fiber reinforced thermoplastic sheets are heated to a relatively high temperature (e.g., greater than 250° F. and, in some instances, to above 300° F.). In some embodiments, the sheets of fiber reinforced thermoplastic are heated to temperatures of about 385° F. or, in some embodiments, above 385° F. prior to or during the compression.

When the sheets of reinforced thermoplastic are heated, the sheets loft up or expand from about 3.8 mm to a thickness of about 5 mm (e.g., greater than 10%, greater than 15%, greater than 20% or more than a 20% increase in sheet thickness). Using lofted sheets increases the quality of the lightweight and durable window well by allowing the thermoplastic to have increased flow once it is placed on the mold.

In the next step 1710, the heated fiber reinforced thermoplastic sheet or sheets are placed in the mold. If a fabric veil is being used, then the fabric veil is placed into the mold on top of the heated fiber reinforced thermoplastic sheet or sheets.

In some embodiments of step 1710, the fabric veil is placed into the mold before the heated thermoplastic sheet or sheets. In such embodiments, after placing the veil into the mold, the heated thermoplastic sheet is then placed into the mold on top of the veil.

Then, for both embodiments (with the veil placed over or under the thermoplastic sheet(s)), the heated fiber reinforced sheet or sheets are compressed between the male mold 1500 and the female mold 1600 (step 1715).

In some embodiments, the window wells are molded and compressed with pressures ranging from 200 psi, or about 200 psi, to 900 psi, or about 900 psi, for a duration of between 30 seconds (or about 30 seconds) and up to 60 seconds (or about 60 seconds), and even more preferably within a range of between 300 psi and 800 psi for a duration of 30-60 seconds. Additionally, in some embodiments, the pressure is between 300 psi and 400 psi. In other embodiments the pressure is less than 200 psi or more than 800 psi. The duration may also be less than 30 seconds or more than 60 seconds. The compression causes the sheet or sheets of reinforced thermoplastic to take the shape of the mold.

During molding, the male mold 1500 and/or the female mold 1600 may be heated or cooled during the molding/compressing processes. In some embodiments, the molds are heated during some parts of the molding/compressing process and cooled during other parts of the process. However, in some embodiments, the molds are neither heated nor cooled, such as when molding thermoset plastics.

In some embodiments, thermoset plastic (e.g., high impact polystyrene) is used for the lightweight and durable window well. In some thermoset manufacturing methods, the first step is to place a fabric veil into a male mold. However, in some embodiments, the fabric veil is placed into a female mold.

After the veil has been placed into the mold, one or more fiberglass sheets are placed over the veil. In embodiments that do not use a veil, the one or more fiberglass sheets are placed directly onto the mold. It should be noted that neither the veil nor the fiberglass sheets need to be preheated. However, in some embodiments, the fiberglass sheets are preheated.

Once the veil and the one or more fiberglass sheets have been placed onto the mold, the veil and fiberglass sheets are vacuum sealed against the mold. Thus, the veil and fiberglass sheets are forced into the shape of the mold. In some embodiments, a vacuum bag is used to create the vacuum seal.

After the vacuum seal is created, a thermoset resin is drawn into the molding chamber. In some embodiments, the thermoset resin is pulled into the mold by the vacuum. Alternatively, the resin may be pushed into the mold using a pump. Additionally, some embodiments use both a vacuum and a pump. In some embodiments, the thermoset resin is heated before it enters the molding chamber.

Once the thermoset resin enters the molding chamber, the resin saturates the one or more fiberglass sheets and veil simultaneously and begins to cure. More specifically, the thermoset resin begins to harden and the polymer chains in the resin begin to cross-link with one another. During this process, the veil and fiberglass sheets are permanently bonded to the resin and to each other. Additionally, in some embodiments, the curing process is an exothermic reaction and does not require any external heating.

In some embodiments, the curing process takes less than 6 hours. However, in other embodiments, the curing process takes less than 24 hours. Additionally, the curing process can be accelerated by adding external heat. Thus, in some embodiments, the curing process is sped up using infrared lights or some other heating device.

As discussed above, it should be noted that the window well may be formed from a single sheet of material. In other embodiments, the window well is formed, during molding, from multiple different sheets of material that are positioned adjacent each other on the mold and that are molded/compressed into each other during the molding process.

In other embodiments, the window well is formed, during molding, from multiple different sheets of material that are stacked or overlapped such that a portion of one sheet overlaps at least a portion of another sheet on the mold and that are molded/compressed into each other during the molding process. In other words, some embodiments require the user to place multiple heated sheets of fiber reinforced thermoplastic within the mold. This may be beneficial, for example, when a single sheet is not large enough to cover an entire mold and/or for facilitating the apportionment of additional material to the rib sections, by positioning/layering strips of additional material where the ribs are formed, such that that ribs are composed of stacked layers (2 or more) of thermoplastic material.

In some embodiments, the window well is also deflashed/trimmed after compression to remove any excess material (see Step 1720). However, in some embodiments the part may be molded to near net shape on all sides. Additionally, in some embodiments, the window well coloring is controlled by color pigments added to the plastic/fibers used in the reinforced thermoplastic. However, in some embodiments, the window well is painted after molding.

Modular Insert

The exemplary method in FIG. 17 can also be used to produce a lightweight and durable modular insert. Thus, the modular insert can be produced from the same material that is used for the lightweight and durable window well, such as long fiber reinforced thermoplastic or long fiber reinforced thermoset plastic. For example, in some embodiments, the modular insert is manufactured from long fiber reinforced polypropylene.

Furthermore, in some embodiments, at least some of the fibers within the long fiber reinforced thermoplastic or thermoset plastic are omnidirectional and have a length greater than 5 mm. Similarly, some embodiments use thermoplastic reinforced with at least some fibers that have a length greater than 20 mm, 40 mm or 60 mm or even 100 mm.

Although it is preferable to have fibers that are greater than 40 mm long for enhanced strength, it has been found that the benefits of the disclosed invention are also achieved using fibers lengths of less than 40 mm. The benefits of the disclosed inventions can even be achieved using fibers less than 5 mm in length. It should be noted that using shorter fibers increases the flow of materials during molding. In some instances, the modular window well has different fiber lengths in different body portions. For example, the central portions of the body can have shorter fibers for increased flowability while the outer portions/edges of the modular insert can have longer fibers for increased strength. Additionally, in some embodiments, a fabric veil is used to give the modular insert a more realistic or natural look.

In some embodiments, the modular insert is used alongside a window well. For example, a modular insert can be used to increase the height of a lightweight and durable window well. Additionally, a modular insert can be used to repair a damaged window well. Further details on the installation methods of the modular insert will be provided later.

Figure 18:
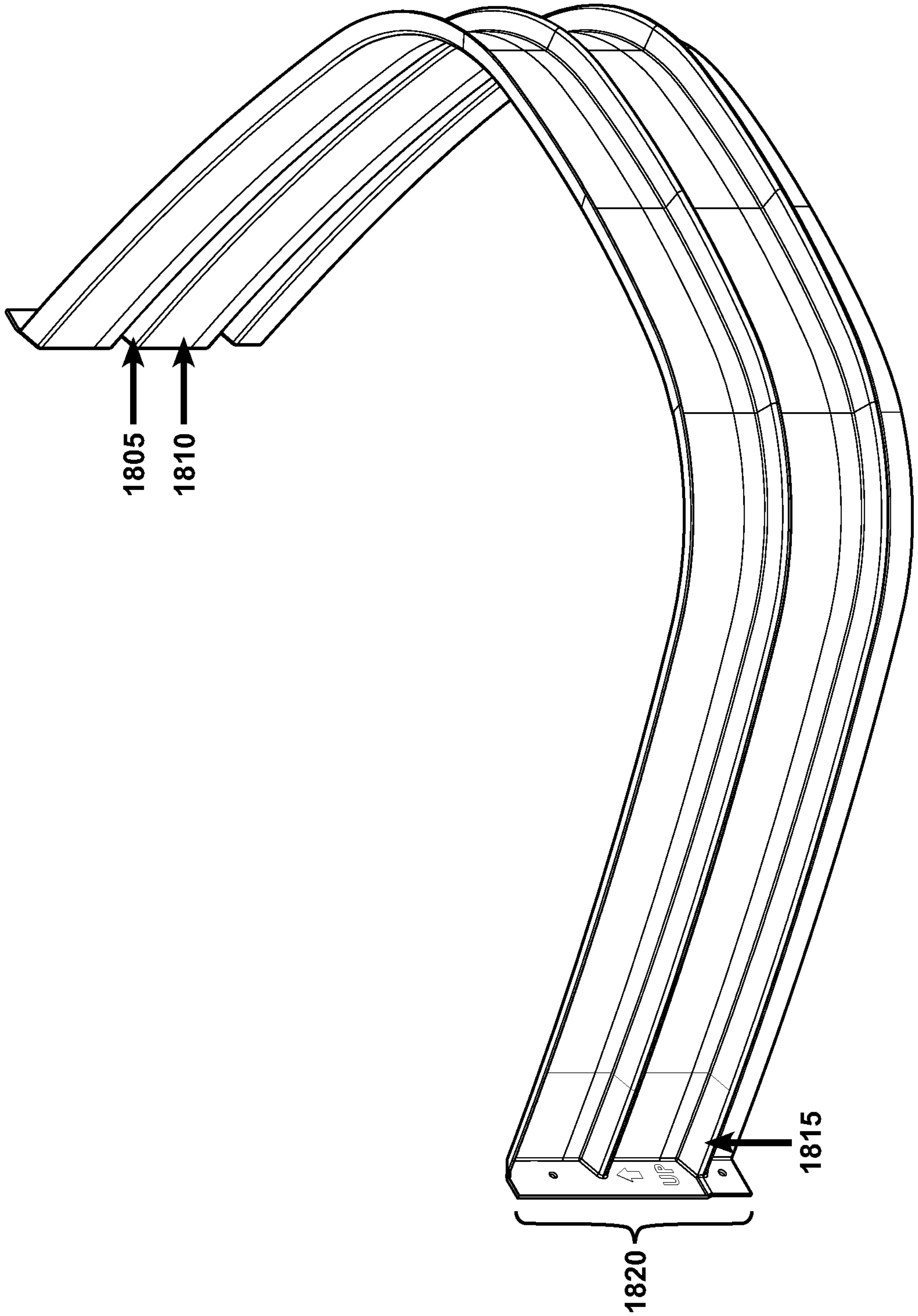
FIG. 18 illustrates a perspective view of the back of an exemplary modular insert.
Figure 19:
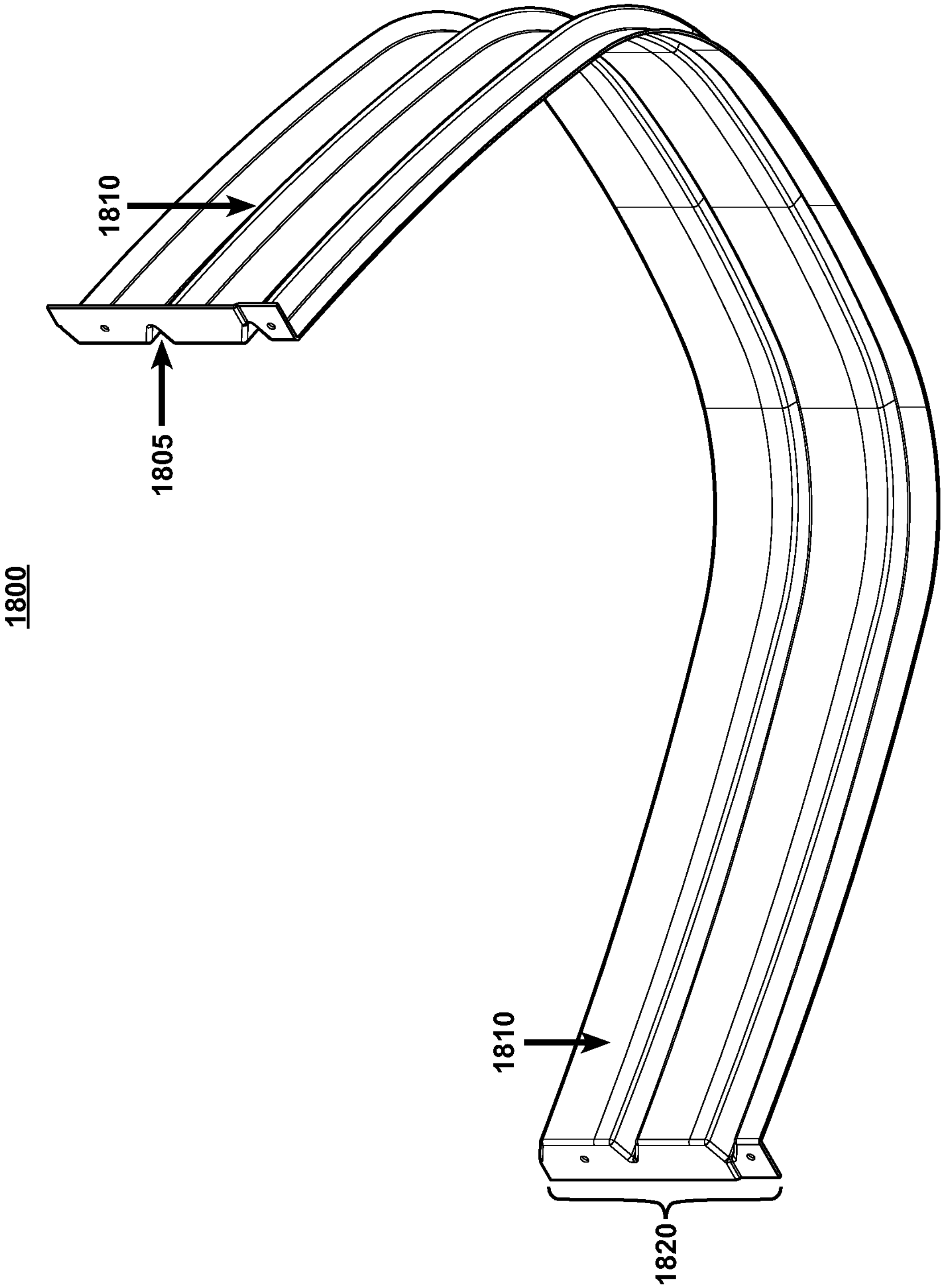
FIG. 19 illustrates a perspective view of the front of the modular insert of FIG. 18.

FIGS. 18 and 19 illustrate perspective views of a modular insert 1800. The modular insert 1800 has the same general shape and design of the main window well, but with fewer grooves 1805, wall surface portions 1810 and ribs 1815. In the present embodiment, for example, the body 1820 of the modular insert 1800 includes two ribs 1815 and three wall surface portions 1810. In other words, the body 1820 of the modular insert 1800 has a plurality of ribs 1815 interposed between a plurality of wall surface portions 1810. Additionally, some embodiments of a modular insert may have more than two ribs, grooves and wall surface portions. Similarly, some embodiments of a modular insert may have fewer than two ribs, grooves and wall surface portions.

Figure 20:
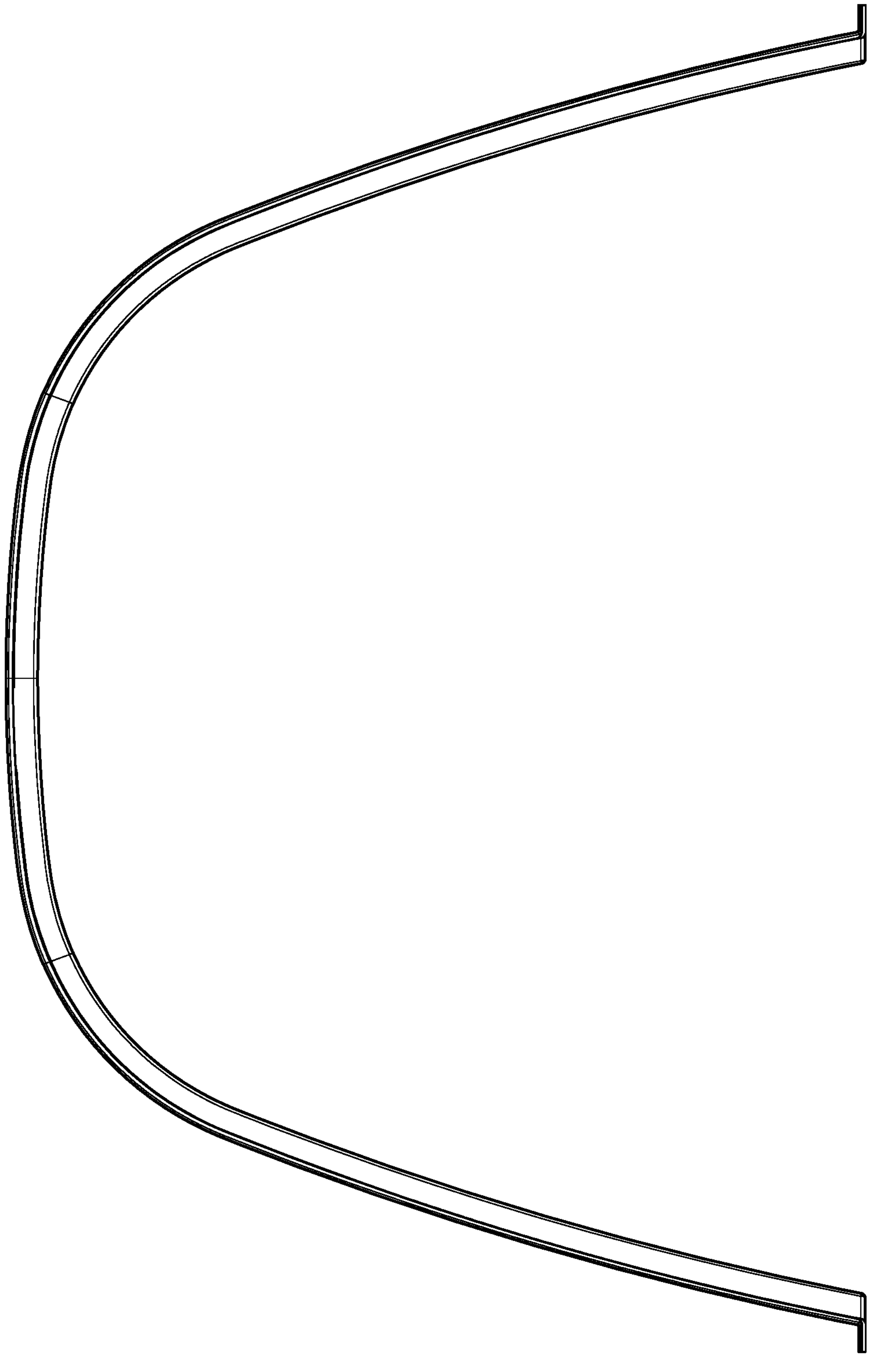
FIG. 20 illustrates a top view of the modular insert of FIG. 18.
Figure 21:
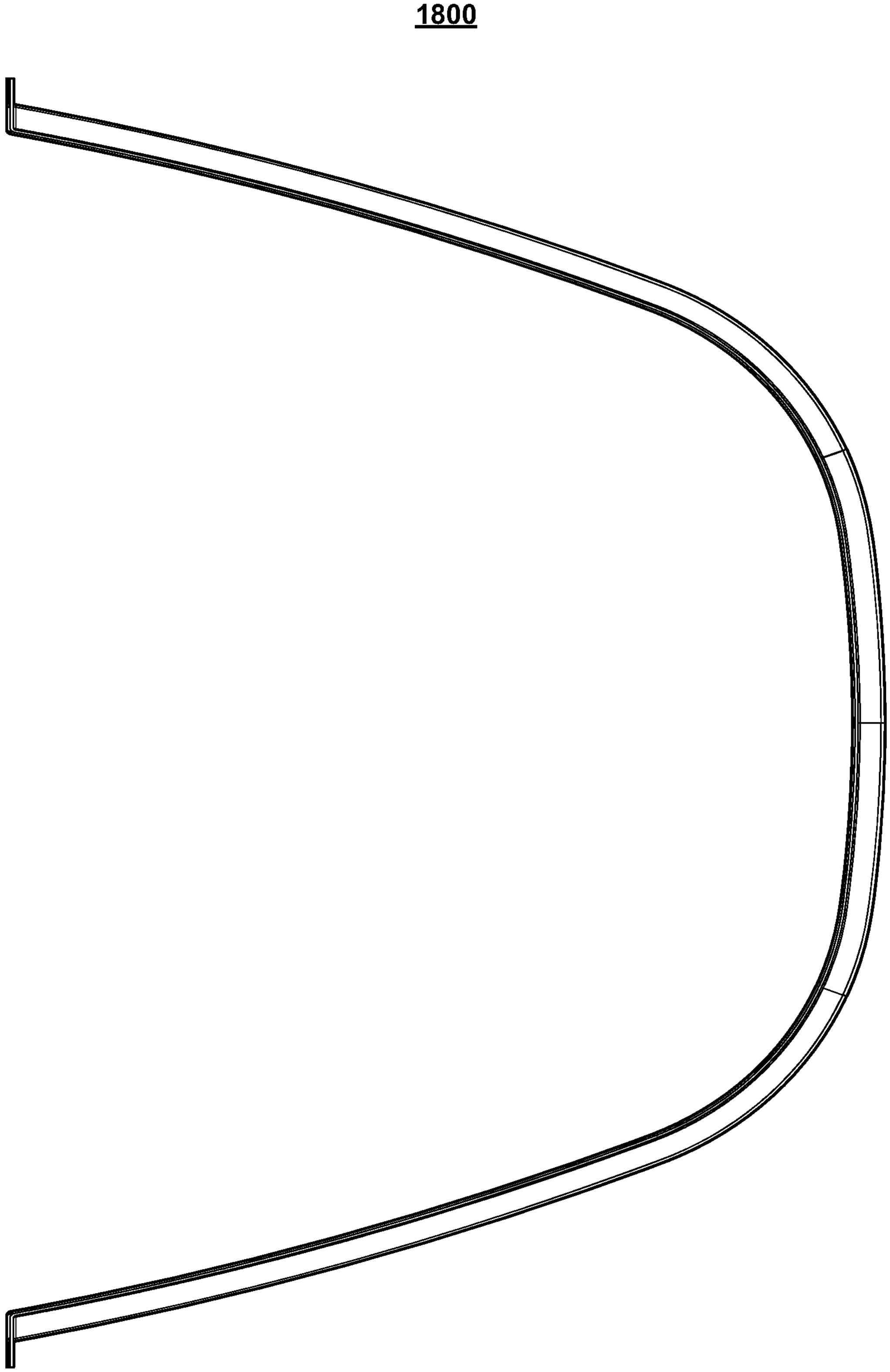
FIG. 21 illustrates a bottom view of the modular insert of FIG. 18.

FIGS. 20 and 21 illustrate a top and bottom view, respectively, of the modular insert 1800 and illustrate the generally U-shaped body 1820 of the modular insert 1800. However, some embodiments of the modular insert have bodies that are a different shape in order to match the shape of the lightweight and durable window well. In other words, the body of the modular insert can be a wall of any shape that retains backfill soil (e.g., square, rectangular or circular/curve shaped).

Figure 22:
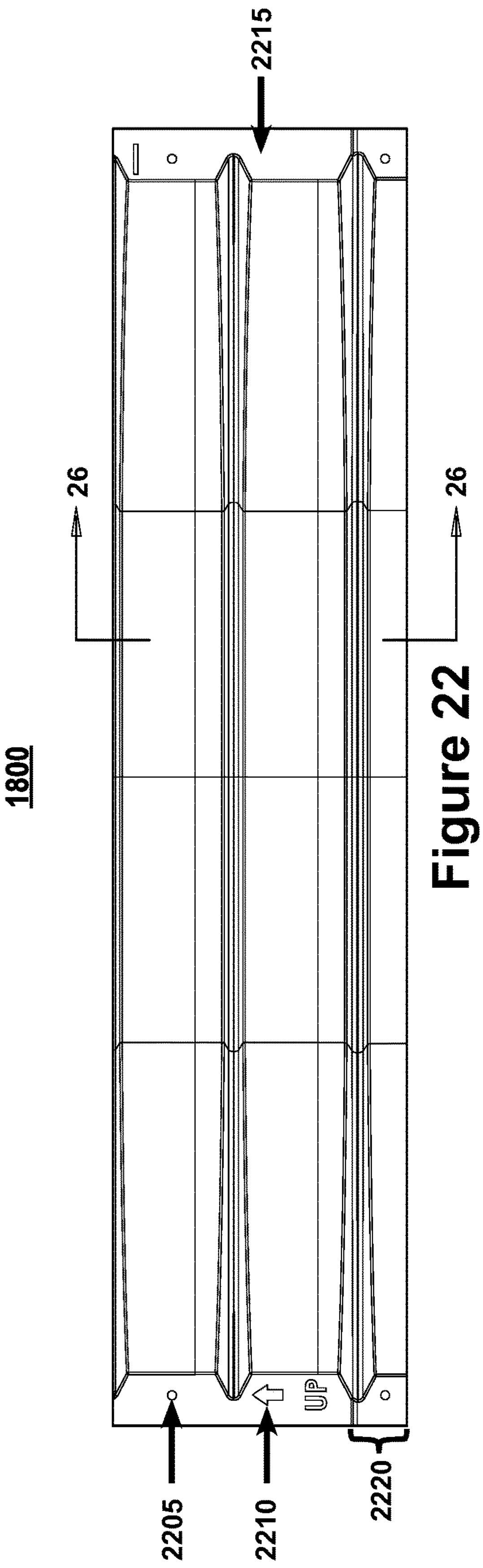
FIG. 22 illustrates a back view of the modular insert of FIG. 18.
Figure 23:
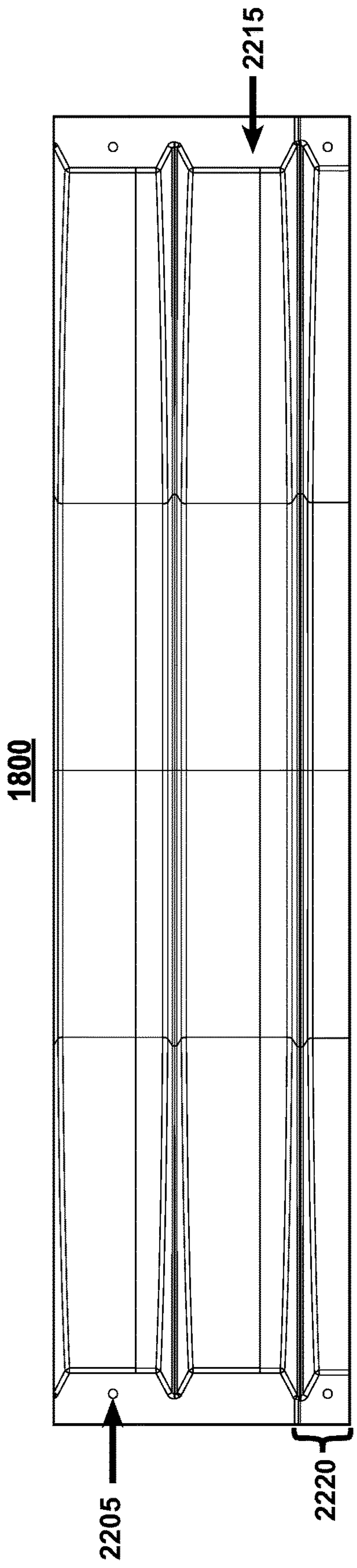
FIG. 23 illustrates a front view of the modular insert of FIG. 18.

FIGS. 22 and 23 illustrate a back and front view, respectively, of the modular insert 1800. Like the lightweight and durable window well, the modular insert 1800 has attachment holes 2205, directional indicators 2210 and flanges 2215. The attachment holes 2205 and the directional indicators 2210 facilitate proper placement during installation by helping a user correctly orient the modular insert 1800. However, some embodiments of the lightweight and durable modular insert do not have attachment holes or directional indicators.

During installation, the attachment holes 2205 of the modular insert 1800 align with the attachment holes of a lightweight and durable window well (e.g., 125 of FIG. 1). In other words, one or more of the modular insert's 1800 attachment holes 2205 align with one or more of the window well's attachment holes when the modular insert 1800 is mated to the window well. Therefore, a user can mate the modular insert to a window well by inserting a fastener (e.g., a bolt or screw) through the aligned attachment holes and into a structure.

However, in some embodiments, the attachment holes of the modular insert and the window well do not align. Thus, in some embodiments, a user will need to add additional attachment holes (e.g., with a drill) that allow fasteners to go through both the modular insert and the window well. Further details on the fastening methods of the modular insert will be provided later.

In some embodiments, the modular insert 1800 also has a recessed section 2220. One purpose of the recessed section 2220 is to facilitate the mating of the modular insert 1800 and the lightweight and durable window well. In other words, the recessed section 2220 allows the modular insert 1800 to be installed to a window well in a close sliding fit.

The recessed section 2220 has a greater depth than the rest of the modular insert 1800. It should be noted that the depth is measured from the front of the planar flanges to the furthest point on the back of the ribbing. In other words, the recessed section 2220 is not flush with the rest of the flange 2215 but instead is more towards the back of the ribbing.

In some embodiments, the recessed section 2220 is recessed by the amount necessary for the modular insert 1800 to slide in behind the window well. For example, if a window well has a wall thickness of 3 mm, then the recessed section 2220 would have an added depth of about 3 mm. Similarly, if a window well has a wall thickness that varies (see FIG. 10), then the added depth of the recessed section 2220 would match the window well's variations in wall thickness. Therefore, the added depth of the recessed section 2220 allows a user to place a modular insert 1800 flush behind a window well without having to modify either the modular insert 1800 or the window well.

In other words, the added depth of the recessed section 2220 may vary to accommodate different needs and preferences, from 1 mm to 2 mm, 3 mm, 4 mm, 5 mm, 6 mm, 7 mm or more than 7 mm. Additionally, in some embodiments, the added depth of the recessed section 2220 varies from 2-5 mm (furthest from the ribs) to 5-8 mm (nearest the ribs).

Figure 24:
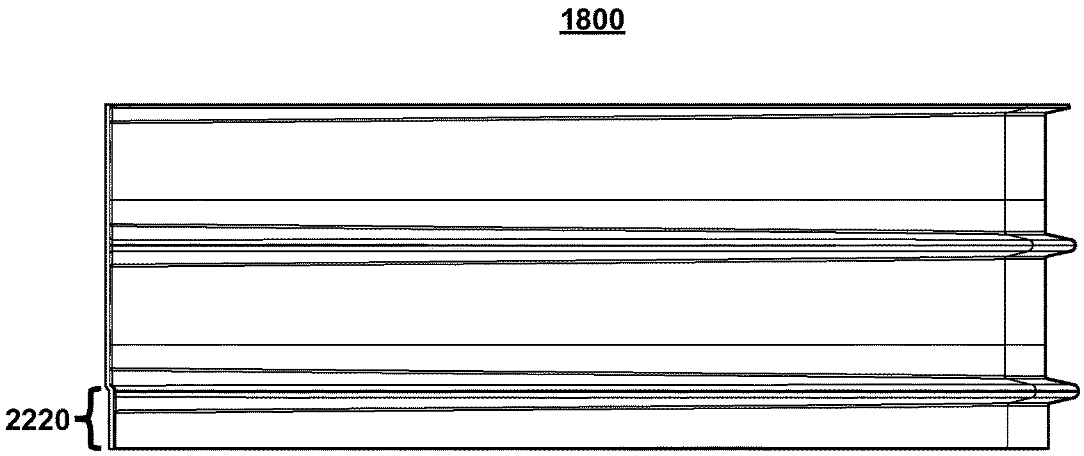
FIG. 24 illustrates a right-side view of the modular insert of FIG. 18.
Figure 25:
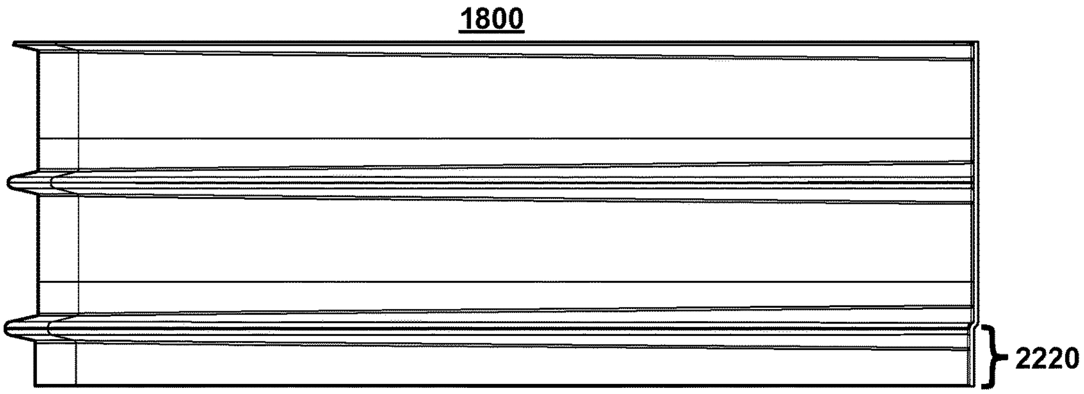
FIG. 25 illustrates a left-side view of the modular insert of FIG. 18.

FIGS. 24 and 25 illustrate a right and left view, respectively, of the modular insert 1800. They also illustrate another view of the recessed section 2220. The height of the recessed section may vary to accommodate different needs and preferences, from 2 cm, 5 cm, 7 cm, 10 cm, 12 cm, 15 cm, 25 cm or more than 25 cm. Similarly, the height of the modular insert may vary to accommodate different needs and preferences, from 25 cm, 50 cm, 75 cm, 100 cm, 125 cm, 150 cm or more than 150 cm.

In some embodiments, the height of the modular insert 1800 in relation to the height of a window well may vary to accommodate different needs and preferences, from ½ to ⅓, ¼, ⅕, ⅒ or less than ⅒ of the height of the window well that is being extended or repaired. Additionally, in some embodiments, the height of the modular insert 1800 in relation to the height of the window well may vary to accommodate different needs and preferences, from 75% to 60%, 50%, 30%, 25% or less than 25% of the height of the window well that is being extended or repaired.

Figure 26:
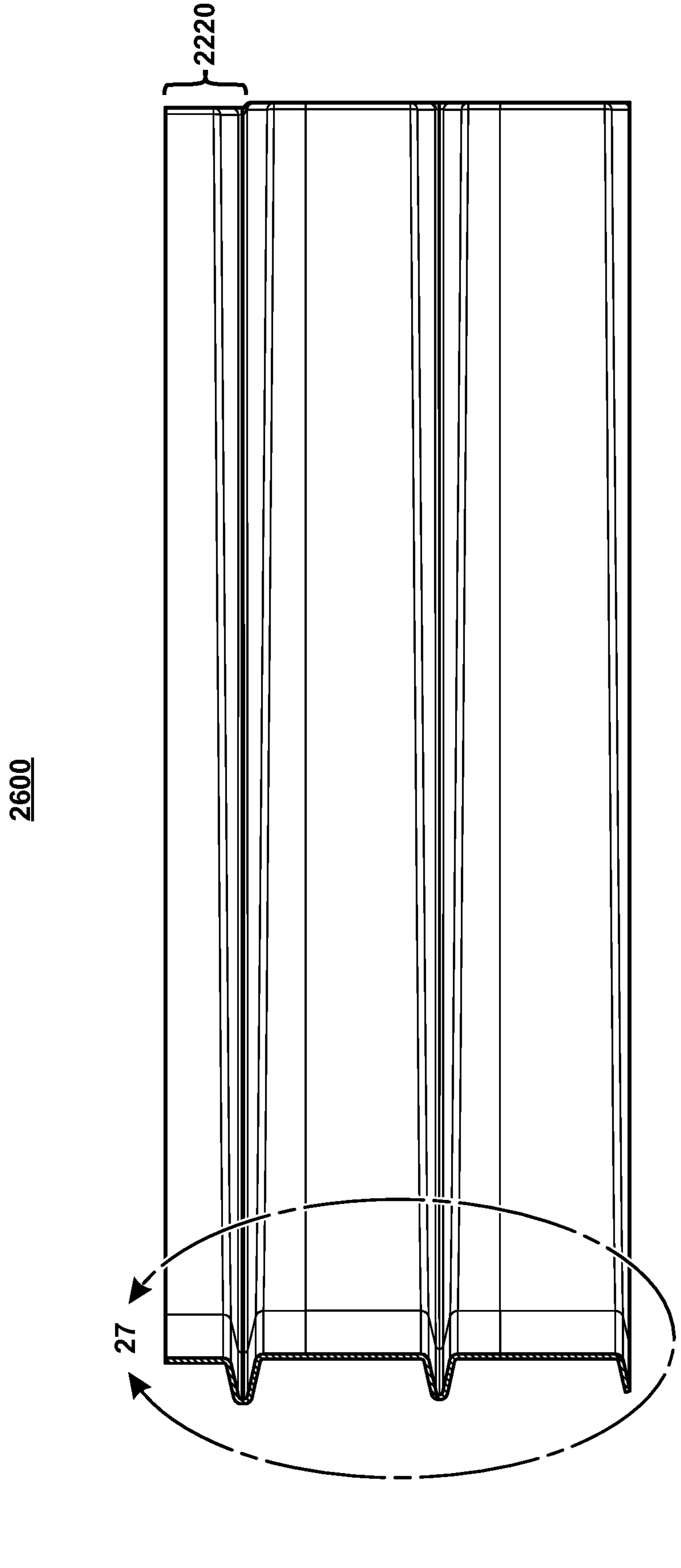
FIG. 26 illustrates a left-side view of the cross-section of an exemplary modular insert.

Additionally, FIG. 26 illustrates a left-side cross section of an embodiment of the modular insert 2600. In some embodiments, the recessed section 2220 runs across the top of the modular insert 2600. Thus, the modular insert 2600 may be installed and attached to the bottom of a window well, as oppose to the top of the window well. However, in other embodiments the modular insert has a recessed section on the bottom of the modular insert that mates to the top section of a window well.

In some embodiments, the modular insert has more than one recessed section. For example, some embodiments of the modular insert have recessed sections on both the top of the modular insert and the bottom of the modular insert. Thus, a user can attach the modular insert to two different window wells.

The modular insert can also be used to repair the middle portion of a window well. In other words, a user can remove the middle section of a window well (e.g., by cutting off the damaged portion) and replace the damaged portion with a modular insert. It should be noted that some embodiments of the modular insert are design to be attached at any rib. For instance, a user can cut off the top half of the window well and attach the modular insert onto the new top-most rib or half rib.

Additionally, in some embodiments, the modular insert does not have a recessed section. Thus, instead of using a recessed section to mate with the window well, the modular insert uses an interference fit and/or a friction fit to mate with the window well.

Figure 27:
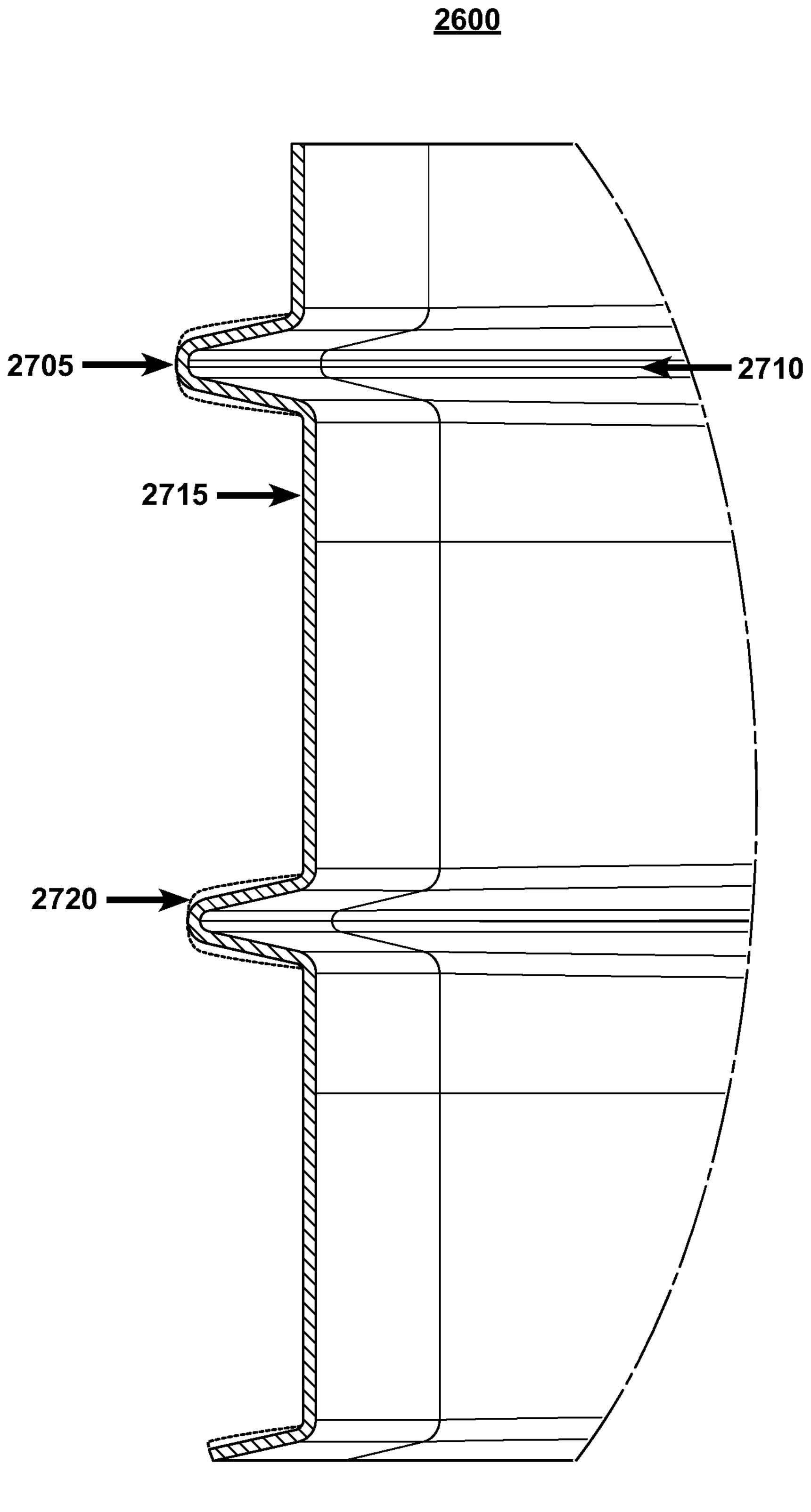
FIG. 27 is a close-up view of the region designated "27" in the cross-section view of FIG. 26.

FIG. 27 illustrates a close-up view of a cross section of the grooves 2710 and the ribs 2705 of the modular insert 2600. It should be noted that the shape and size of the grooves 2710 and ribs 2705 of the modular insert 2600 is the same as the shape and size of the grooves and ribs of the lightweight and durable window well (See FIGS. 11 and 12). Thus, in some embodiments, each rib 2705 is defined by a variable height and a variable depth.

Additionally, in some embodiments, the modular insert 2600 has a body with a varying wall thickness. For example, FIG. 27 illustrates both a wall with a constant thickness 2715 and, in dashed lines, a wall with varying thickness 2720. Additionally, in some embodiments the variable wall thickness of the body is thicker at the ribs than the wall surface portion. More particularly, the wall thickness may vary from 2-5 mm (furthest from the ribs) to 5-8 mm (nearest the ribs). Additionally, in some embodiments the variable wall surface portions have a variable thickness, varying from a minimal thickness of less than 3 mm to a maximum thickness of greater than 5 mm.

Figure 28:
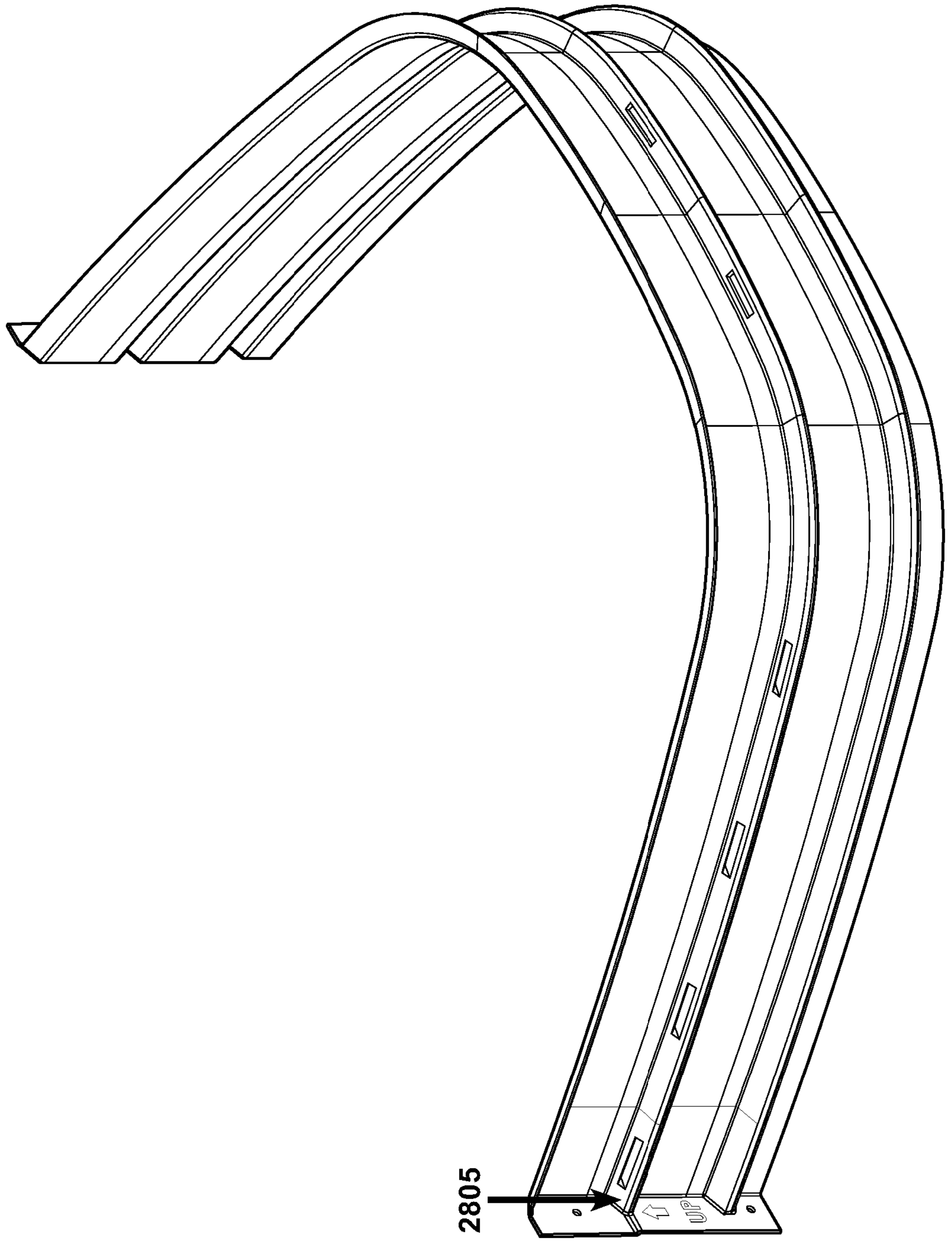
FIG. 28 illustrates a perspective view of the back of an exemplary modular insert that has slots and tabs.
Figure 29:
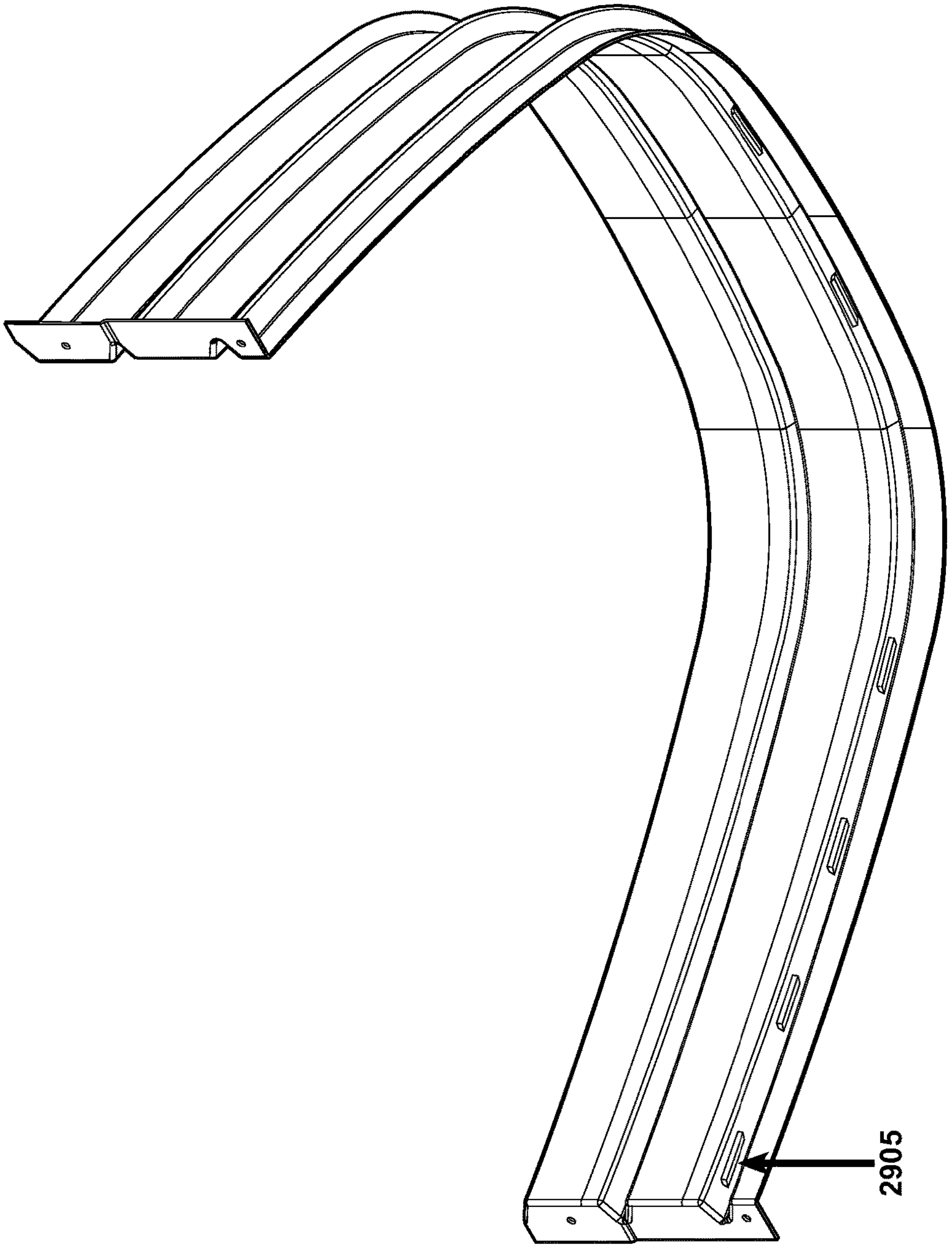
FIG. 29 illustrates a perspective view of the front of the modular insert of FIG. 28.

FIGS. 28 and 29 illustrate a perspective view of another embodiment of the modular insert 2800. In FIGS. 28 and 29, the modular insert 2800 has slots 2805 and tabs 2905. More specifically, the modular insert 2800 has six slots 2805 (two not shown) on the top side of the top rib. Similarly, the modular insert 2800 has six tabs 2905 (two not shown) on the top have of the bottom grooves. It should be noted that the number of tabs and slots may vary to accommodate different needs and preferences, from 1, 2, 3, 4, 5, 10, 15, 20 or more than 20 tabs and slots.

The tabs and slots may also be placed on any of the grooves and/or ribs. Additionally, multiple grooves can have tabs and/or multiple ribs can have slots. In some embodiments, all of the grooves have tabs and all of the ribs have slots. The position of tabs and slots can also be switched. In other words, the tabs can be place on the ribs and the slots can be placed in the grooves.

When the modular insert 2800 is attached to another modular insert 2800 the tabs 2905 insert the slots 2805. Thus, the modular inserts 2800 become interlocked with one another. In some embodiments, the slots 2805 and tabs 2905 create a friction fit (e.g., the tabs snap into place) when they interlock. Thus, a user does not need to use additional fasteners to install a modular insert 2800 to another modular insert 2800.

In some embodiments, a lightweight and durable window well has slots that correspond to the tabs on the modular insert 2800. Similarly, some embodiments of the lightweight and durable window well have tabs that correspond to the slots on the modular insert 2800. Thus, the modular insert 2800 can be attached to a lightweight and durable window well using tabs and/or slots. For example, in some embodiments, the tabs of the modular insert 2800 snap into the slots of the window well and create a friction fit when the modular insert 2800 is attached to the window well.

In some embodiments, the slots and tabs hold the modular insert 2800 in place while another fastening method is added. For example, in some embodiments, the slots and tabs align the modular insert with the window well while backfill soil is placed behind the modular insert. Then, a combination of the backfill soil and the friction fit of the tabs and slots fastens the modular insert to the window well.

In a similar embodiment, the tabs and slots are used to align the modular insert with the window well, but do not create a friction fit. Instead, the modular insert is fastened to the window well by placing bolts or screws into the modular insert's attachment holes. Regardless of the fastening method, the modular insert can be used to repair or extend the height of a window well.

Figure 30:
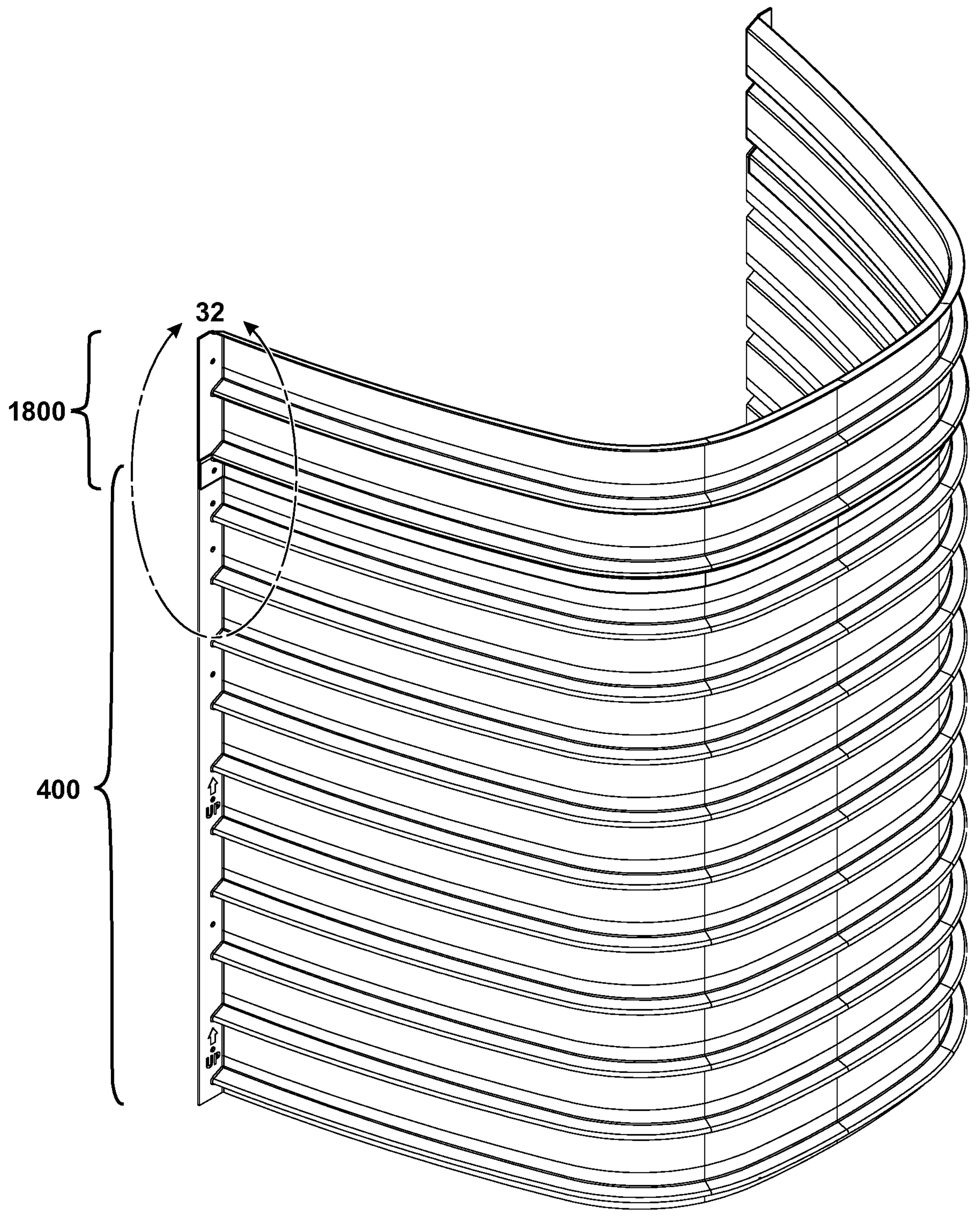
FIG. 30 illustrates a perspective back view of the window well of FIG. 4 with the modular insert of FIG. 18 attached to the top of the window well.
Figure 31:
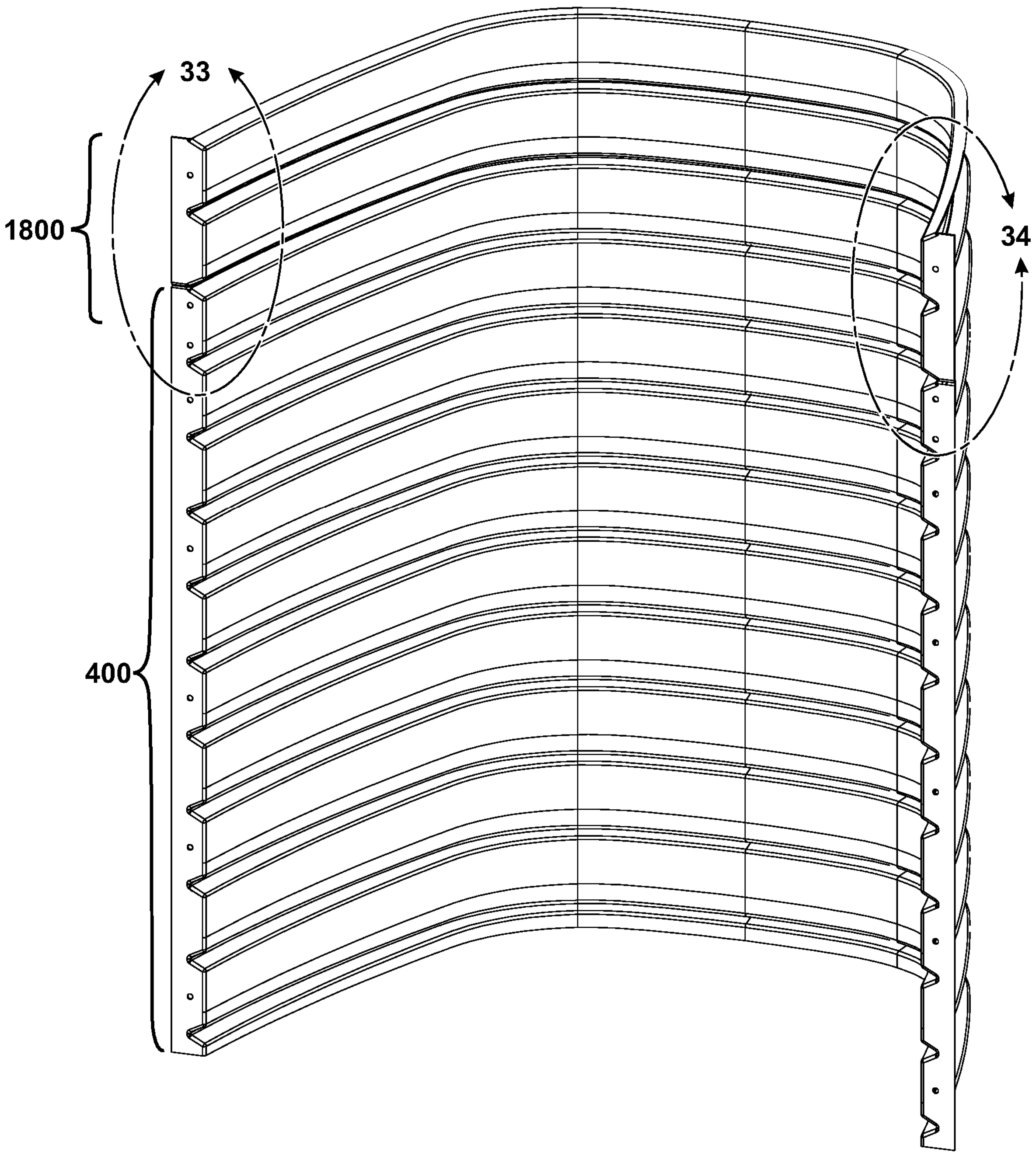
FIG. 31 illustrates a perspective front view of the window well of FIG. 4 with the modular insert of FIG. 18 attached to the top of the window well.
Figure 32:
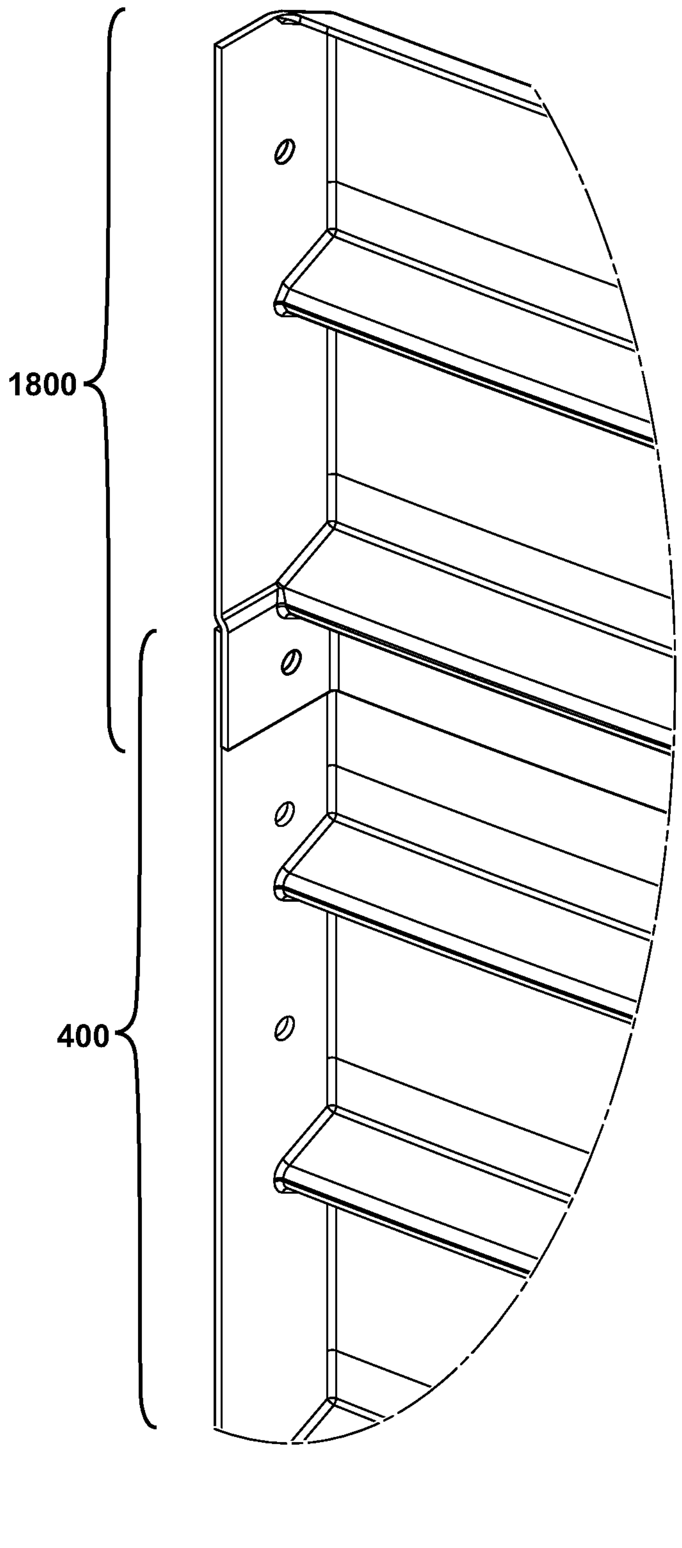
FIG. 32 is a close-up view of the region designated "32" in the perspective view of FIG. 30.
Figure 33:
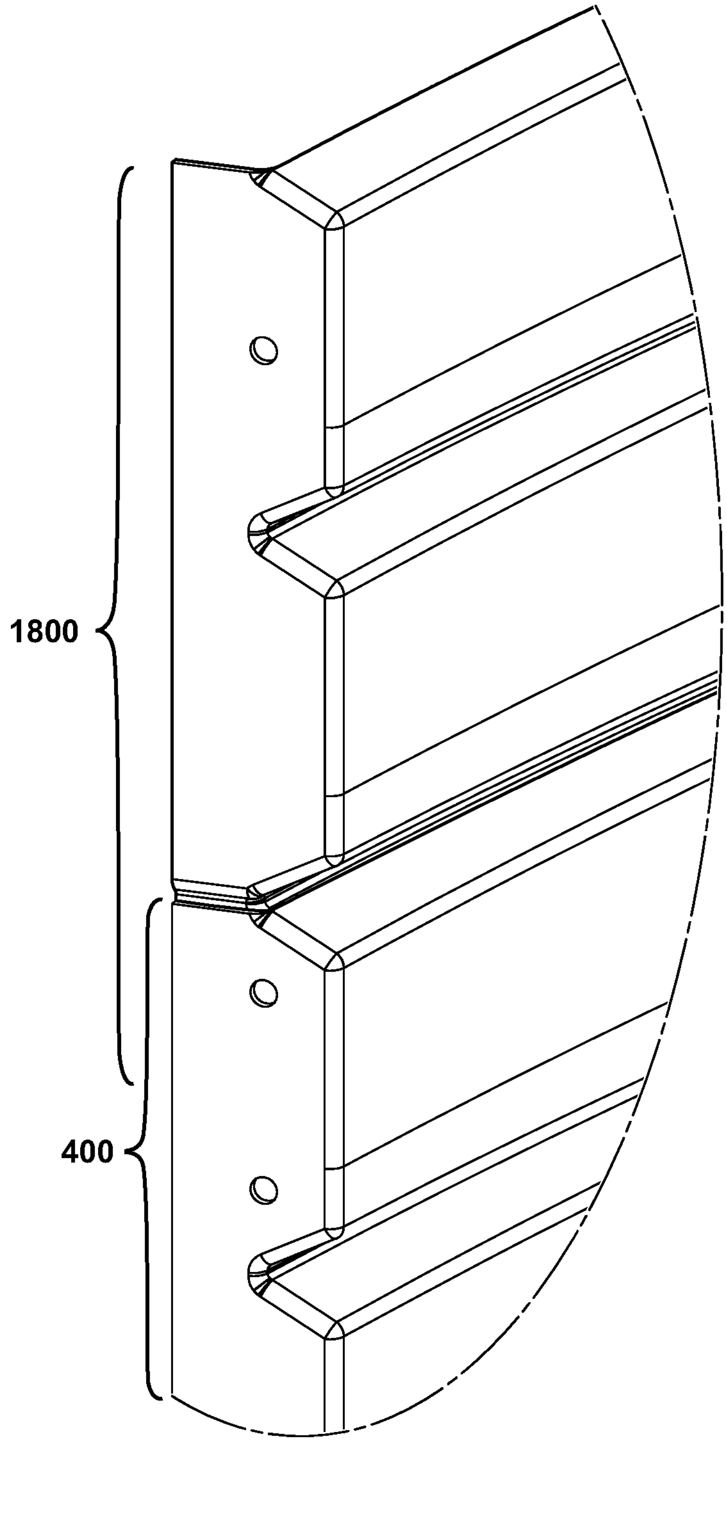
FIG. 33 is a close-up view of the region designated "33" in the perspective view of FIG. 31.
Figure 34:
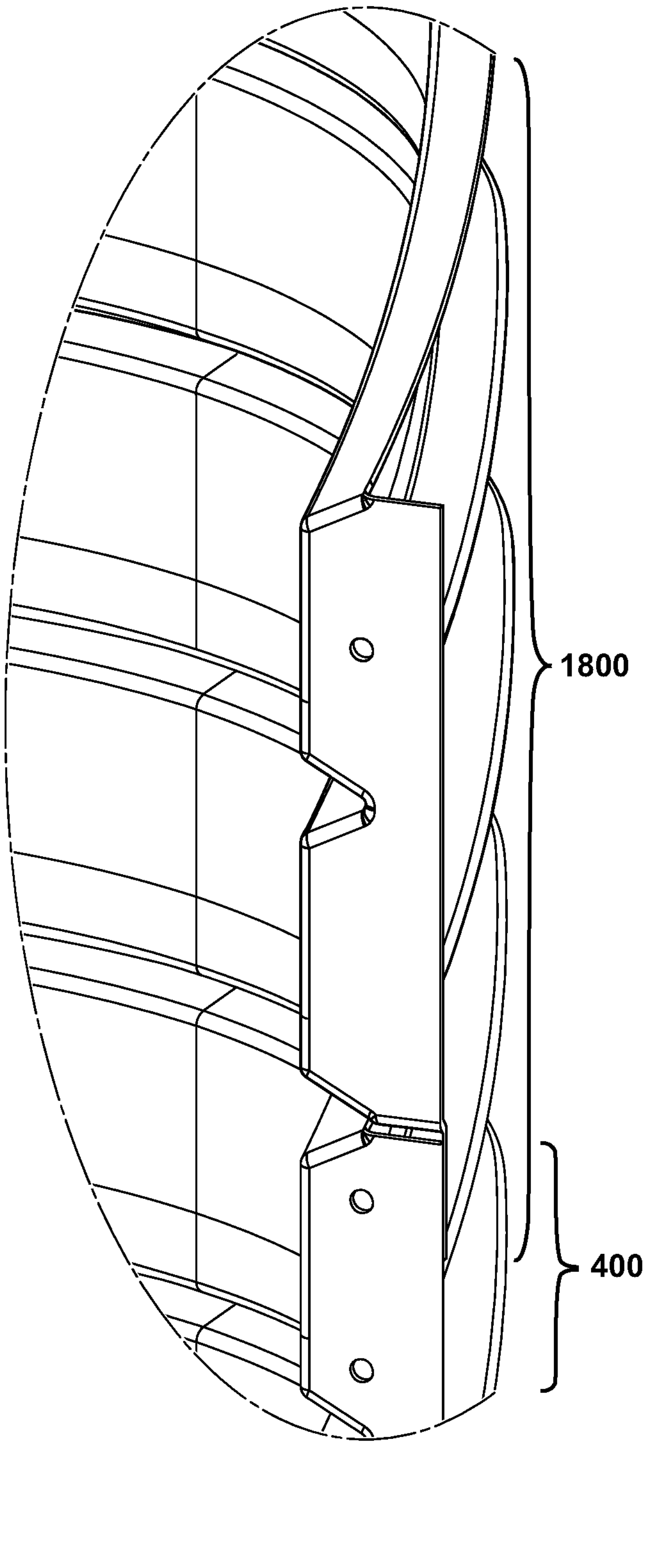
FIG. 34 is a close-up view of the region designated "34" in the perspective view of FIG. 31.

For example, FIG. 30 illustrates a back-perspective view of a lightweight and durable window well 400 that has the modular insert 1800 attached. Similarly, FIG. 31 illustrates a front-perspective view of the same window well 400 and modular insert 1800. Furthermore, FIGS. 32, 33 and 34 illustrate close-up views of the small seam between the modular insert 1800 and the window well 400. In some embodiments, when a modular insert 1800 is mated to a window well 400, the insert 1800 and the window well 400 create an almost seamless extended window well. In other words, a user would not be able to easily identify where the window well 400 ends and where the modular insert 1800 begins.

Figure 35:
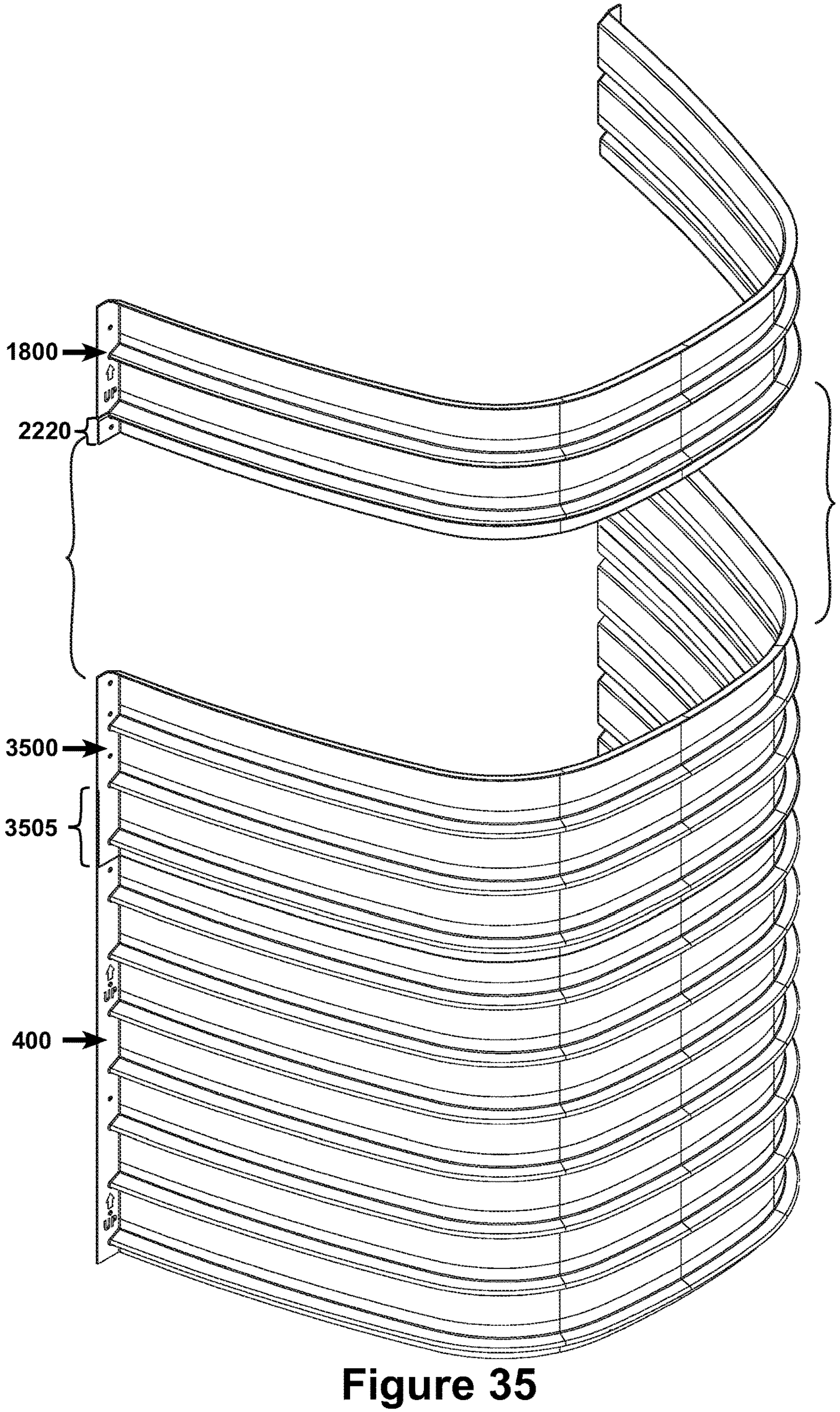
FIG. 35 illustrates a perspective back view of the window well of FIG. 4 that has one modular insert attached and another modular insert that may be attached to the first modular insert.

In some embodiments, multiple modular inserts may be attached to the window well. For example, FIG. 35 illustrates an example of a window well 400 configured with one attached modular insert 3500 positioned in attachment with the window well 400. Additionally, FIG. 35 illustrates a modular insert 1800 that may be attached to the middle modular insert 3500. It should be noted that the middle modular insert 3500 has a taller recessed section 3505 than the top modular insert's 1800 recessed section 2220.

Figure 36:
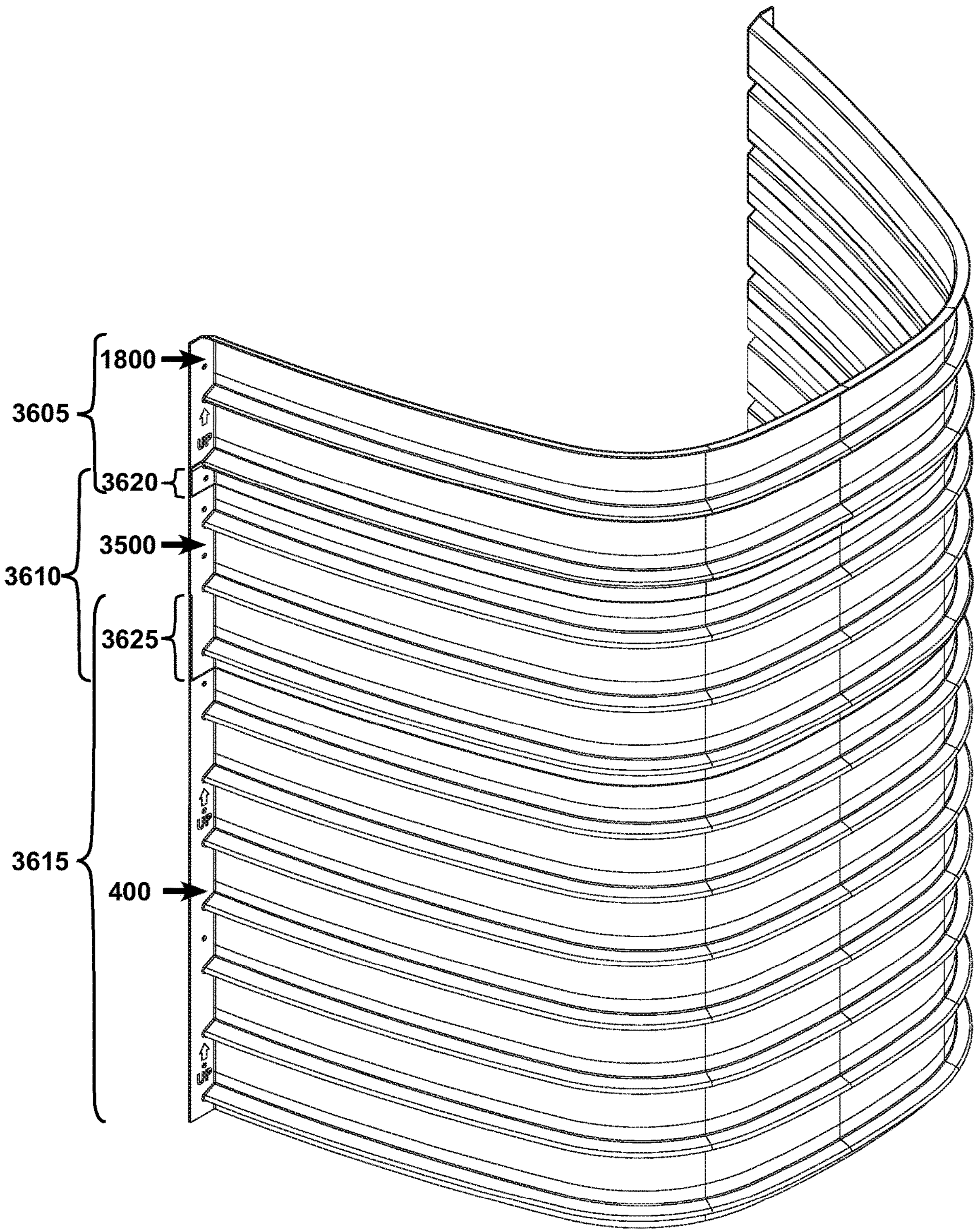
FIG. 36 illustrates a perspective back view of the window well of FIG. 4 that has two different modular inserts attached to the top of the window well.

FIG. 36 illustrates an example of a window well 400 configured with two attached modular inserts, 1800 and 3500, positioned in attachment with the window well 400. More particularly, the bottom of the modular insert 1800 is attached to the top of the modular insert 3500. Similarly, the bottom of the modular insert 3500 is attached to the top of the window well 400. It should be noted that a modular insert may also be attached to the bottom of the window well 400. Overall, the modular inserts allow for a high level of customizability and allows a user to adjust the height of a window well to his or her needs or preferences.

Additionally, the height of the window well 400 is reflected by the bracket 3615. Similarly, the height of the modular insert 3500 is reflected by the bracket 3610, and the height of the modular insert 1800 is reflected by the bracket 3605. It should be noted that the window well 400 and the modular insert 3500 overlap by the amount indicated by bracket 3625. Similarly, the middle modular insert 3500 and the top modular insert 1800 overlap by the amount indicated by bracket 3620.

As mentioned above, in some embodiments, the attachment holes (e.g., 125 of FIG. 1) in the flanges (e.g., 120 of FIG. 1), line up with each of the modular inserts and/or the window well, when they are nested/placed together in the configuration shown, so as to further facilitate their installation in an aligned and correct fashion. However, in some embodiments, the attachment holes of the window well and the modular inserts do not line up.

The amount of overlap between a window well and a modular insert may vary to accommodate different needs and preferences, from 3 cm, 5 cm, 10 cm, 20 cm, 30 cm or more than 30 cm. Similarly, the amount of overlap between one modular insert and a different modular insert may vary to accommodate different needs and preferences, from 3 cm, 5 cm, 10 cm, 20 cm, 30 cm or more than 30 cm.

For example, in FIG. 36, the bottom portion of the bottom groove of the modular insert 1800 overlaps with the top ridge of the modular insert 3500. In other words, the modular inserts, 1800 and 3500, have about 4 cm of overlap (see bracket 3620). Similarly, the second to bottom groove of the modular insert 3500 overlaps with the top ridge of the window well 400. However, unlike the overlap of modular inserts 1800 and 3500, the bottom groove of the modular insert 3500 also overlaps with the top groove of the window well 400. In other words, the modular insert 3500 and the window well 400 have about 12 cm of overlap (see bracket 3625).

Additionally, in some embodiments, a modular insert and a window well have two or more grooves that overlap. Similarly, in some embodiments, a modular insert and a different modular insert have two or more grooves that overlap. It should be noted that in some embodiments, the amount of overlap corresponds to the height of the recessed section. However, in other embodiments, the amount of overlap is greater than or less than the height of the recessed section.

Furthermore, in some embodiments, more than two modular inserts can be stacked on top of each other to further increase the height of the window well. In other embodiments, no window well is used. Instead, two or more modular inserts are combined to make a full-size window well.

Figure 37:
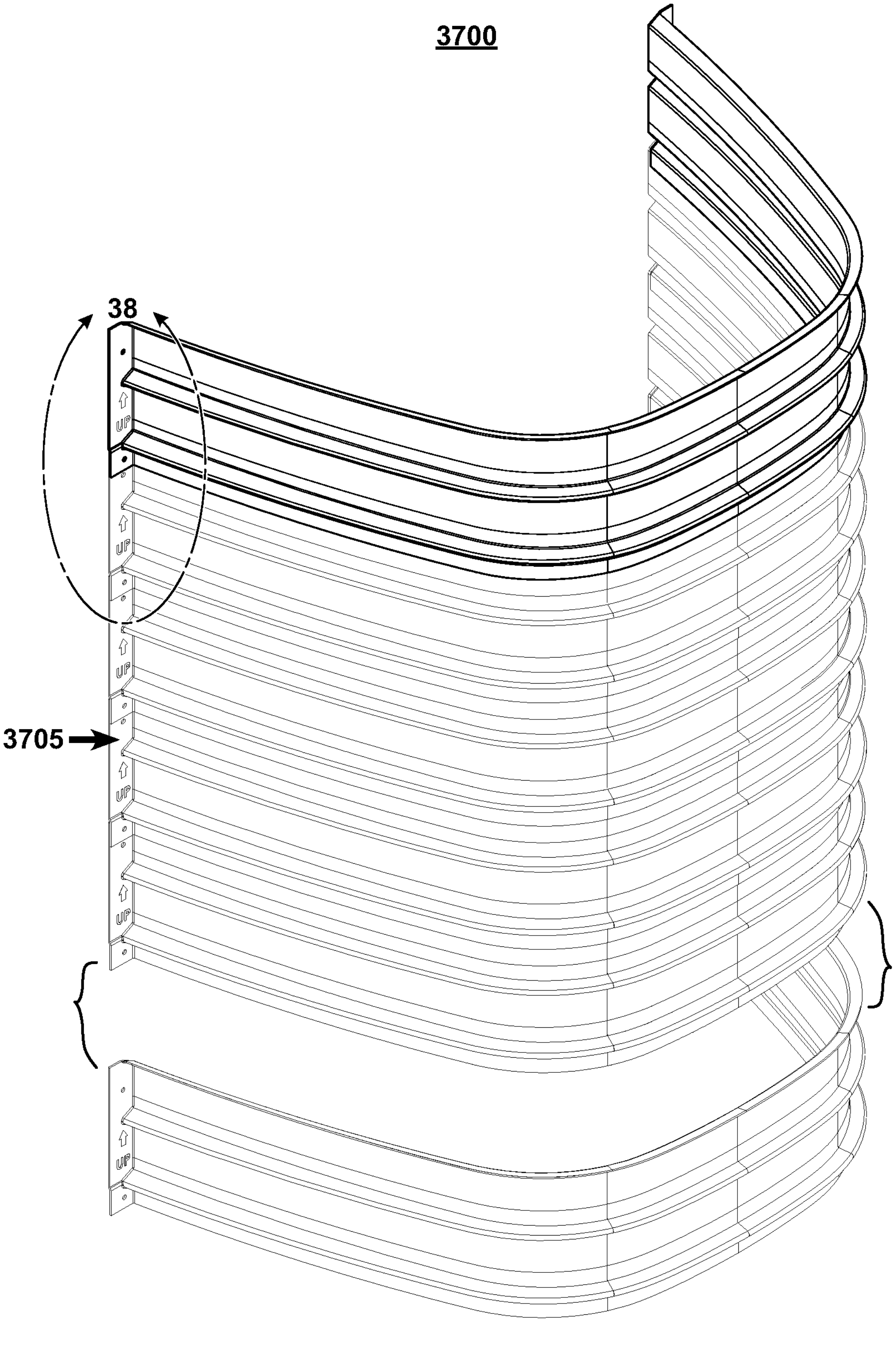
FIG. 37 illustrates a perspective back view of five stacked modular inserts and another modular insert that may be attached to the bottom of the stack.

For example, in FIG. 37, six modular inserts 3705 are stacked to create a full-size window well 3700. Additionally, all the modular inserts 3705 are the same height and have the same amount of overlap with the adjacent inserts 3705. However, in some embodiments, modular inserts of different heights are stacked together and have different amounts of overlap.

Figure 38:
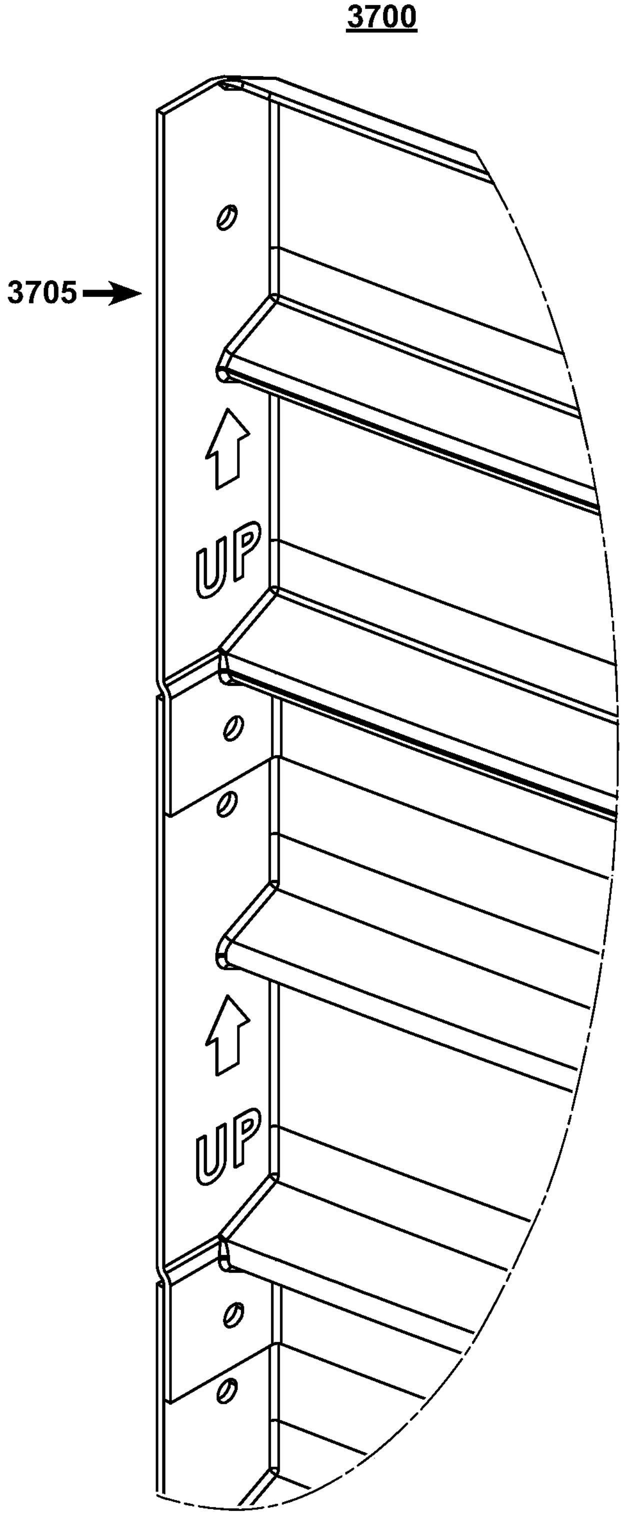
FIG. 38 is a close-up view of the region designated "38" in the perspective view of FIG. 37.

FIG. 38 shows a close-up view of the full-size window well 3700. It should be noted that although the overlap of the modular inserts 3705 is visible from the back of the window well 3700, the transition from one modular insert 3705 to another modular insert 3705 is inconspicuous from the front. In other words, a user viewing the window well 3700 would not easily notice that the window well 3700 is composed of multiple modular inserts 3705.

Additionally, in some embodiments the modular insert can be attached and installed to a window well while the window well remains attached to a structure. For example, a damaged section of the window well may be cut off and replaced with a modular insert. In other words, in order to repair a window well a user can (1) remove a damaged portion of the window well while the window well remains attached to the structure, and (2) replace the damaged portion of the window well with a modular insert which has a recessed section designed to mate with the window well while the window well remains attached and installed to the structure. It should also be noted that the damaged portion of the window well can be replaced by two or more stacked modular inserts.

Additionally, the modular insert can be replaced without detaching the main window well from its corresponding structure. However, in some embodiments the window well or modular insert is removed from the structure before the damage portion is removed and replaced. Overall, the modular insert allows for easy and efficient repairs if the modular insert or the main window well is damaged.

Veil Printing Processes for Molding Thermoplastic Window Wells

In some embodiments, a fabric veil can be used to improve the aesthetics and/or the durability of a fiber reinforced thermoplastic window well. Similarly, a fabric veil can be used to improve the aesthetics and/or durability of a window well composed of a thermoset plastic. A fabric veil can also be used to improve the aesthetics and/or the durability of a modular insert.

Figure 39:
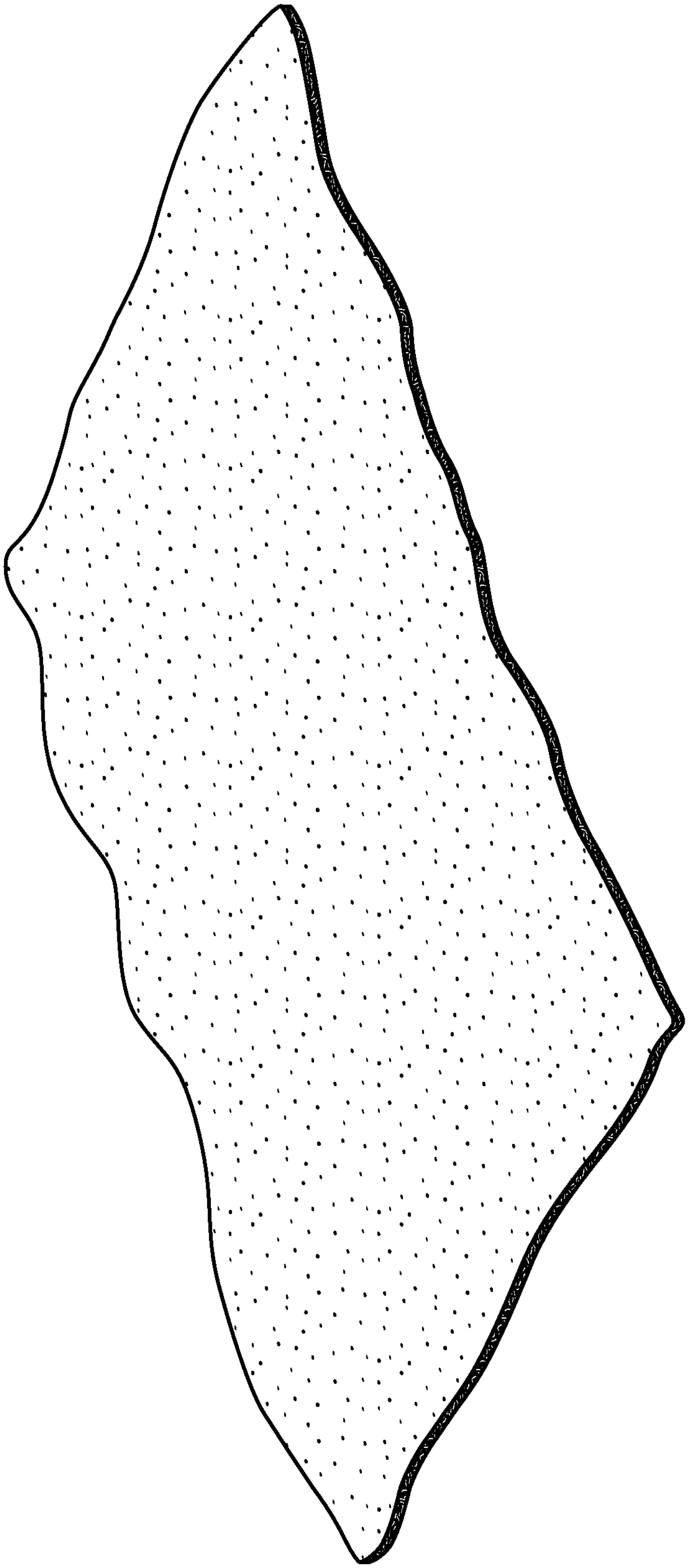
FIG. 39 illustrates a perspective view of a blank fabric veil.

FIG. 39 illustrates an exemplary blank veil 3900. In some embodiments, the veil 3900 is made of a synthetic fabric. For example, the fabric may be polyester, aramid or fiberglass. However, in some embodiments, the veil can also be made from natural fabrics (e.g., linen, cotton, leather or cashmere). Additionally, the thickness of the veil 3900 may vary to accommodate different needs and preferences from 1 mm, 5 mm, 10 mm, 20 mm, 30 mm, 50 mm, 100 mm or more than 100 mm.

In some embodiments, the veil 3900 is compressed into a thermoplastic sheet or sheets during the manufacturing of the lightweight and durable window well. Thus, after manufacturing, the window well has a new outer layer that is composed of the fabric veil that is at least partially embedded into the thermoplastic. In other words, the veil becomes the outer layer of the window well.

In some embodiments, this new outer layer adds strength and integrity to the window well. For instance, the outer layer can improve the strength and durability of the window well and make the surface of the window well less likely to chip or crack. Additionally, in some embodiments, the outer layer can increase the window well's UV light resistance and corrosion resistance. The outer layer can also increase the window well's resistance to various outdoor climates. In other words, the veil can be used to weatherproof (i.e., protect against rain, dust, wind, and/or humidity) the window well.

The outer layer created by the veil can also be used to increase the aesthetics of a window well or modular insert.

For example, in some embodiments, the outer layer can be used to hide imperfections caused during the molding process of the window well. The outer layer can also hide unsightly fibers from the thermoplastic. In other words, the outer layer gives a manufacturer more control over the final aesthetics of the exterior of the window well. It should be noted that this level of control over the aesthetics of the thermoplastic product is hard to achieved with traditional manufacturing processes.

The outer layer created by the veil can also be used to add to the overall realism of the organic surface texturing of a window well or modular insert. For example, in some embodiments, a pattern is printed or transferred onto a veil. These patterns can be used to imitate the texture of natural materials. For instance, a veil with a printed pattern can be used to manufacture a window well that has a realistic brick, stone, metal or wood finish. It should be noted that the patterned veils can be used in conjunction with the surface texturing produced by the mold or during post molding operations.

Figure 40:
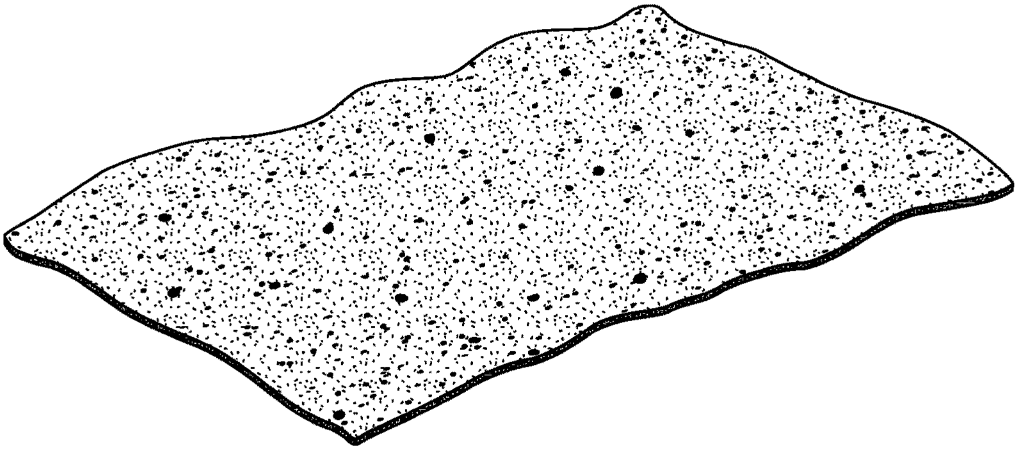
FIG. 40 illustrates a perspective view of three different fabric veils that have printed patterns.
Figure 40:
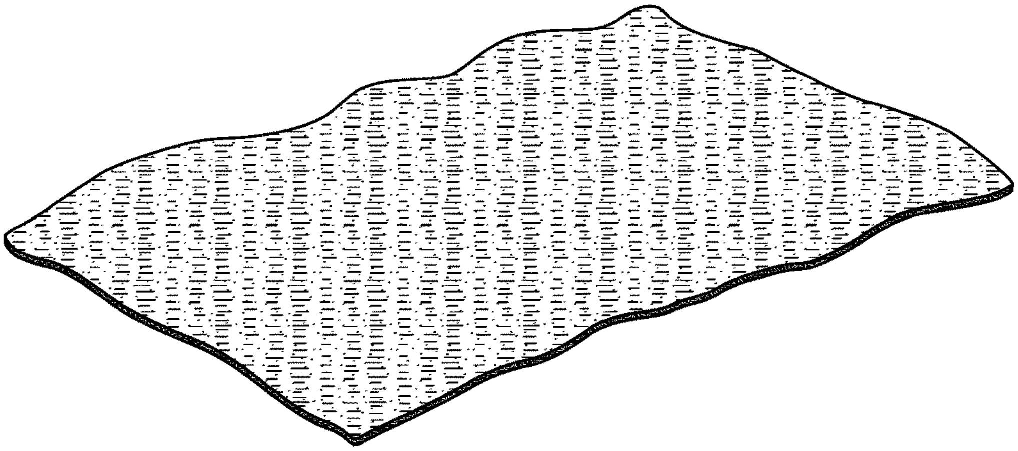
Figure 40:
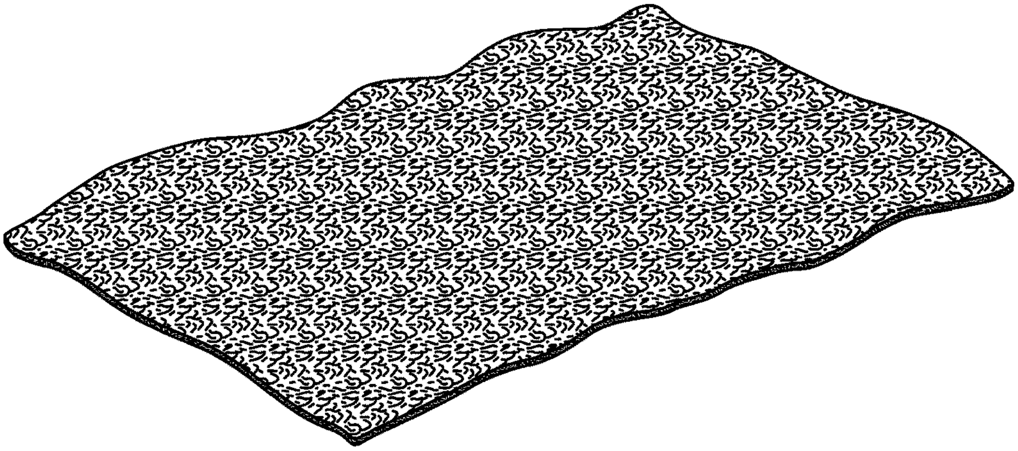

FIG. 40 illustrates some exemplary patterned veils (4000, 4005 and 4010). As seen in FIG. 40, the pattern on the veils can vary to fit the needs and preferences of the manufacturer. For example, some patterns are used to improve the aesthetics of the window well by imitating natural materials or by imitating different surface finishes (e.g., Gloss, Eggshell or Matte).

Additionally, the pattern can be a single color or multiple colors. In other words, the number of colors may vary to accommodate different needs and preferences from 1 color to 2 colors, 3 colors, 4 colors, 5 colors or more than 5 colors.

Figure 41:
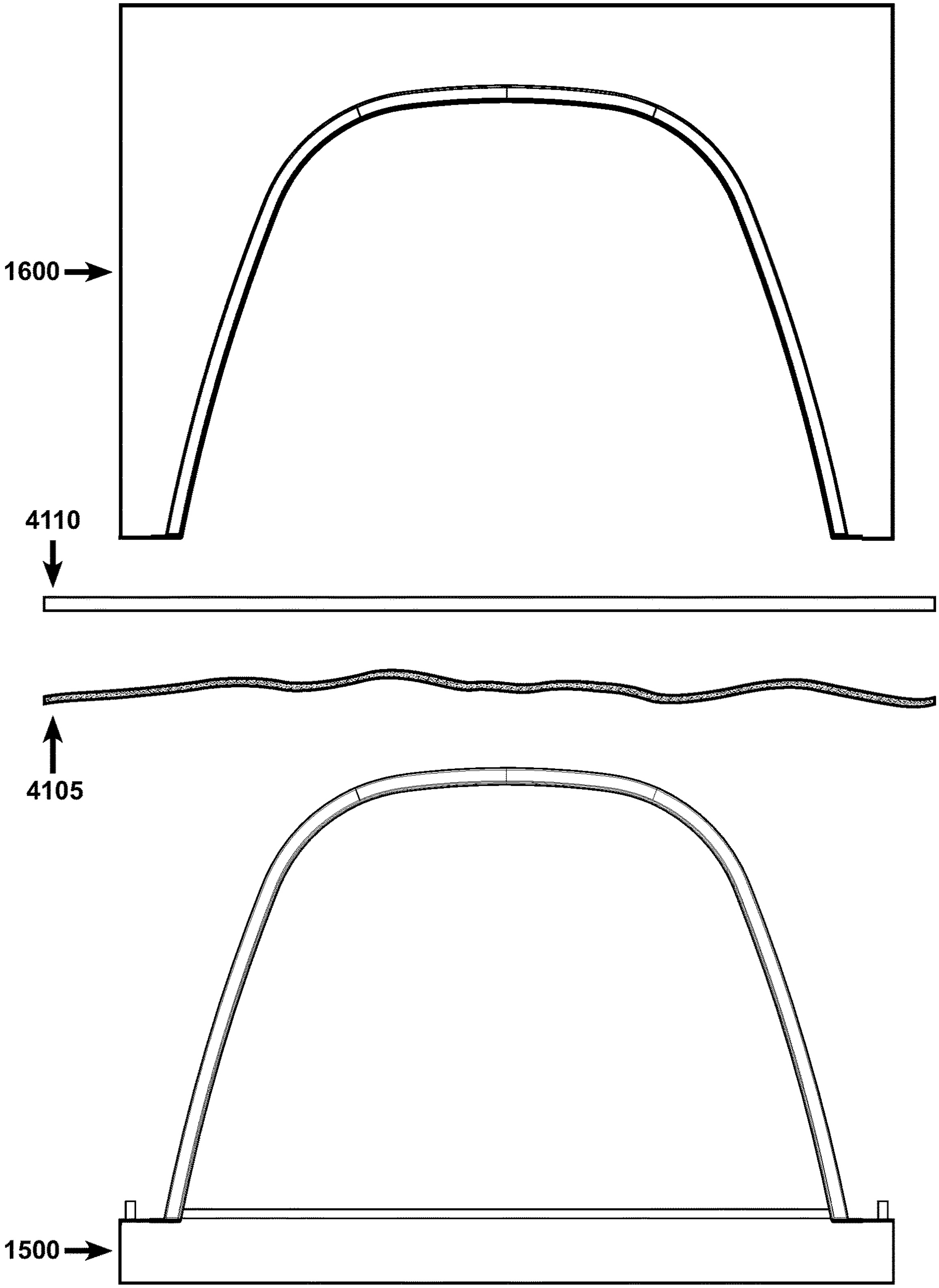
FIG. 41 illustrates an exemplary set-up for manufacturing a window well with a veil.

Once a veil has been chosen, the veil is prepared for the window well manufacturing process. FIG. 41 illustrates one embodiment of a window well manufacturing set-up that implements a veil 4105.

In some embodiments, the veil 4105 is inserted into the mold, below the pre-heated thermoplastic sheet 4110 (with the mold, 1500 and 1600, being raised to approximately 450° F., or at least greater than 385° F. and less than 500° F.). However, in other embodiments, the veil 4105 is place on top of the pre-heated thermoplastic sheet 4110. After placement of the veil 4105 and thermoplastic 4110, the veil 4105 and the thermoplastic 4110 are compressed by the molds.

Overall, the method for manufacturing a window well with a veil comprises (1) heating a fiber reinforced thermoplastic sheet to more than 250° F.; (2) positioning the fiber reinforced thermoplastic sheet, after the heating, within a mold; (3) positioning a veil or multiple veils onto the fiber reinforced thermoplastic sheet; and (4) compressing the fiber reinforced thermoplastic sheet and veil within the mold with a pressure of greater than 200 psi. It will be appreciated that the veil may be used with a variety of different molds (e.g., steel or composite), and/or different materials (e.g., LFRT, GMT or continuous-fiber reinforced thermoplastic).

It should also be noted that in some embodiments, the window well omits a resin for securing the embedded fabric veil to the thermoplastic. In other words, the fabric veil bonds with thermoplastic without any additional bonding agents.

In some embodiments, the veil is placed onto the thermoplastic sheet before the thermoplastic sheet is heated. In other instances, the thermoplastic sheet is heated to greater than 200° F., 300° F., 400° F. or more in a first set of one or more heating and/or compression processes/cycles in the mold before the veil is placed onto the thermoplastic sheet for the final set of one or more heating/compressing processes/cycles.

During molding/compression, the veil 4105 may become embedded into the heated thermoplastic sheet in such a manner that the veil 4105 is physically and visually integrated into the surface of the window well. In other words, the pattern and colors of the veil can become the pattern and colors of the surface of the window well or modular insert. Therefore, as mentioned above, the veil 4105 becomes an outer skin or layer on top of the thermoplastic material which gives the surface a different texture and/or color.

Additionally, in some embodiments, the veil 4105 is embedded below the surface of the window well. In these embodiments, only some of the texturing and/or coloring of the veil 4105 can be seen through the thermoplastic. As a result, the printed pattern of the veil 4105 is only partially visible on the final product surface of the window well.

However, in some embodiments (e.g., when the veil is used only to provide additional strength and durability), the veil is embedded deeper into the window well and cannot be seen through the thermoplastic.

Figure 42:
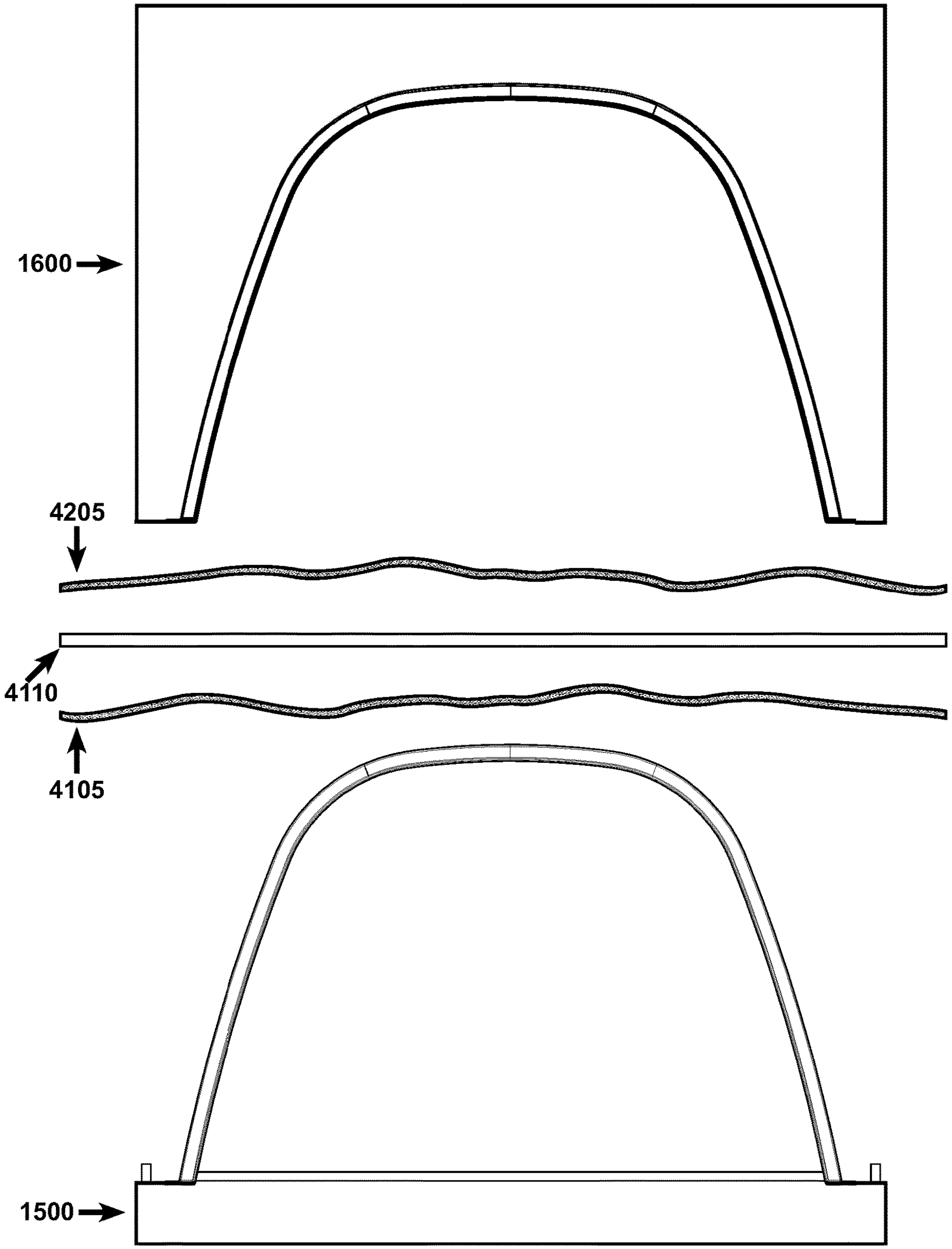
FIG. 42 illustrates an exemplary set-up for manufacturing a window well with two veils.

Additionally, in some embodiments, multiple fabric veils are used to manufacture the window well. For example, FIG. 42 illustrates a manufacturing set-up that will produce a window well that comprises of a thermoplastic sheet 4110 and multiple fabric veils, 4105 and 4205. In FIG. 42, one fabric veil 4205 is placed on top of the thermoplastic sheet while another veil 4105 is place below the thermoplastic 4110 sheet. However, in some embodiments, two or more fabric veils are place below the thermoplastic sheet. Similarly, in some embodiments, two or more fabric veils are place on top of the thermoplastic sheet.

When multiple fabric veils are used, the veils can either have matching patterns or each veil can have a unique printed pattern. In other words, multiple veils can be used to combine different patterns to produce more complex patterns. Using multiple veils can also make it easier to give a window well the desired aesthetics, texture and/or properties.

Figure 43:
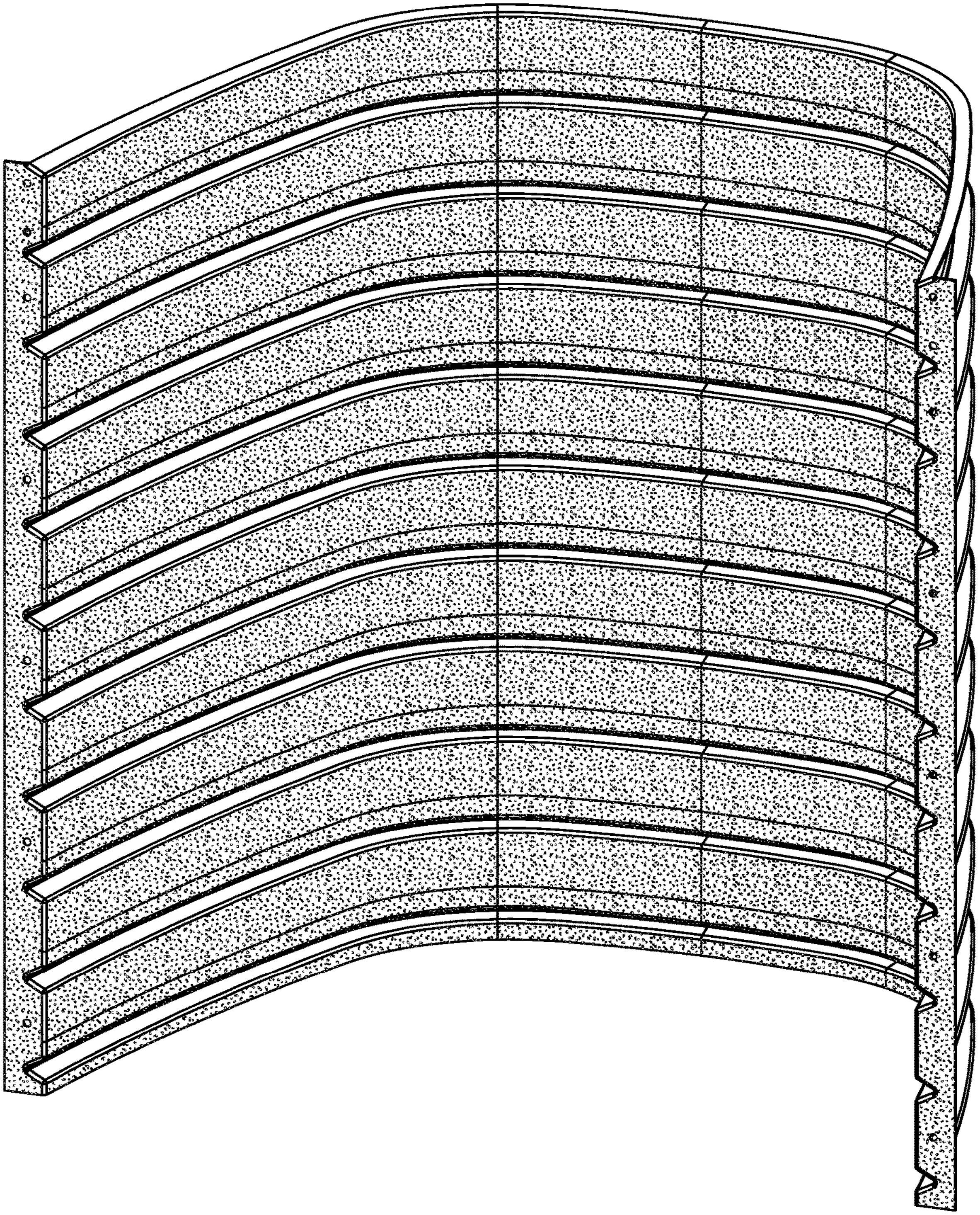
FIG. 43 illustrates a window well that has an outer layer composed of a patterned fabric veil.

FIG. 43 illustrates a window well 4300 that has been manufactured with the use of a veil. Therefore, the window well 4300 has a patterned outer layer. In FIG. 43, only the front side of the window well 4300 has a patterned outer layer. However, in some embodiments, the pattern of the veil is applied to the front, back, bottom and/or top. In other words, in some embodiments, the veil surrounds the thermoplastic.

Notably, in some instances, no lamination (e.g., no resin) is used for applying/embedding the veil into the window well. It is also noted that the use of a veil to provide a print through function, such as described above, have not heretofore been used with molding thermoplastics without resins. The processing invoked is also different than processes used to mold colored veils to thermoset plastics and/or with the use of resins. Therefore, the manufacturing process is simplified and more efficient than traditional manufacturing methods.

Overall, the disclosed embodiments are directed to veil printing processes for molding thermoplastic window wells or modular insert that greatly improve the ease and efficiency of producing window wells with organic and realistic finishes. Additionally, the quality of the window well aesthetics is much higher as compared to traditional manufacturing methods.

Notwithstanding the foregoing descriptions about the benefits of thermoplastic window wells, the functionality achieved using a fabric veil and thermoplastic can also be achieved using different types of plastics, as well as nonplastic materials.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of manufacturing a window well that is structured to provide aesthetics and window well properties, the method comprising:

heating a fiber reinforced thermoplastic material to more than 250° F.;

positioning the fiber reinforced thermoplastic material within a mold;

positioning a veil onto the fiber reinforced thermoplastic sheet; and compressing the fiber reinforced thermoplastic sheet and veil within the mold with a pressure of greater than 200 psi, wherein the method omits a resin for securing the veil to the fiber reinforced thermoplastic material.

2. The method of claim 1, wherein the fiber reinforced thermoplastic material comprises a fiber reinforced thermoplastic sheet.

3. The method of claim 1, wherein the method further comprises heating the fiber reinforced thermoplastic material to more than 385° F. prior to or during the compressing.

4. The method of claim 1, wherein said pressure used to compress the fiber reinforced thermoplastic material within the mold is within a range from about 300 psi to about 400 psi.

5. The method of claim 1, wherein multiple veils are positioned onto the fiber reinforced thermoplastic material.

6. The method of claim 1, wherein the veil is positioned onto an exterior surface of the fiber reinforced thermoplastic material.

7. The method of claim 1, wherein positioning the fiber reinforced thermoplastic material within the mold occurs after heating of the fiber reinforced thermoplastic material.

8. The method of claim 1, wherein at least some fibers within the fiber reinforced thermoplastic material are omni-directional and have a length of greater than 5 mm.

9. The method of claim 8, wherein said at least some fibers within the fiber reinforced thermoplastic material have a length greater than 20 mm.

10. The method of claim 8, wherein said at least some fibers within the fiber reinforced thermoplastic material have a length of greater than 40 mm.

11. The method of claim 1, wherein the veil is a fabric veil made of a synthetic fabric.

12. The method of claim 1, wherein the veil is a fabric veil and includes a printed pattern.

13. The method of claim 12, wherein the printed pattern of the fabric veil is multi-colored and imitates a texture of at least one of wood, brick, metal, granite, marble or other stone.

14. A method of manufacturing a window well that is structured to provide aesthetics and window well properties, the method comprising:

heating a fiber reinforced thermoplastic sheet to more than 250° F.;

positioning the fiber reinforced thermoplastic sheet, within a mold;

positioning a veil onto the fiber reinforced thermoplastic sheet after the heating of the fiber reinforced thermoplastic sheet; and compressing the fiber reinforced thermoplastic sheet and veil within the mold with a pressure of greater than 200 psi, causing the veil to embed at least partially into the fiber reinforced thermoplastic sheet, wherein the method omits a resin for securing the veil to the fiber reinforced thermoplastic material.

15. The method of claim 14, wherein positioning the fiber reinforced thermoplastic sheet within the mold occurs after heating of the fiber reinforced thermoplastic sheet.

16. The method of claim 1, wherein when compressing the fiber reinforced thermoplastic sheet and veil within the mold, the veil is at least partially embedded into an outer surface of the window well, such that the veil becomes an outer skin or layer on top of the fiber reinforced thermoplastic sheet and provides a texture or a color.

17. The method of claim 14, wherein when compressing the fiber reinforced thermoplastic sheet and veil within the mold, the veil is embedded into an outer surface of the window well that is to be visible by a user when installed.

18. The method of claim 14, wherein when compressing the fiber reinforced thermoplastic sheet and veil within the mold, the veil embeds a texture into the fiber reinforced thermoplastic sheet.

19. The method of claim 1, wherein the fabric veil forms an outer layer of the window well, the fabric veil being at least partially embedded into the fiber reinforced thermoplastic sheet.

* * * * *